United States Patent
Pompe Van Meerdervoort et al.

(10) Patent No.: US 11,724,287 B2
(45) Date of Patent: Aug. 15, 2023

(54) SEED SORTING

(71) Applicant: Monsanto Technology LLC, St. Louis, MO (US)

(72) Inventors: Louis M. Pompe Van Meerdervoort, Rotterdam (NL); Eric L. Borrowman, St. Peters, MO (US); Jarrett R. Ceglinski, St. Louis, MO (US); Govind Chaudhary, Maryland Heights, MO (US); Leendert De Bruin, Berkel en Rodenrijs (NL); Johnny J. Kotyk, St. Louis, MO (US); Brad D. White, Creve Coeur, MO (US)

(73) Assignee: Monsanto Technology LLC, St. Louis, MO (US)

( * ) Notice: Subject to any disclaimer, the term of this patent is extended or adjusted under 35 U.S.C. 154(b) by 0 days.

(21) Appl. No.: 17/251,057

(22) PCT Filed: Jun. 10, 2019

(86) PCT No.: PCT/US2019/036327
§ 371 (c)(1),
(2) Date: Dec. 10, 2020

(87) PCT Pub. No.: WO2019/241123
PCT Pub. Date: Dec. 19, 2019

(65) Prior Publication Data
US 2021/0146404 A1 May 20, 2021

Related U.S. Application Data

(60) Provisional application No. 62/683,335, filed on Jun. 11, 2018.

(51) Int. Cl.
*B07C 5/36* (2006.01)
*B07C 5/34* (2006.01)
*B07C 5/342* (2006.01)

(52) U.S. Cl.
CPC .............. *B07C 5/362* (2013.01); *B07C 5/342* (2013.01); *B07C 5/3416* (2013.01)

(58) Field of Classification Search
CPC ....... B07C 5/362; B07C 5/363; B07C 5/3416; B07C 5/342
See application file for complete search history.

(56) References Cited

U.S. PATENT DOCUMENTS

| | | |
|---|---|---|
| 2,849,619 A | 8/1958 | Eisfeldt |
| 3,177,360 A | 4/1965 | Hague et al. |

(Continued)

FOREIGN PATENT DOCUMENTS

| | | |
|---|---|---|
| CN | 103347381 A | 10/2013 |
| CN | 204762022 U | 11/2015 |

(Continued)

OTHER PUBLICATIONS

International Search Report and Written Opinion for PCT Application No. PCT/US2019/35329, dated Oct. 24, 2019, 12 pages. United States.

(Continued)

*Primary Examiner* — Michael McCullough
*Assistant Examiner* — Jessica L Burkman
(74) *Attorney, Agent, or Firm* — Harness, Dickey & Pierce, P.L.C.

(57) ABSTRACT

A seed sorting system for sorting seeds includes a seed transfer station configured to move seeds through the system. An imaging assembly includes an x-ray camera configured to acquire x-ray images of the seeds as the seeds move through the system. The x-ray camera is configured to produce high quality images at high line scan rates to accommodate a speed and width at which the seeds are moved by the seed transfer station through the system. A (Continued)

sorting assembly is configured to sort the seeds into separate bins based on the acquired x-ray images of the seeds.

25 Claims, 43 Drawing Sheets

(56) References Cited

U.S. PATENT DOCUMENTS

| | | | |
|---|---|---|---|
| 3,488,495 A | 1/1970 | Schneeman | |
| 3,768,645 A | 10/1973 | Conway et al. | |
| 3,928,753 A | 12/1975 | Kivett et al. | |
| 4,273,649 A | 6/1981 | Leverett | |
| 4,357,535 A | 11/1982 | Haas | |
| 4,809,308 A | 2/1989 | Adams et al. | |
| 4,922,092 A * | 5/1990 | Rushbrooke | G01N 21/76 250/361 C |
| 5,113,425 A | 5/1992 | Zweig | |
| 5,289,921 A * | 3/1994 | Rodrigo | B07B 7/01 209/129 |
| RE35,423 E | 1/1997 | Adams et al. | |
| 5,865,299 A | 2/1999 | Williams | |
| 5,973,286 A | 10/1999 | Wan | |
| 6,145,650 A | 11/2000 | Christ et al. | |
| 6,427,128 B1 | 7/2002 | Satake et al. | |
| 6,646,264 B1 | 11/2003 | Modiano et al. | |
| 7,082,185 B2 | 7/2006 | Freifeld et al. | |
| 7,105,813 B2 | 9/2006 | Lee | |
| 7,529,338 B2 | 5/2009 | Fung et al. | |
| 7,742,564 B2 | 6/2010 | Parham et al. | |
| 7,816,616 B2 | 10/2010 | Kenny et al. | |
| 8,189,901 B2 | 5/2012 | Modiano et al. | |
| 8,452,445 B2 * | 5/2013 | Becker | B07C 5/3427 800/312 |
| 8,488,863 B2 | 7/2013 | Boucheron | |
| 9,157,855 B2 * | 10/2015 | Tin | B07C 5/342 |
| 9,188,553 B2 | 11/2015 | Sakuta et al. | |
| 9,492,130 B2 | 11/2016 | Flagle et al. | |
| 9,545,724 B2 * | 1/2017 | Bonora | B07C 5/3412 |
| 9,865,424 B2 | 1/2018 | Ikeda et al. | |
| 10,078,093 B2 | 9/2018 | Flagle et al. | |
| 10,207,296 B2 * | 2/2019 | Garcia | B07C 5/34 |
| 10,345,479 B2 * | 7/2019 | Langeveld | G01V 5/0041 |
| 10,512,942 B2 * | 12/2019 | Tandon | B07C 5/342 |
| 10,557,805 B2 | 2/2020 | Chaudhary et al. | |
| 10,830,711 B2 | 11/2020 | Kondo | |
| 11,020,066 B2 | 6/2021 | Butani et al. | |
| 11,044,843 B2 | 6/2021 | Kotyk et al. | |
| 11,083,426 B2 | 8/2021 | Defreitas et al. | |
| 11,116,184 B2 * | 9/2021 | Goméz | G01N 24/085 |
| 2001/0022830 A1 | 9/2001 | Sommer, Jr. et al. | |
| 2003/0112440 A1 | 6/2003 | Fukumori et al. | |
| 2004/0218716 A1 | 11/2004 | Freifeld et al. | |
| 2005/0040082 A1 | 2/2005 | Ogawa et al. | |
| 2005/0056777 A1 | 3/2005 | Lee | |
| 2005/0226465 A1 | 10/2005 | Fujita et al. | |
| 2006/0176642 A1 | 8/2006 | George et al. | |
| 2007/0012604 A1 | 1/2007 | Basford | |
| 2007/0291896 A1 | 12/2007 | Parham et al. | |
| 2008/0308472 A1 | 12/2008 | Osiensky et al. | |
| 2008/0310674 A1 | 12/2008 | Modiano et al. | |
| 2010/0143906 A1 | 6/2010 | Becker et al. | |
| 2011/0122994 A1 * | 5/2011 | Grubsky | G21K 1/025 378/62 |
| 2011/0202169 A1 | 8/2011 | Koehler et al. | |
| 2011/0210047 A1 | 9/2011 | Deppermann | |
| 2012/0085686 A1 | 4/2012 | Radema et al. | |
| 2013/0079918 A1 | 3/2013 | Spencer et al. | |
| 2013/0126399 A1 | 5/2013 | Wolff | |
| 2013/0176553 A1 | 7/2013 | Cope et al. | |
| 2013/0229647 A1 | 9/2013 | Fredlund et al. | |
| 2013/0231585 A1 | 9/2013 | Flagle et al. | |
| 2014/0050365 A1 | 2/2014 | Conrad et al. | |
| 2014/0058557 A1 | 2/2014 | Becker et al. | |
| 2014/0257135 A1 | 9/2014 | DeFreitas et al. | |
| 2014/0286474 A1 | 9/2014 | Sakuta et al. | |
| 2014/0328459 A1 | 11/2014 | Urano et al. | |
| 2014/0376816 A1 | 12/2014 | Lagae et al. | |
| 2015/0135585 A1 | 5/2015 | Cope et al. | |
| 2015/0165484 A1 | 6/2015 | Deppermann et al. | |
| 2015/0177067 A1 | 6/2015 | Golgotiu et al. | |
| 2015/0179391 A1 | 6/2015 | Ikeda et al. | |
| 2015/0321353 A1 | 11/2015 | McCarty, II et al. | |
| 2016/0250665 A1 | 9/2016 | Lampe | |
| 2016/0327478 A1 * | 11/2016 | Hilscher | G01N 21/3563 |
| 2017/0131311 A1 | 5/2017 | Flagle et al. | |
| 2017/0295735 A1 | 10/2017 | Butruille et al. | |
| 2017/0328845 A1 | 11/2017 | Loeffler et al. | |
| 2018/0029086 A1 | 2/2018 | Prystupa et al. | |
| 2018/0217072 A1 | 8/2018 | Chaudhary et al. | |
| 2019/0281781 A1 | 9/2019 | Borrowman et al. | |
| 2019/0285558 A1 | 9/2019 | Defreitas et al. | |
| 2019/0307055 A1 | 10/2019 | Kotyk et al. | |
| 2019/0346471 A1 | 11/2019 | Flagle et al. | |
| 2019/0374978 A1 * | 12/2019 | Borrell | B07C 5/367 |
| 2020/0015409 A1 | 1/2020 | de Bruin et al. | |
| 2020/0055093 A1 | 2/2020 | Arlinghaus | |
| 2020/0086353 A1 | 3/2020 | Becker et al. | |
| 2020/0182807 A1 | 6/2020 | Butani et al. | |
| 2021/0129188 A1 | 5/2021 | Borrowman et al. | |
| 2021/0140900 A1 | 5/2021 | Borrowman et al. | |
| 2022/0039766 A1 | 2/2022 | Defreitas et al. | |

FOREIGN PATENT DOCUMENTS

| | | |
|---|---|---|
| CN | 106650802 A | 5/2017 |
| CN | 107238620 A | 10/2017 |
| CN | 107683183 A | 2/2018 |
| DE | 202004007111 U1 | 8/2004 |
| DE | 102004063769 | 7/2006 |
| DE | 202008017748 U1 | 6/2010 |
| EP | 1046902 A2 | 10/2000 |
| EP | 1743713 A1 | 1/2007 |
| FR | 2549963 | 2/1985 |
| JP | 2004-515778 | 5/2004 |
| JP | 2005-58853 | 3/2005 |
| JP | 2012-055859 | 3/2012 |
| JP | 2013-178242 | 9/2013 |
| JP | 2014060957 A | 4/2014 |
| JP | 2015500475 A | 1/2015 |
| JP | WO2016133175 A1 | 1/2018 |
| KR | 101341815 B1 | 1/2014 |
| WO | WO-2008150903 A1 | 12/2008 |
| WO | WO-2009093905 A1 | 7/2009 |
| WO | 2010/138574 A1 | 12/2010 |
| WO | WO-2011115482 A1 | 9/2011 |

OTHER PUBLICATIONS

Indian 1st Examination Report for Indian Application No. 202017052285, dated Jul. 15, 2021, 6 pages, India.

Jiang, et al., "GPhenoVision: A Ground Mobile System with Multimodal Imaging for Field-Based High Throughput Phenotyping of Cotton," Scientific Reports, Jan. 19, 2018, pp. 1-15.

S. K. Kamra, The X-ray Contrast Method for Testing Germinability of *Picea abies* (L.) Karst. seed, Studia Forestalia Suecica Nr. 90,1971, 28 pages, Skogshogskolan, Royal College of Forestry, Stockholm.

Ideal System Co., LTD., "Three Step Color Sorting System," India Patent Application No. 5725/CEENP/2012, Jun. 29, 2012, 62 pages.

* cited by examiner

Useful plant    Dead seed or weak plant

Normal Seed

Discolored Seed

Internal Cracks before Treatment with Contrast Agent

Internal Cracks after Treatment with Contrast Agent

External Cracks before Treatment with Contrast Agent

External Cracks after Treatment with Contrast Agent

No Damage      Visual Damage

Flat Seeds      Round Seeds

Cracks

Scheme assigns crack severity score to both Embryo and Endosperm by manual inspection Embryo. Endosperm 1 = No Damage
2 = Minor Damage
3 = Major Damage Example:
2.3 = Minor embryo damage and major Endosperm damage

SEED SORTING

The present disclosure generally relates to a system and method for processing seeds, and more specifically, to a seed sorting system and method for x-ray imaging and seed classification and sorting.

BACKGROUND

In the agricultural industry, and more specifically in the seed breeding and seed production industry, it is important to be able to analyze, classify and sort seeds with high throughput. By this it is meant that the analysis of the seeds preferably occurs not only quickly, but also reliably and with high total volume and rate. Historically, seeds are categorized by size using mechanical equipment containing screens with holes corresponding to predetermined sizes. Seed categorization is also conducted using image analysis of the seeds to detect certain appearance characteristics of the seeds.

Using conventional seed imaging processes, it is not possible to image and analyze the internal morphology of individual seeds in an automated manner at high throughput and with a high predictive classification accuracy. In the past, seed companies could x-ray image seeds using a standalone x-ray imaging cabinet or device. However, this process is typically a very slow batch process that is performed offline. Therefore, there exists a need for a system that is able to perform real-time imaging, classification, and sorting at both high throughput and with high image quality at industrial scale and in a sustainable manner over a long period of time. Additionally, there is a need for an advanced PC-based method to measure relevant seed features and develop or train classification models that have high classification/prediction accuracy.

SUMMARY

In one aspect, a seed sorting system for sorting seeds generally comprises a seed transfer station configured to move seeds through the system. An imaging assembly comprises an x-ray camera configured to acquire x-ray images of the seeds as the seeds move through the system. The x-ray camera is configured to produce high quality images at high line scan rates to accommodate a speed and width at which the seeds are moved by the seed transfer station through the system. A sorting assembly is configured to sort the seeds into separate bins based on the acquired x-ray images of the seeds.

In another aspect, an x-ray camera generally comprises a camera housing and optical sensor components housed within the camera housing. A fiber optic is mounted on the optical sensor components and extends from the optical sensor components. The fiber optic is housed within the camera housing. A fiber-optic-scintillator is mounted on the fiber optic.

In yet another aspect, a training method for building a classification model for a batch of seeds generally comprises loading seeds into a scantray comprising a plurality of holes. The seeds are held in the holes in the scantray. Taking x-ray images of the seeds in the scantray using an x-ray camera associated with a seed sorting assembly. Building a seed classification model using the x-ray images of the seeds in the scantray for identifying the seeds as belonging to a certain class.

BRIEF DESCRIPTION OF THE DRAWING

Corresponding reference characters indicate corresponding parts throughout the drawings.

DETAILED DESCRIPTION

Figure 1:
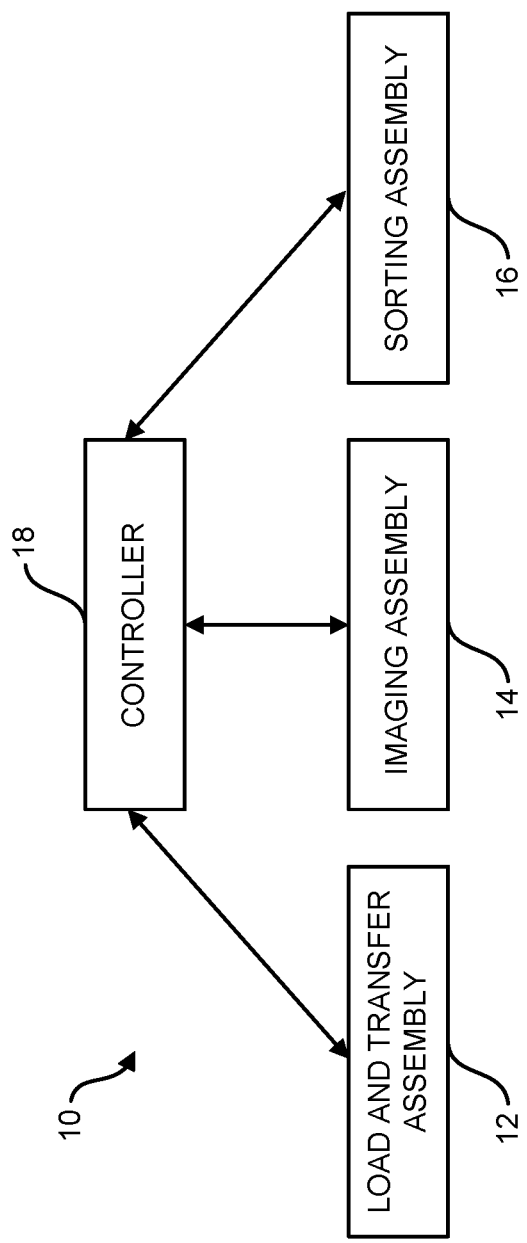
FIG. 1 is block diagram of an automated seed sorting system.
Figure 2:
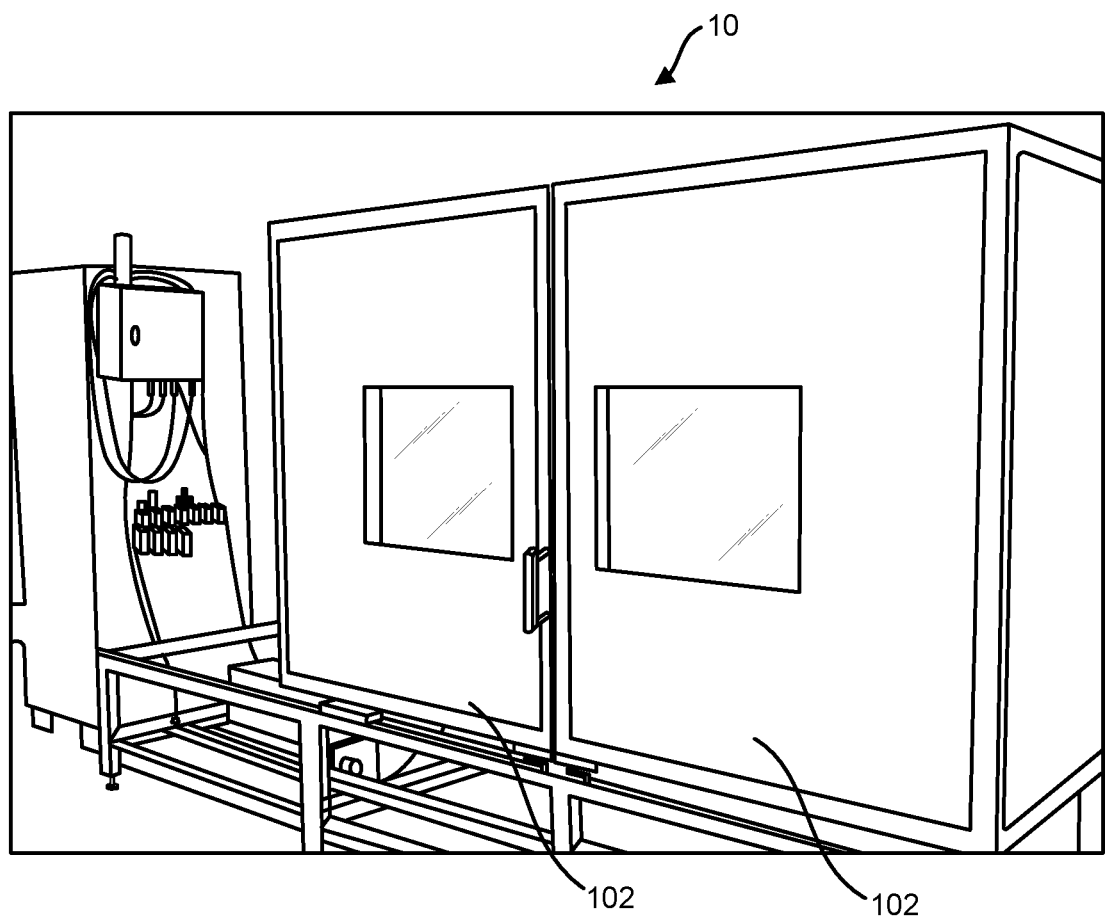
FIG. 2 is a perspective of the seed sorting system.
Figure 3:
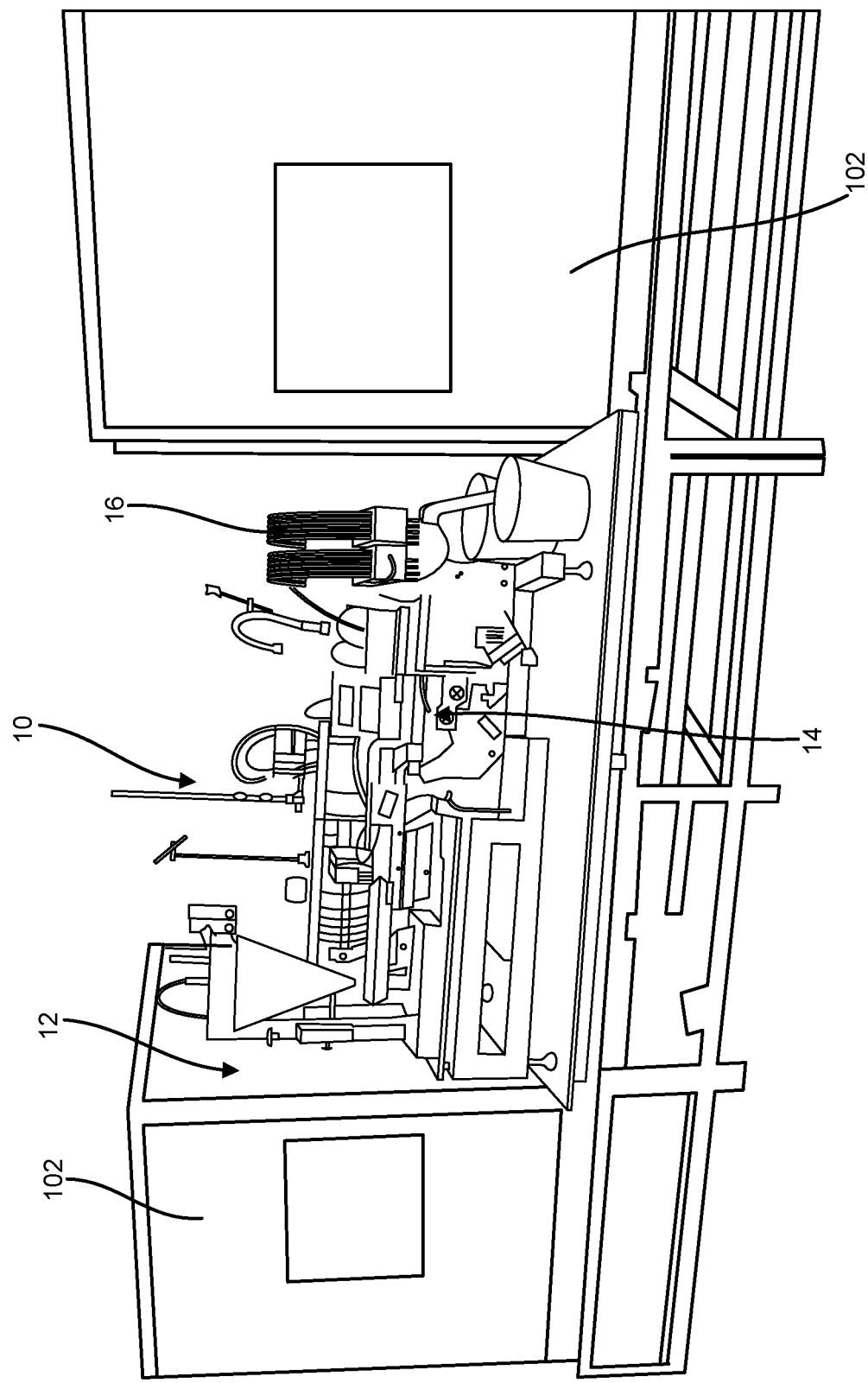
FIG. 3 is a perspective of the seed sorting system with X-ray shielding doors opened.
Figure 4:
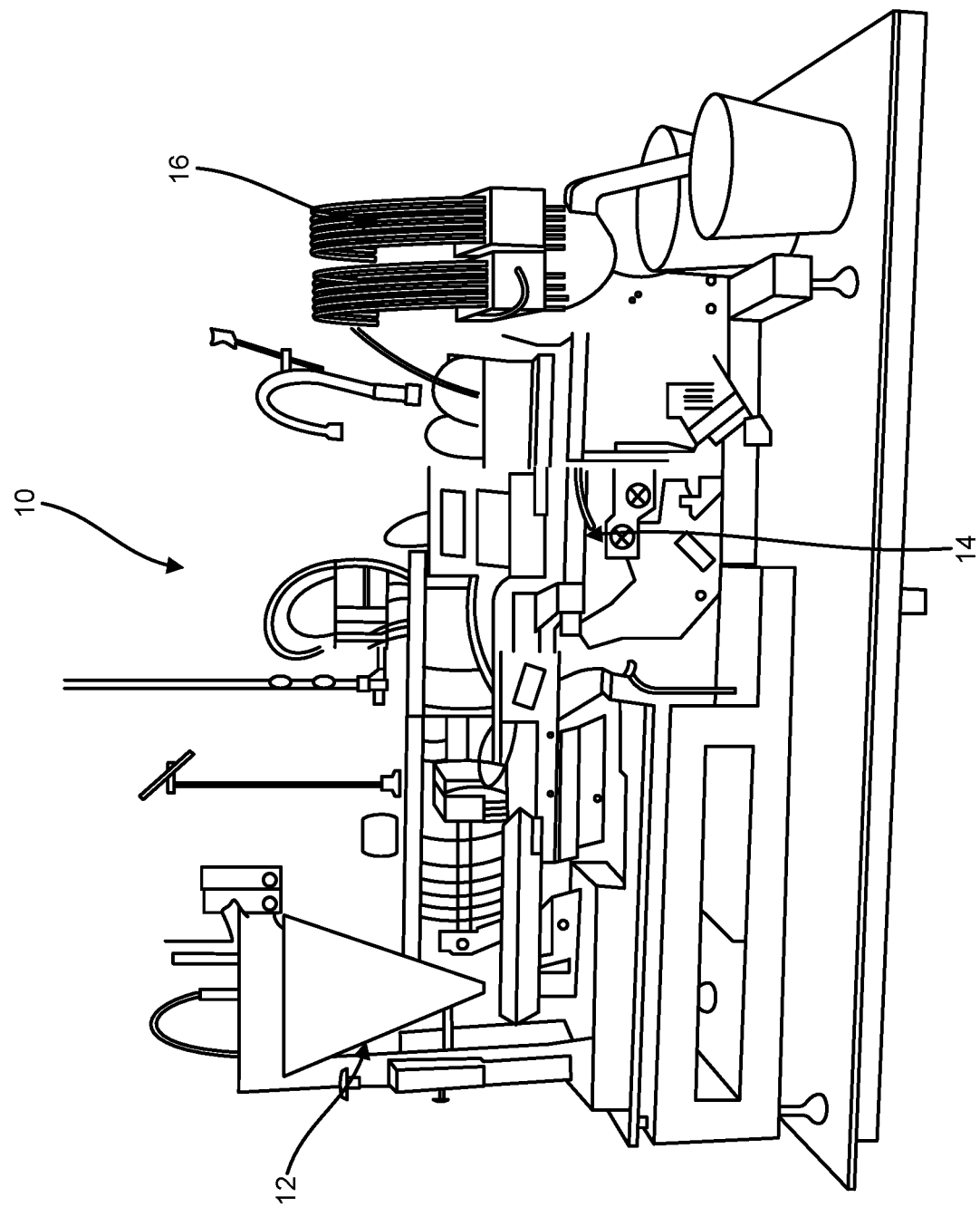
FIG. 4 is a perspective of the seed sorting system with the X-ray shielding doors removed.
Figure 5:
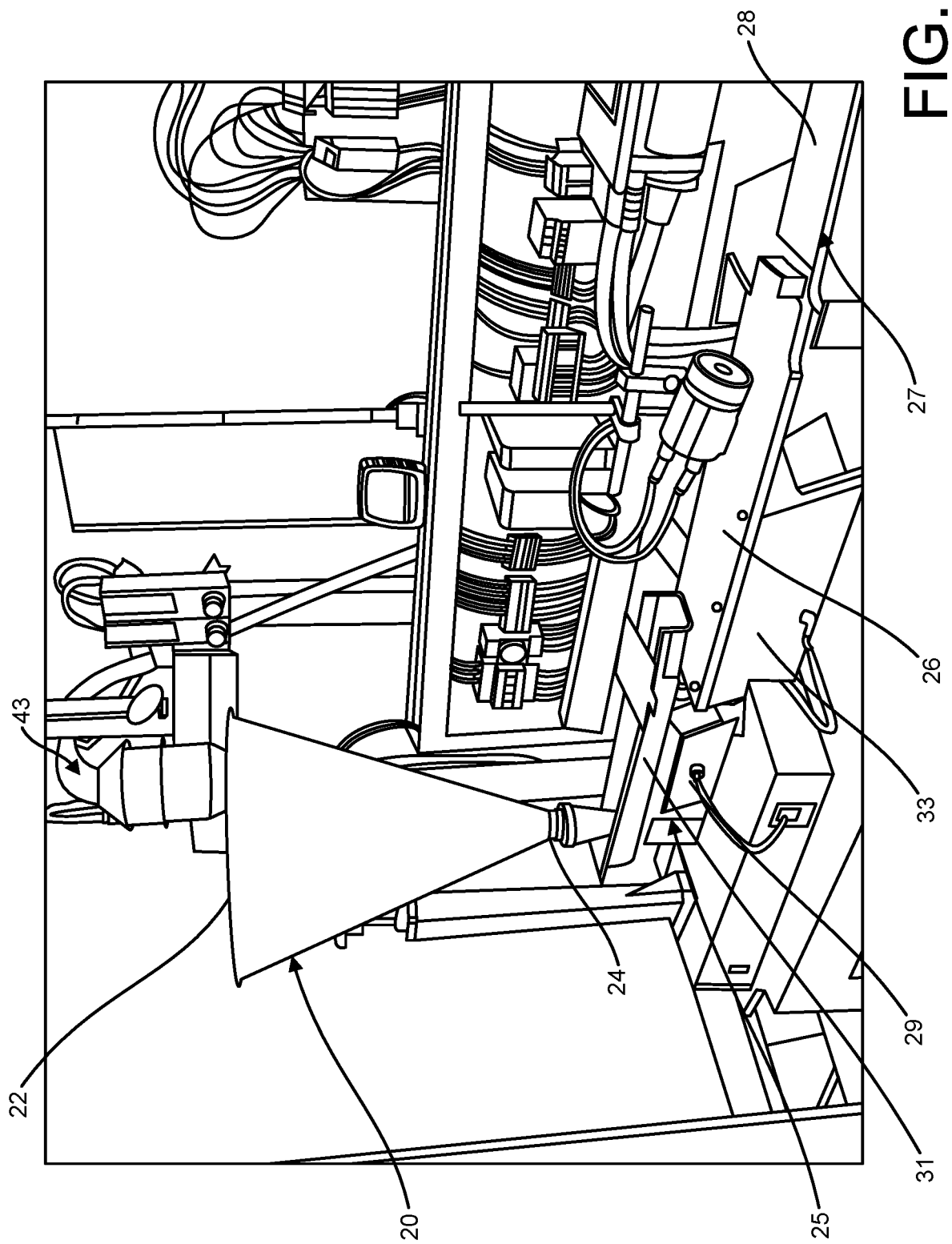
FIG. 5 is a perspective of a load and transfer assembly of the seed sorting system.
Figure 6:
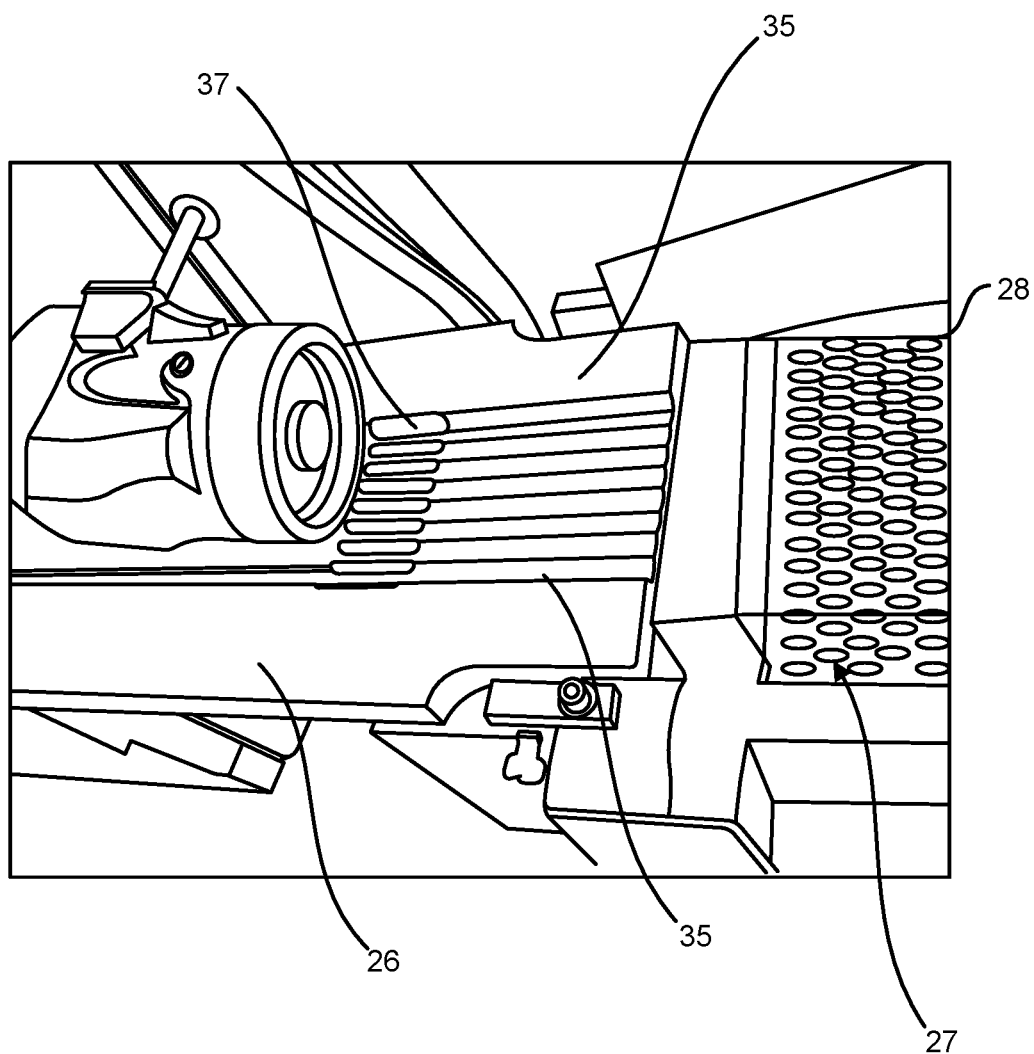
FIG. 6 is a perspective of a singulation feeder plate of the load and transfer assembly.
Figure 7:
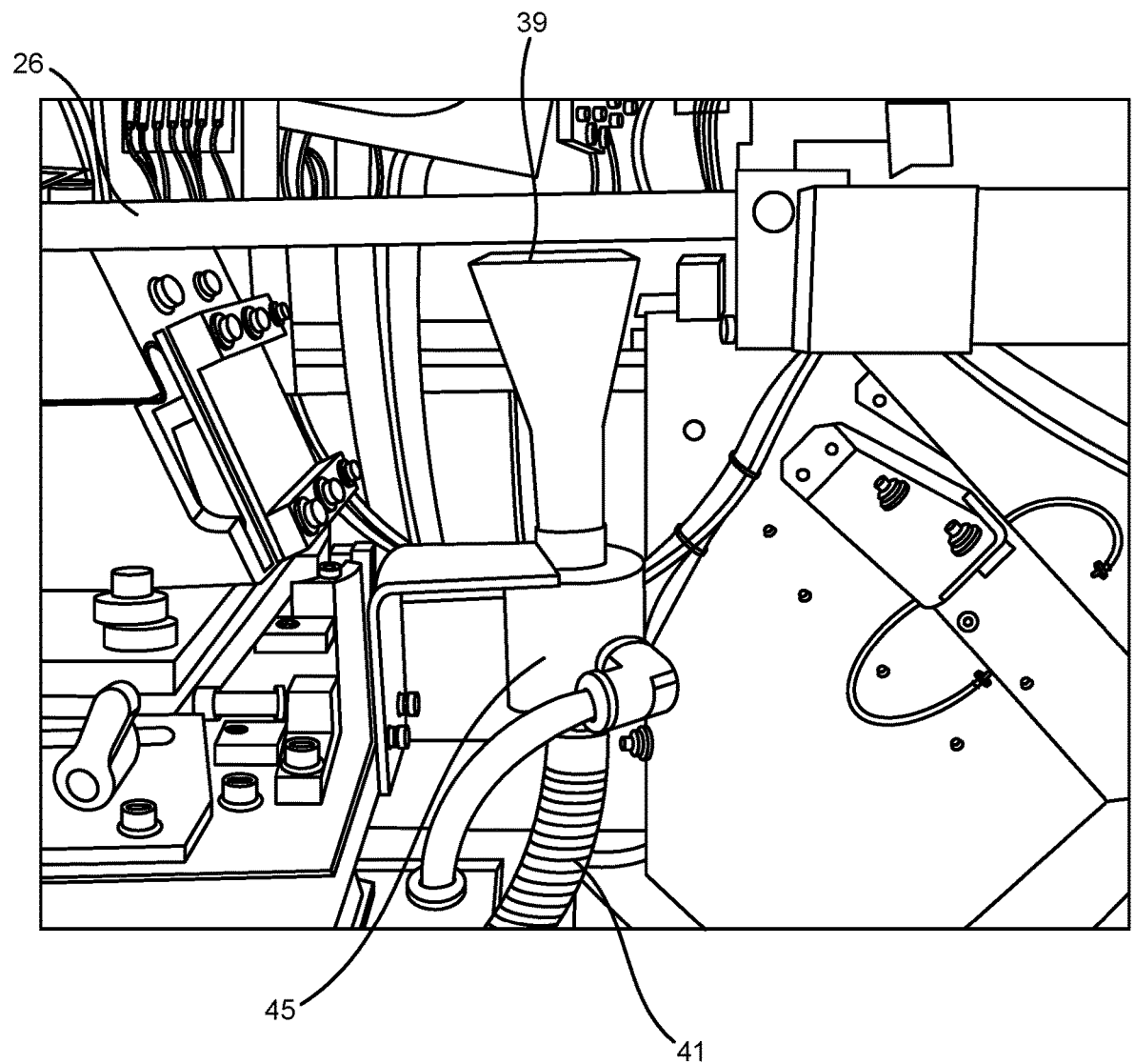
FIG. 7 is a side view of a seed collector and singulation feeder plate of the load and transfer assembly.
Figure 8:
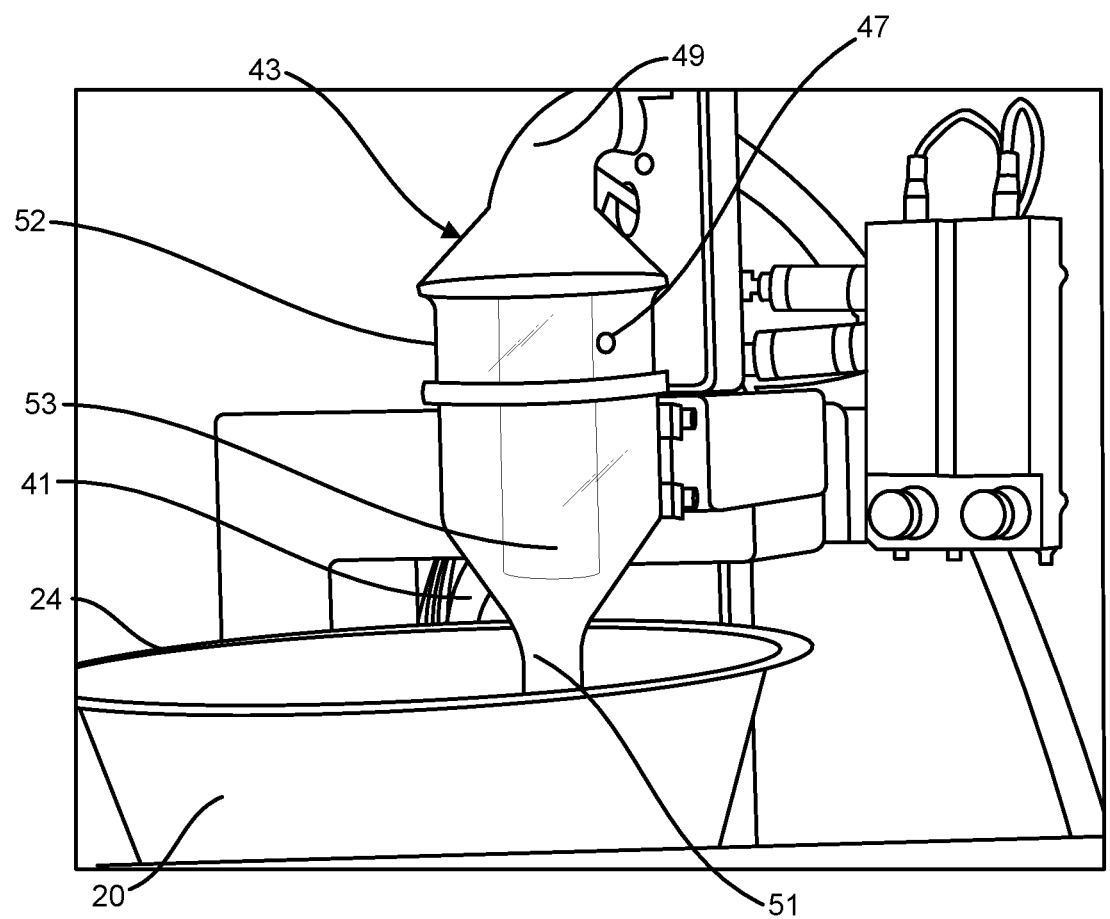
FIG. 8 is a perspective of a seed, air, debris separator of the load and transfer assembly.
Figure 9:
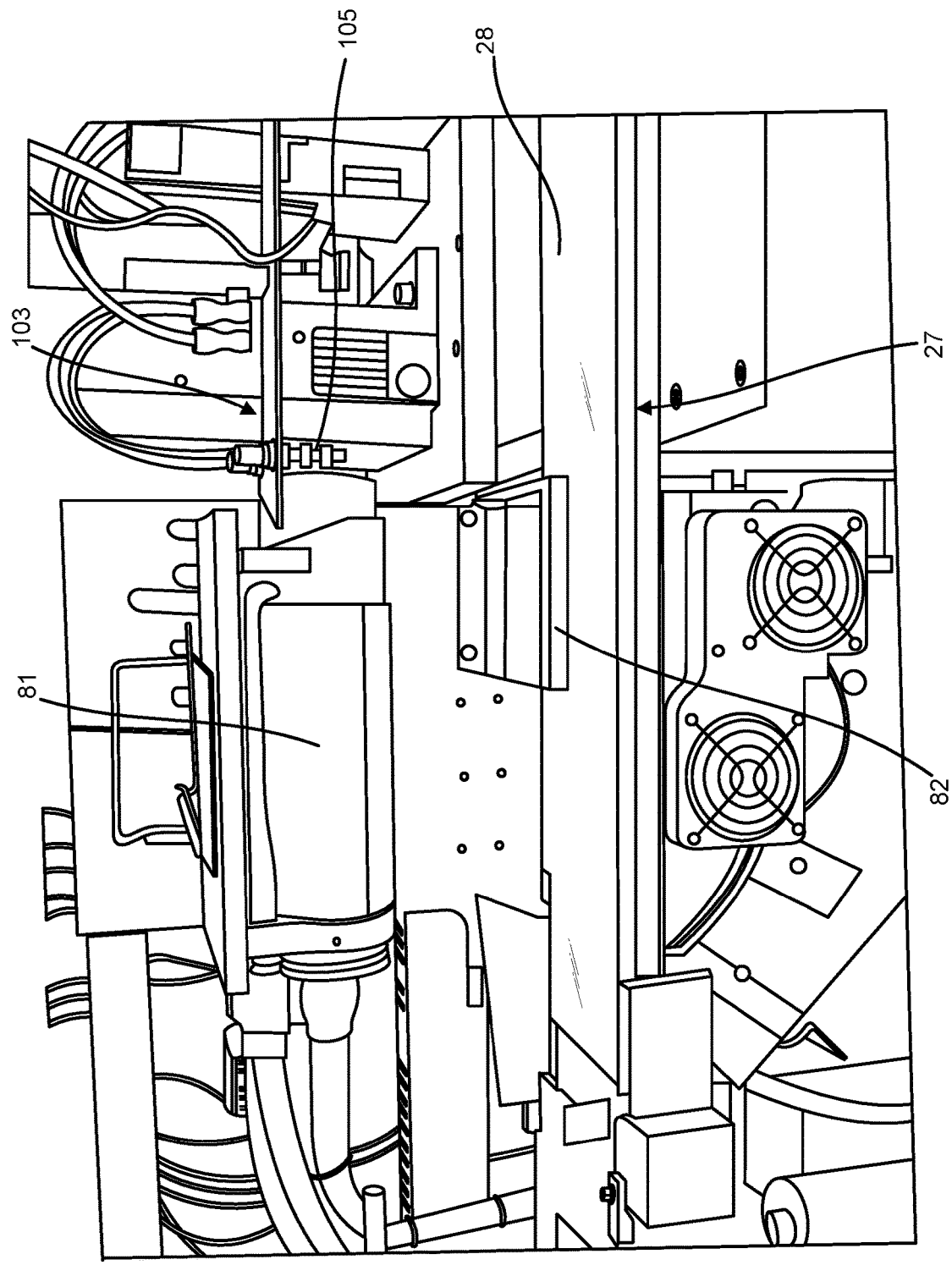
FIG. 9 is a perspective of an x-ray image acquisition assembly of the seed sorting system.

Referring to FIGS. 1-4, a seed sorting system is indicated generally at 10. The system is configured to receive, analyze, classify, and sort a plurality of seeds into selected categories. The system 10 comprises a load and transfer assembly 12 configured to receive and deliver the seeds through the system, an imaging assembly 14 for collecting image data of the seeds as they are delivered through the system by the load and transfer assembly, and a sorting assembly 16 configured to sort the seeds into selected categories based on the image data collected for the seeds by the imaging assembly. A controller 18 (e.g., a processor and suitable memory) is programmed to operate the system 10. The imaging assembly 14 acquires image data and the controller 18 incorporates optimized operators for image feature analysis, for providing rapid and highly accurate size, shape, and internal construction of the seeds, training algorithms and classification models which allows the system 10 to reliably detect defects in the seeds or predict a seed quality metric. The seed sorting system 10 can be used on any suitable seed type including, but not limited to, vegetable seeds (e.g., tomato, tomato rootstock, pepper, Cucurbitaceae, Brassicaceae), row crop seeds (e.g., corn, soybean, and cotton), and other crops (e.g. alfalfa, canola, rice, and wheat). In a preferred embodiment, the system is used to sort and classify vegetable seeds.

The sorting assembly 16 is configured to sort the seeds into two or more selected categories so that the seeds are more precisely categorized for later processing, assessment, and/or analysis. For example, seeds determined to be defective by the imaging assembly 14 and controller 18 can be separated from the healthy/non-defective seeds. Defective seeds may be identified as non-usable or non-desired, diseased, discolored, or mechanically damaged seeds, and inert material based on a certain quality metric. For example, seed quality for vegetable seeds may be labeled according to the seed's ability to yield a usable seedling plant (seedling). The seedling may have a typical label rating as: normal, week, abnormal, non-germinating. However, because healthy/non-defective seeds may appear the same from an external image of the seeds, the ability of the imaging assembly 14 to view the internal geometrical morphology of the seeds provides a more accurate indication of the condition of the seeds. For example, internal cracks may be seen using the imaging assembly 14. This is beneficial because cracks which extend into the embryo of the seed are particularly bad for seed germination. Additionally, the load and transfer assembly 12, imaging assembly 14, controller 18, and the sorting assembly 16 allow the system to provide high throughput measurement of the seeds to meet real time seed sorting rate requirements. As such, the system 10 can be implemented into an existing seed processing procedure and quickly and seamlessly provide a seed sorting function.

Figure 10:
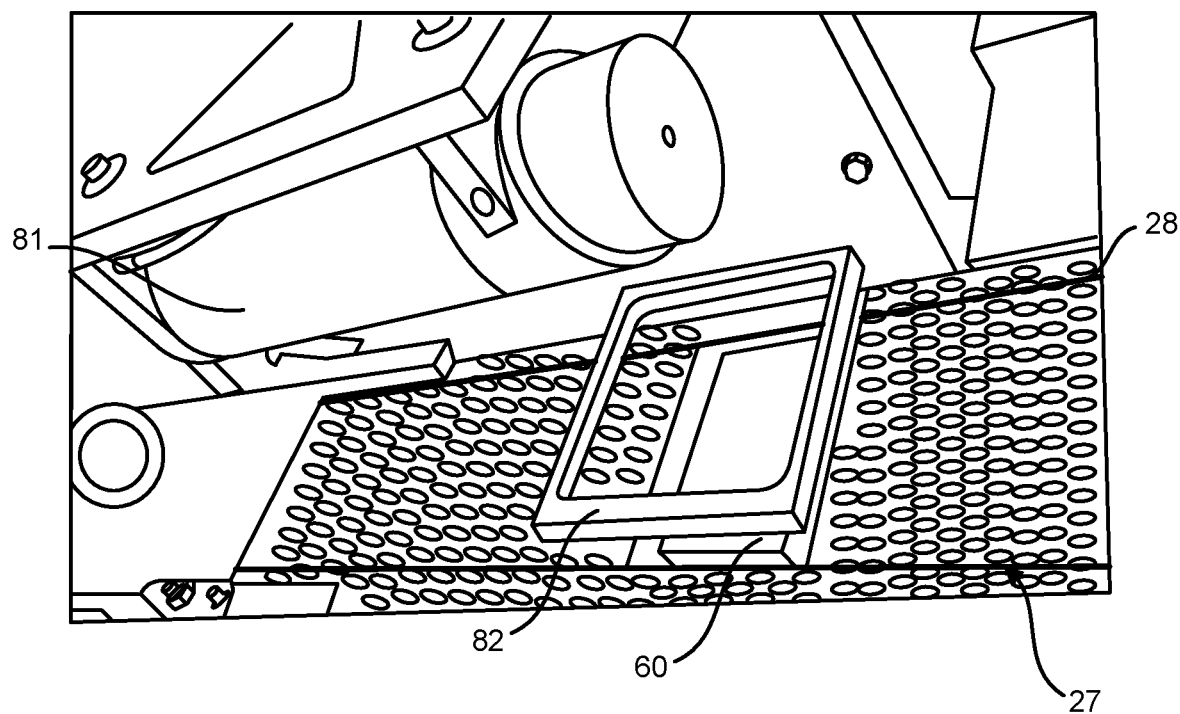
FIG. 10 is a perspective of the seed sorting system showing singulated seeds being transported by a seed transfer station of the system and an x-ray tube mounted above the seed transfer station and an x-ray camera below the seed transfer station.
Figure 11:
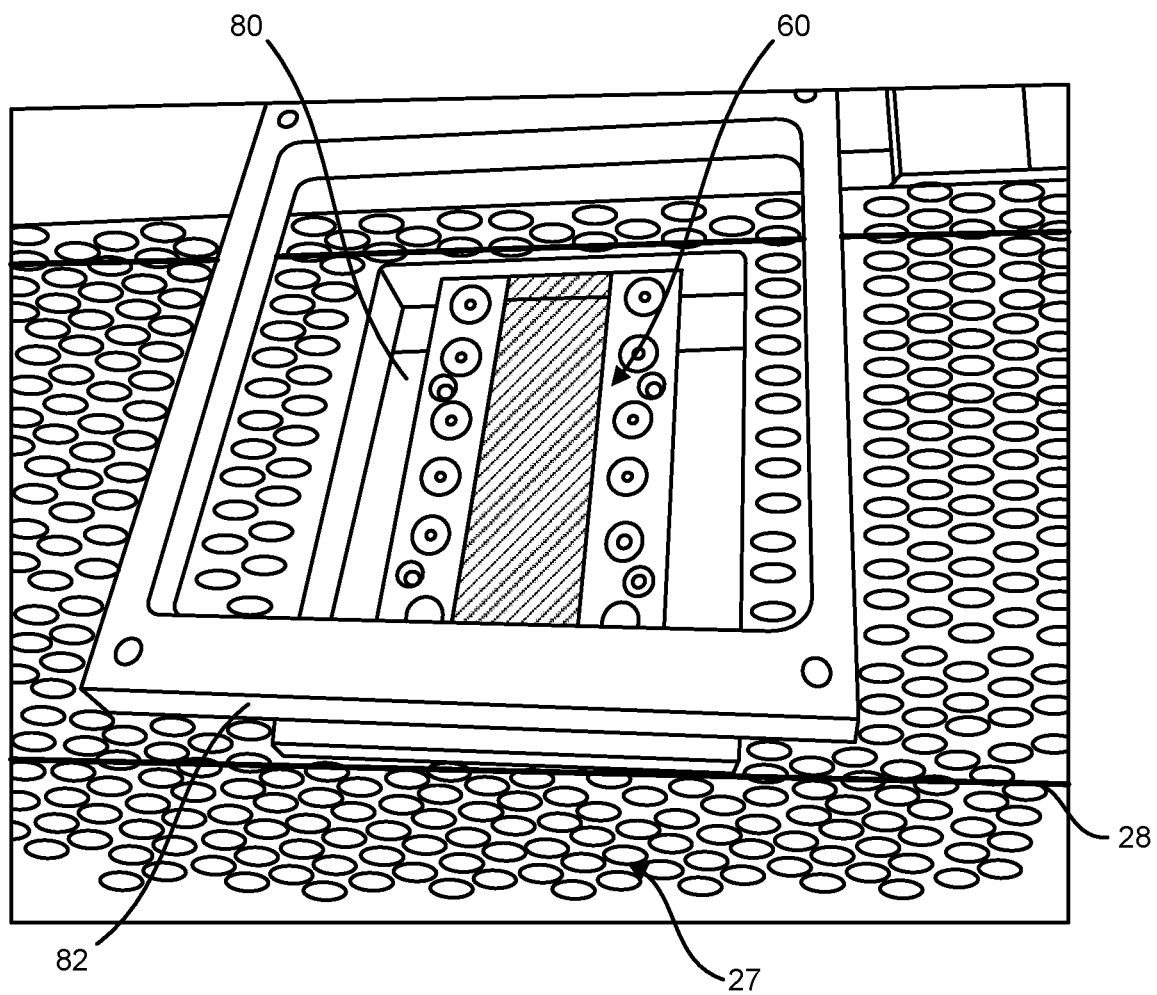
FIG. 11 is a perspective of the entrance window of the x-ray camera of the imaging assembly.
Figure 12:
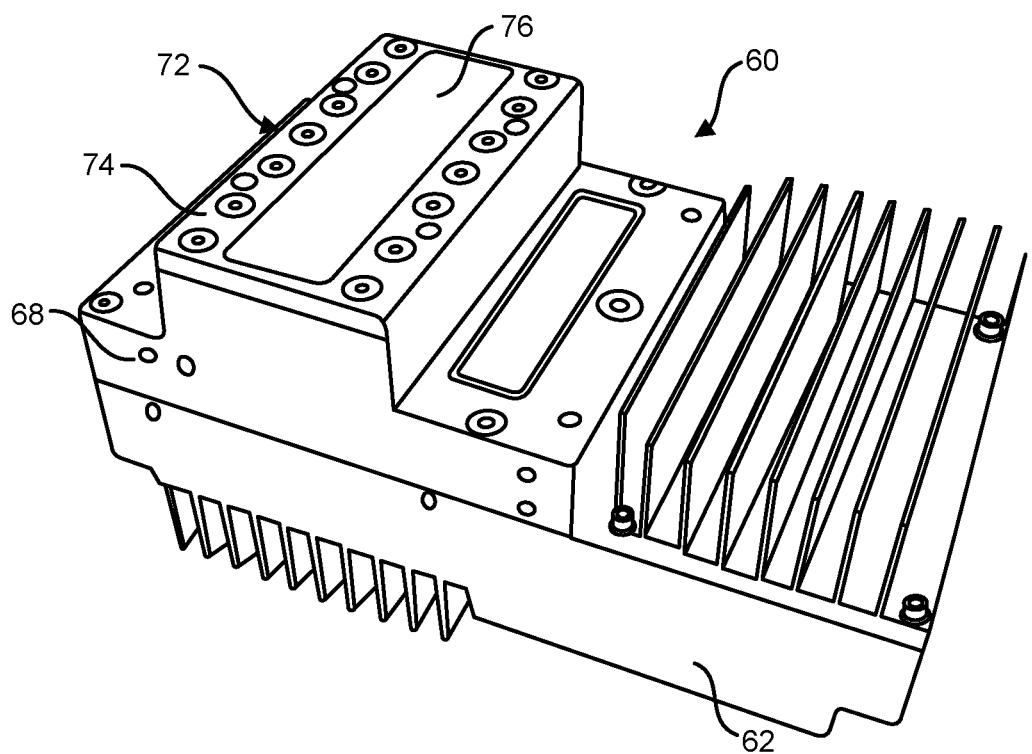
FIG. 12 is a perspective of an x-ray camera of the imaging assembly.
Figure 13:
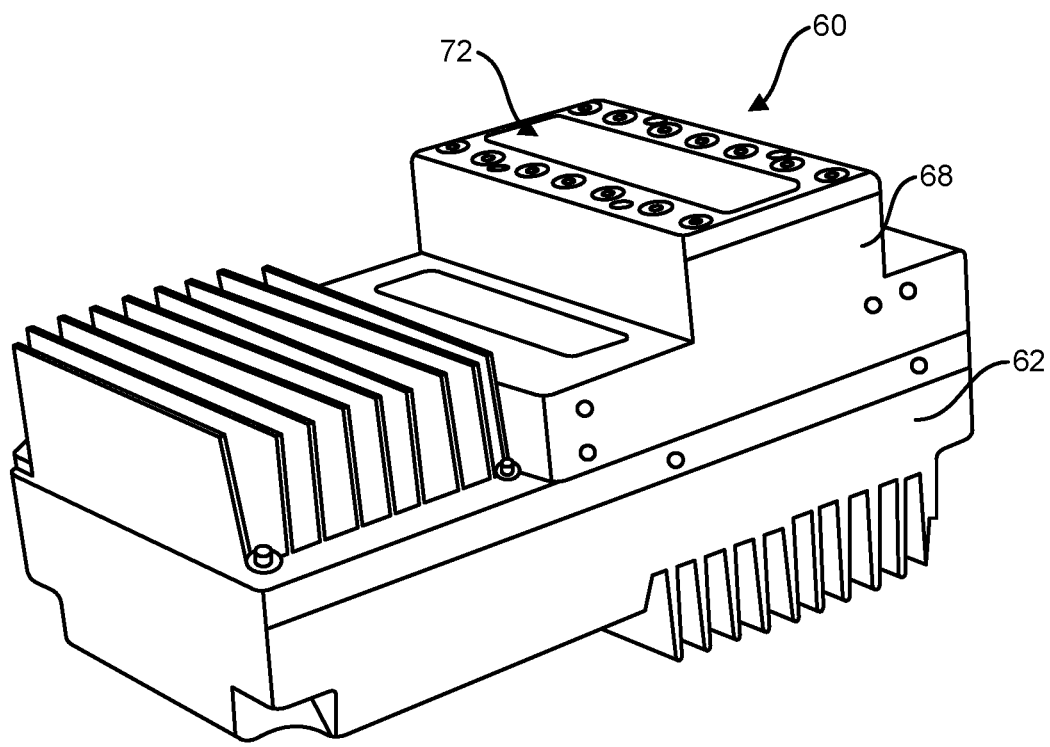
FIG. 13 is another perspective of the x-ray camera.
Figure 14:
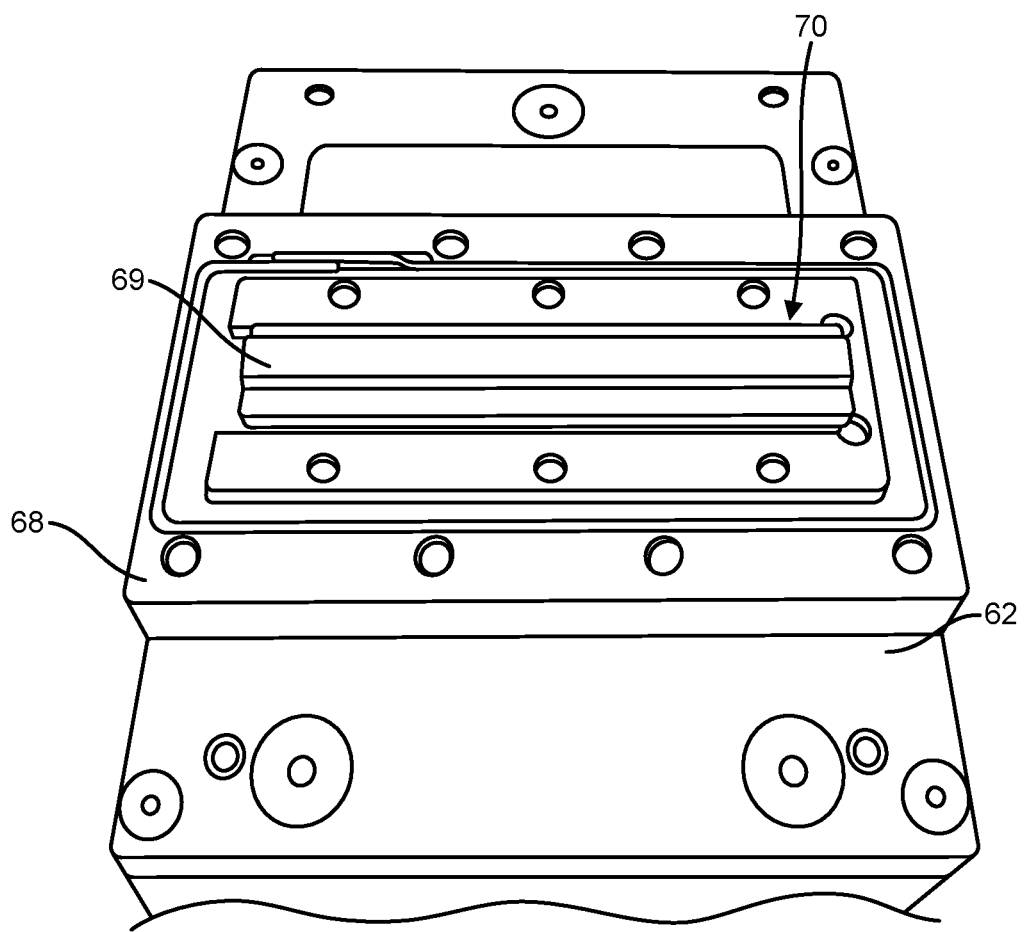
FIG. 14 is a fragmentary perspective of the x-ray camera with an entrance window of the camera removed showing a fiber-optic-scintillator.
Figure 14A:
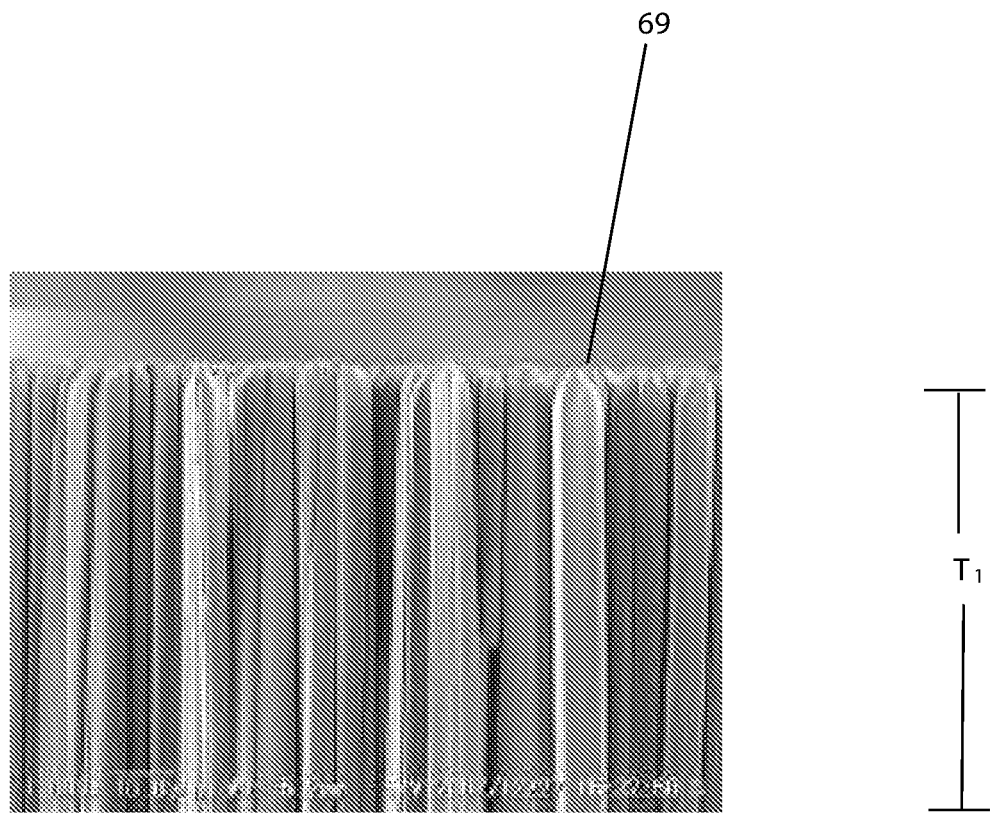
FIG. 14A is an enlarged fragmentary view of scintillator material on top of the fiber-optic-scintillator.
Figure 15:
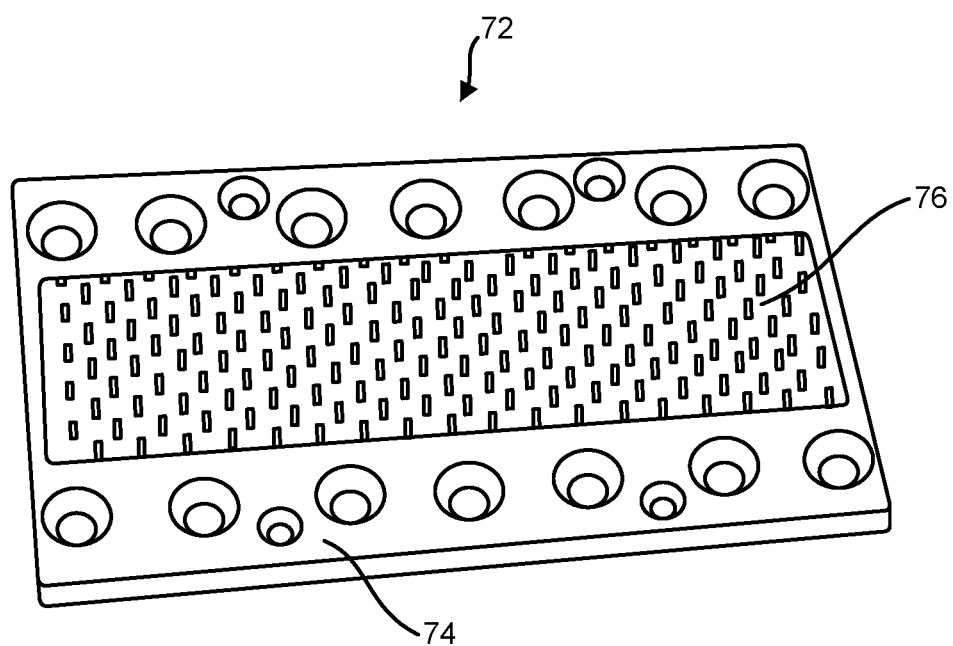
FIG. 15 is a perspective of the entrance window of the x-ray camera.

Referring to FIGS. 5-8, the load and transfer assembly 12 comprises a hopper (broadly, a seed loading station) 20 including an inlet 22 for receiving the seeds into the hopper and an outlet 24 for dispensing the seeds from the hopper. A vibratory feeder 25 and feeding chute 31 are disposed at the outlet 24 for dose feeding the seeds as they are dispensed from the outlet. A conveyor 27 (broadly, a seed transfer station) is located at an outlet of singulation feeder plate 26. The vibratory feed 25 comprises a first vibratory feeder 29 and the vibratory chute 31 associated with the first vibratory feeder. The first vibratory feeder 29 uses vibratory energy to transport the seeds along the vibratory chute 31 to the singulation feeder plate 26. A second vibratory feeder 33 is associated with the singulation feeder plate 26. The second vibratory feeder 33 uses vibratory energy to transport the seeds along the singulation feeder plate 26. The singulation feeder plate 26 comprises a plurality of parallel channels 35 extending along a length of the singulation feeder plate 26. The channels 35 arrange the seeds into a plurality of parallel rows for delivery to the conveyor 27 (FIG. 10). The vibratory energy also spaces the seeds from each other within the rows in the direction of movement so that each seed can be imaged by the imaging assembly 14. Each channel 35 has a slot 37 formed on both sides in the channel leaving a small section of material at the bottom of each channel for the seeds to traverse. Other slot configurations and arrangements are also envisioned within the scope of the disclosure. Each slot 37 is located over a seed collector 39. Excess seeds fall into the slots 37 and are captured by the seed collector 39 for delivery back to the hopper 20 as will be explained in greater detail below. In the illustrated embodiment, the singulation feeder plate 26 includes eight (8) channels 35. However, the singulation feeder plate 26 could have a different number of channels 35 without departing from the scope of the disclosure. In one embodiment, the singulation feeder plate 26 can have five (5) channels 35. Still other numbers of channels are envisioned.

The vibratory feed rates can be adjusted by the control system by varying the vibration amplitude and or frequency of the vibratory feeders 29, 33. Although vibratory feeders 29 and 33 are shown, it is envisioned that other methods for singulating the seeds can be used. In one embodiment, a singulation wheel (not shown) can be used. Additionally, a tracking sensor (not shown) can be located at an outlet of the singulation feeder plate 26.

The seeds collected by the seed collector 39 are sent through tubing 41 to a seed, air, and debris separator 43 under the pneumatic force of an air transvector 45. The seed, air and debris separator 43 comprises a body 52 having an inlet 47, an upper outlet 49 and a lower outlet 51. A pipe 53 is housed within the body 43. The tubing 41 introduces the seeds into the body 43 through the inlet 47. The seed, air and debris separator 43 uses mechanical and aerodynamic forces to divert seeds to the lower outlet 51 and air and debris to the upper outlet 49. The forces cause the seeds to spin around the separator 43 and down the body 52 to the lower outlet 51. Air and debris is captured in the pipe 53 and upwardly directed out of the upper outlet 49. The lower outlet 51 drops the seeds into the hopper 20 for again being handled by the load and transfer assembly 12. A second air transvector (not shown) may be disposed at the upper outlet 49 to balance the air flow in the debris separator 43 so that there is substantially no air outflow at the lower outlet 51.

In the illustrated embodiment, the conveyor 27 comprises a belt 28 defining a flat horizontal conveyor transport surface. The conveyor 27 provides a flat surface for the seeds to rest as they are delivered through the system 10. In one embodiment, the conveyor 27 can include a long plate, on which the belt 28 can be secured, and the material of the long plate would be such that the belt 28 would be able to remain flat and cause minimal friction/wear to the belt (e.g. made of stainless steel or chrome). As a result, the system 10 is able to fully control the travel of each seed through the system and therefore better track the position of the seeds as they move on the conveyor 27 because the seeds will remain in a substantially fixed orientation and position on the conveyor. The actual position of the center of gravity of each seed is determined by the image acquisition assembly 14 (e.g. x-ray camera). In one embodiment, the x-ray camera 60 is a line scan camera. The line scan camera 60 has a single row of light sensitive pixels that scan moving objects capturing "lines" of the object. Knowing the rate that the object is moving allows the camera 60 to piece the lines together to form a complete picture of the object. By controlling and tracking both the line scan rate and spatial resolution of the image acquisition assembly 14 and the rate of movement of the conveyor 27, the actual position of each seed can be calculated. In one embodiment, a high precision encoder is incorporated into the system 10 to track the position of the conveyor 27. The encoder may also act as a master timing device to trigger the imaging assembly 14 to acquire their images. As will be explained in greater detail below, the flat surface allows for more accurate measurements to be acquired by the imaging assembly 14. It should be noted that the conveyor 27 does not need to include a flat surface, and needs to only have a surface along which the belt 28 carrying seeds can travel.

The conveyor 27 typically operates between about 10-110 mm/sec. and may also be a high-speed conveyor capable of operating at speeds of up to about 40 in/sec and above. For vegetable seeds, the conveyor 27 may operate at a speed of between about 10-100 mm/sec. In one embodiment, the conveyor operates at a speed of about 55 mm/sec for vegetable seeds. This yields an imaging rate of about 3024 $mm^2$/sec at a 14 micron sensor pixel resolution. However, the speed can range from 10-1000 mm/sec. Increasing the conveyor speed increases a pitch distance between the seeds in the direction of movement of the belt 28 or allows for higher seed rates when the pitch distance between seeds is kept constant. The conveyor 27 can deliver the seeds through the system 10 at a rate of typically between about 30 and about 60 seeds/sec at a typical scan width of about 50 mm (2 inches) to about 90 mm (3.5 inches). In one embodiment, the conveyor 27 is operated at a speed of about 55 mm/sec with a matching scan width of about 55 mm (2.2 inches). If desired, the scan width can be increased by using a wider TDI-sensor in the x-ray camera and/or optical fiber taper in the camera. Alternatively, increasing the area that can be imaged every second could be caused by increasing the belt 28 speed. Multiple x-ray cameras placed side by side may also be used to increase the scan width. The speed of the belt 28 may be controlled by the controller 18.

In one embodiment, the conveyor belt 28 is optically transparent. The transparent nature of the conveyor belt 28 allows for optical imaging from underneath the conveyor to be performed, as will be explained in greater detail below. However, the conveyor can be translucent or semi-transparent without departing from the scope of the disclosure. In one embodiment, the belt 28 is formed from Mylar®. Mylar® is a brand name for biaxially-oriented polyethylene terephthalate and is a polyester film made from stretched polyethylene terephthalate (PET). Thin film Mylar® is used and has typical low-attenuation properties for low energy (5-50 keV typical) x-ray photons as used in this invention. Other materials including optically and x-ray transmissive materials are also envisioned without departing from the scope of the disclosure. The conveyor may also be non-transparent without departing from the scope of the disclosure. A coating may also be applied to the belt 28 of the conveyor 27. The coating may be configured to have anti-static and scratch resistant properties which can help keep the belt 28 clean and free of marks which can impair the ability of the imaging assembly 14 to acquire clear images. Additionally or alternatively, a plurality of ionizers (not shown) or conductive brushes (not shown) may be provided to dissipate static charges on the system 10 to reduce adherence of fine particulate matter on the conveyor 27. Dissipation of static charge is necessary to avoid seeds moving around on the belt 28 and/or staying attached to the belt 28 at the end of the horizontal plane of the belt 28. Alternatively, or at the same time, static charge may be minimized or reduced through the maintenance of an elevated humidity above fifty five percent (55%).

Referring to FIGS. 9-16B, the imaging assembly 14 comprises an x-ray camera 60 mounted below the conveyor surface for acquiring x-ray images of the seeds. In one embodiment, the x-ray camera 60 comprises a high efficiency, low-energy, sensitive x-ray TDI camera (e.g., 10-50 KeV). TDI (time, delay and integration) technology is based on the concept of accumulating multiple exposures of a moving object, effectively increasing the integration time available to collect incident light or photons. The construction of the x-ray camera 60 allows for the system to acquire high quality images while operating at high imaging speeds.

Standard x-ray cameras may have imaging sensitivities that are too low to accommodate imaging seeds with useful information quality on the moving conveyor 27 at the belt speeds and scan widths utilized in the system. Additionally, the high efficiency design of the x-ray camera 60 eliminates the need to run an x-ray tube at maximum power settings at a required kV setting which prolongs the lifespan of x-ray tubes in the camera. In one embodiment, the lifespan of the x-ray tube is greater than about 10,000 hours.

Figure 16:
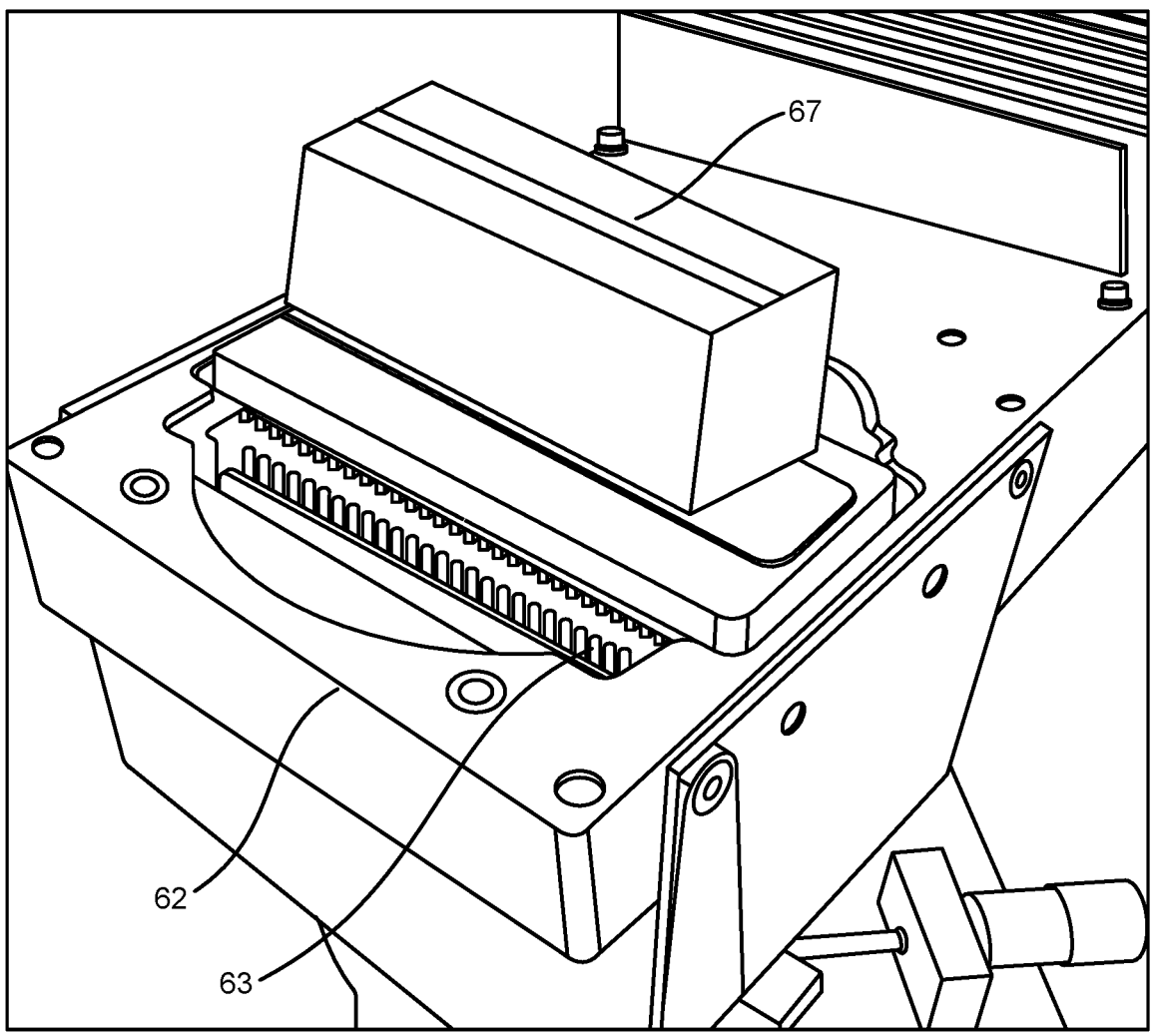
FIG. 16 is a fragmentary perspective of the x-ray camera with a cover and fiber-optic-scintillator removed showing a fiber optic of the camera.
Figure 16A:
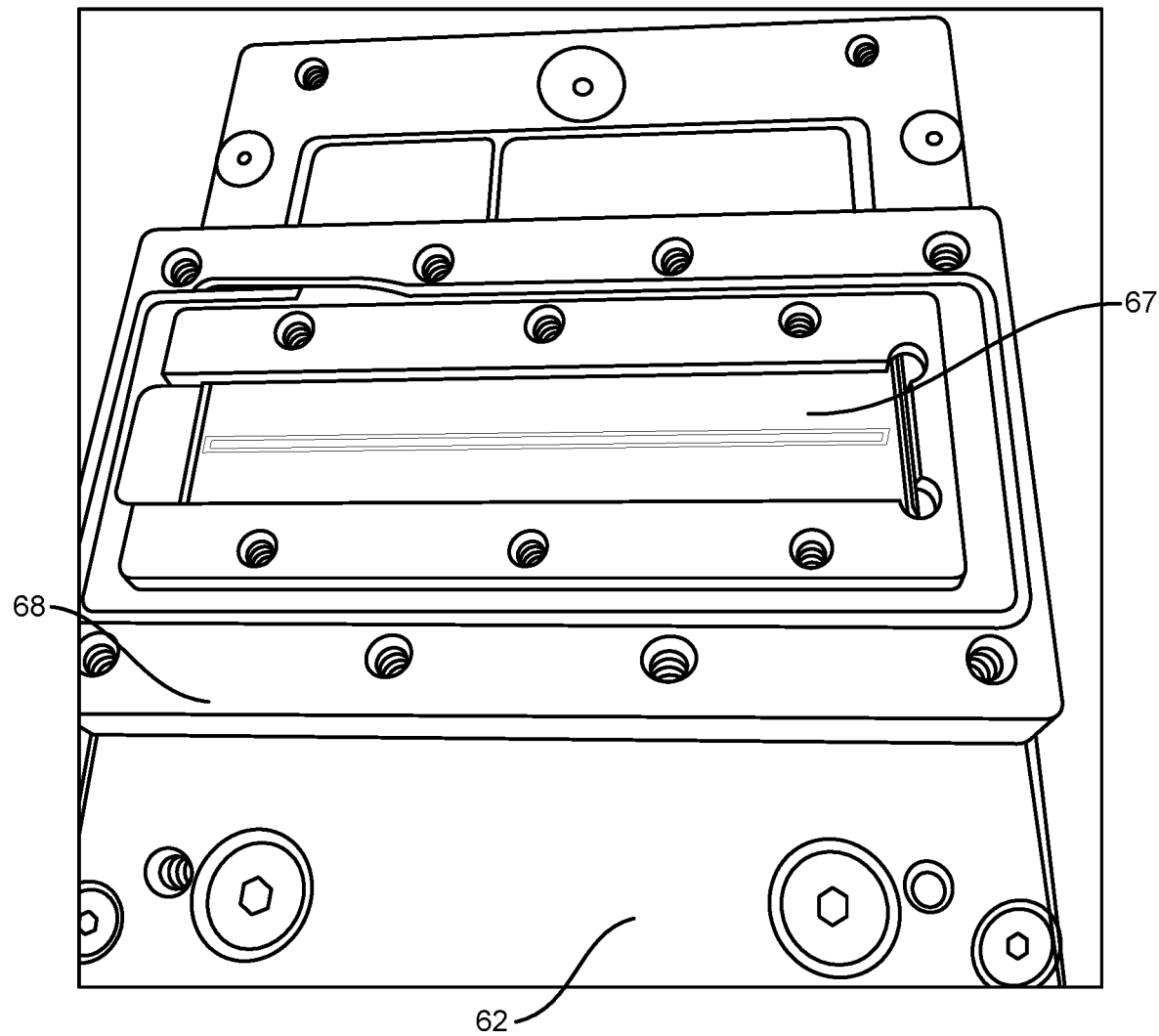
FIG. 16A is a fragmentary perspective of the x-ray camera with the entrance window and fiber-optic-scintillator removed showing the fiber optic of the camera.
Figure 16B:
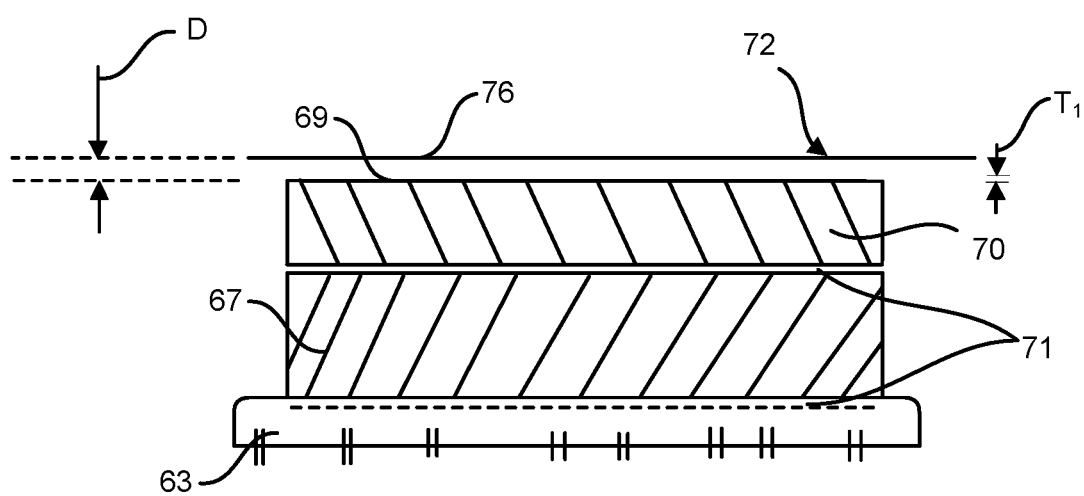
FIG. 16B is a schematic illustration of the x-ray camera.

The x-ray camera 60 comprises a housing 62 and a TDI CCD sensor 63 partially contained within in the housing. The sensor 63 is operatively connected to circuitry (not shown) within the housing 62. As can be seen in the FIGS. 16-16B, the sensor 63 is raised so that a portion of the sensor extends above a top surface of housing 62. A fiber optic 67 is mounted on top of the CCD sensor 63. The fiber optic 67 is mechanically and optically coupled to the sensor 63. In the illustrated embodiment, the fiber optic 67 is comprised of multiple vertically oriented fiber optic strands. The fiber optic is configured in a block of optical fibers fused together. In one embodiment, each individual fiber diameter is about 10 micrometers. In one embodiment, the fiber optic 67 is as a fiber optic face plate (FOFP). A fiber optic face plate is a coherent multi-fiber plate, which acts as a zero-depth window, transferring an image pixel by pixel (fiber by fiber) from one face of the plate to the other. A fiber-optic-scintillator 70 is mounted on and optically coupled to the fiber optic 67. A customized scintillator material 69 is placed/growing on top of the fiber-optic-scintillator 70 (FIG. 16B). The scintillator 70 may be directly placed on the fiber optic 67 or on a second fiber optic (not shown). In one embodiment, the scintillator material 69 has a thickness $T_1$ of between about 10 micrometer and about 500 micrometer. In one embodiment, the scintillator material has a thickness $T_1$ of about 55 micrometers (FIG. 16B). The fiber-optic-scintillator 70 is mechanically and optically coupled to the fiber optic 67. In one embodiment, optical oil 71 (FIG. 16B) is disposed between the fiber optic 67 and the fiber-optic-scintillator 70. In one embodiment, optical oil 71 may be disposed between the fiber optic 67 and the sensor 63.

A camera body 68 is mounted on top of the housing 62 and attaches the fiber-optic-scintillator 70 on top of the fiber optic 67 such that the fiber-optic-scintillator 70 is mechanically and optically coupled to the fiber optic 67. The fiber-optic-scintillator 70 is configured to convert x-ray photons into visible light photons. The visible light photons travel down the fiber-optic-scintillator 70 into the coupled fiber optic 67 and on to the optically coupled TDI-CCD sensor 63. The body 68 also encloses the fiber-optic-scintillator 70 thus forming a part of the housing structure for the camera 60. An entrance window 72 is attached to the camera body 68 and covers the fiber-optic-scintillator 70. In the illustrated embodiment, the entrance window 72 comprises a frame 74 and a thin carbon fiber sheet 76 supported by the frame. The entrance window 72 also forms part of the housing structure for the camera 60. The fiber-optic-scintillator 70 and fiber optic 67 are designed and manufactured to optimize image sharpness, sensitivity, photon-efficiency, decay and afterglow. Although the camera 60 is shown having multiple housing components, the camera could be formed with a single housing structure. Additionally, the housing components could have different constructions without departing from the scope of the disclosure.

In one embodiment, the fiber-optic-scintillator 70 can be coated with 55 micron columnar CsI:Tl (Cesium Iodide, activated with Thallium) as the scintillator material 69. In one embodiment, the fiber-optic-scintillator 70 can be coated with $Gd_2O_2S$: Pr, Ce, F as the scintillator material 69. Additionally, by designing a scintillator 70 with reduced thickness, the x-ray tube 81 can be run more efficiently at a higher kV setting as part of the high energy photons in the emitted photon energy spectrum will not be converted, or just partially converted, in the scintillator material 69.

The camera 60 improves upon the construction of standard x-ray TDI cameras by incorporating the fiber optic 67 and the fiber-optic-scintillator 70 on the raised TDI CCD sensor 63. The scintillator material 69 on top of the fiber-optic-scintillator 70 is located much closer to the conveyor belt 28 than would be possible with a standard x-ray TDI camera that mounts the scintillator at a greater distance from the entrance window. Thus, the scintillator 70 and the fiber optic 67 allow the sensor 63 to be recessed, while providing the same effect of having the sensor close to the belt/seeds. The entrance window 72 including the thin carbon fiber sheet 76 also facilitates placement of the scintillator 70 and scintillator material 69 as close to the conveyor belt 28 as possible by reducing the thickness of the materials and air gaps between the scintillator and the conveyor belt where the seeds are located. In one embodiment, the thickness of the carbon fiber sheet 76 is 0.2 mm (0.01 inches), and a distance D of the scintillator 70 to the carbon fiber sheet 76 is about 0.6 mm (0.02 inches), while at the same time, the thickness of the conveyor belt 28 is about 0.1 mm (0.004 inches).

Arranging a camera 60 in close relation to the conveyor belt has benefits when considering photon flux, geometrical (un)sharpness, and geometric magnification. Photon flux is a measure of the photons per square meter per second emitted by an x-ray tube. Therefore, photon flux is a function of the measurement distance from the focal spot of the x-ray tube. Geometrical (un)sharpness is a function of: the distance from the x-ray tube focal spot to the object (seed), the distance from the object to the scintillator and a function of the x-ray tube focal spot size. Geometric magnification is the ratio of the 'distance from the x-ray tube focal spot to the object (seed)' to the 'distance from the object to the camera scintillator' and is in this embodiment only about factor 1.01. Unsharpness is the loss of spatial resolution in a radiographic image. There are generally considered to be three types of unsharpness: geometric unsharpness, motion unsharpness and photographic or system unsharpness. Geometric unsharpness is caused by aspects of the geometry of the x-ray beam. Two principal factors come into play simultaneously: the apparent focal spot size and the ratio between object-film distance (OFD) and focus-film distance (FFD). Fine focal spot sizes will minimize geometric unsharpness, and therefore give more detailed images. Keeping the ratio FFD:OFD high will minimize geometric unsharpness. This is most easily done by keeping the OFD to a minimum, i.e., keeping the part of the object being x-rayed as close to the detector as possible. If this is not possible however, then increasing FFD beyond the normal 100-110 cm will be necessary to keep the unsharpness level acceptable.

Configuring the camera 60 so that the scintillator 70 and scintillator material 69 can be mounted close to the conveyor belt 28 allows for the use of an x-ray tube 81 with a larger focal spot size (e.g., 1.0 mm×1.0 mm or larger) without causing detrimental image unsharpness. A larger focal spot enables higher photon fluxes which speed up the imaging rate of return. As a result, a higher amount of discrete photons per second are emitted by the x-ray tube 81. Using an x-ray tube with this size focal spot with a standard x-ray TDI camera to image seeds on the moving conveyor belt 28 would compromise the geometrical sharpness of the x-ray images. This is because a large focal spot leads to more geometrical unsharpness. The present disclosure locates the camera scintillator very close to the seed, resulting in a very low magnification. This allows the use of x-ray tubes with relatively big focal spot (relative high power output) while keeping the geometrical unsharpness within an acceptable range.

In one embodiment, the distance between the conveyor belt 28 (seeds) and the focal spot of the x-ray tube 81 is about 130 mm (5 inches). As indicated above, the x-ray camera entrance window 72 is mounted close to the conveyor belt 28. In one embodiment, the x-ray camera fiberoptic-scintillator 70 is spaced between about 0.4 mm (0.01 inches) to about 10 mm (0.4 inches) away from the conveyor belt 28. In one embodiment, the indicated distance is 0.7 mm (0.03 inches). Mounting the x-ray camera scintillator 70 close to the seed carrying conveyor 27 belt 28 allows the camera to use x-ray tubes with a larger focal spot size without compromising the geometrical sharpness of the x-ray images. A larger focal spot enables higher photon fluxes which speed up the imaging rate and/or allows the given x-ray tube to operate below maximum power settings which in return greatly extends the tube lifespan.

Image quality is further optimized by synchronizing the scan width of the camera 60 to the movement of the seeds on the conveyor 27. Thus, the rate of the line scan of the camera 60 is matched to the speed of the conveyor 27 so the true shape and configuration of the seeds are captured by the camera as the seeds travel along the conveyor. For example, synchronizing the line scan rate with the conveyor speed ensures that a round seed will be imaged as a round seed and not as an oval or oblong seed because of the line scan rate of the camera being too slow or too fast. Because shape and overall seed configuration are important to the classification decisions made by the system, having a camera 60 that can produce x-ray images that accurately capture the seeds construction is important to generating a reliable seed classification model.

A filter 80 is disposed between the x-ray camera 60 and an x-ray tube 81 above the filter. A frame 82 mounted above the conveyor belt 28 holds the filter 80. In one embodiment, the filter comprises the same material and has the same thickness as the belt 28. As will be explained in greater detail below, film in scantrays 90 are also comprised of the same material and have the same thickness as the belt. The filter 80 is automatically controlled by the controller 18 and is moved out of view of the x-ray camera 60 during imaging of the scantrays 90 and is moved into view during imaging of seeds that are directly positioned on the conveyor belt 28 (e.g. during seed sorting).

To maintain accuracy and repeatability of the x-ray images, provisions for checking the proper functionality and calibration of the camera can be added to the system 10. This calibration would include zero light entering the camera, allowing calibration of the camera to zero settings. Next, the filter 80 in frame 82 is a time-stable reference sample to include x-ray transmission standards. These standards may also include x-ray targets (e.g., a variable thickness sample object from synthetic material). The standards can be imaged at periodic intervals (e.g., start of each batch) and imaging processing methods will be used to check the status of the imaging hardware and perform all necessary camera corrections. In another embodiment, the calibration of the camera may be accomplished automatically. To automatically calibrate the camera, the system would inhibit or prevent further seeds from feeding onto the belt, and the belt would move until all seeds are clear from the belt. Thereafter, the camera would automatically calibrate based on measurements from the belt with no seeds while the belt is moving. The moving belt would allow for the system to average out any imperfections in the belt.

In the illustrated embodiment, the system 10 includes retractable x-ray shielding doors 102 for protecting operators from exposure to x-rays.

Figure 17:
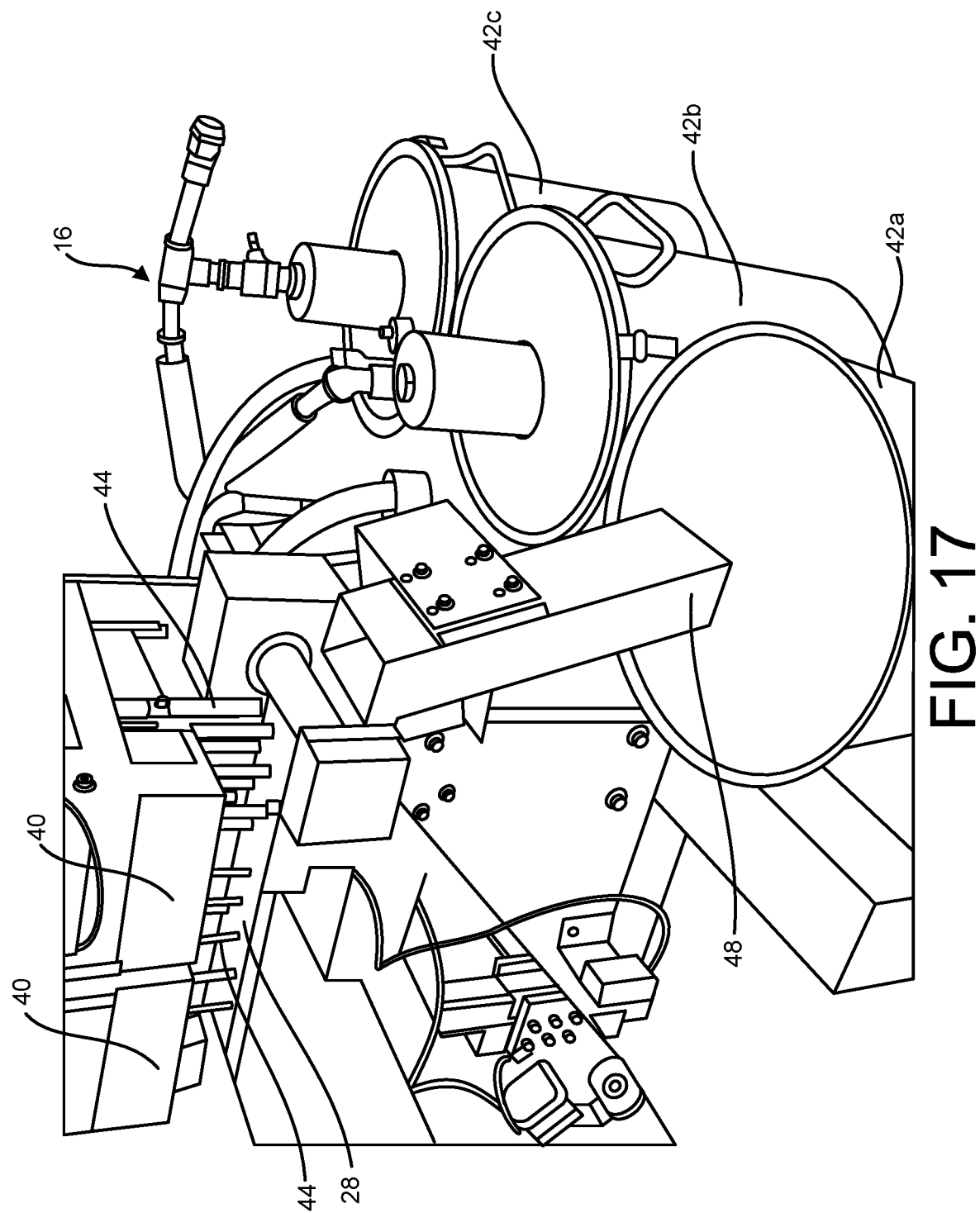
FIG. 17 is a perspective of a sorting assembly of the seed sorting system including three sorting bins.
Figure 18:
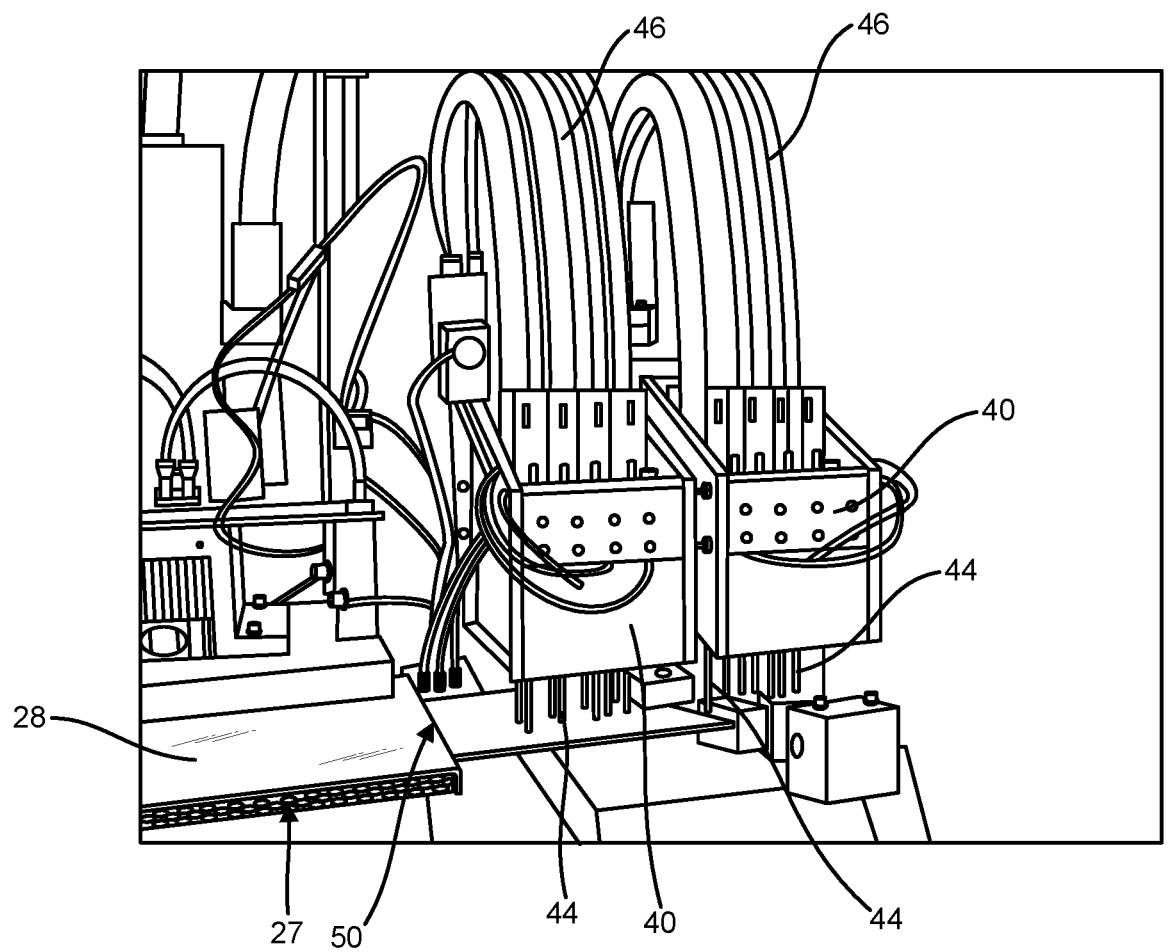
FIG. 18 is a fragmentary perspective of the sorting assembly.
Figure 19:
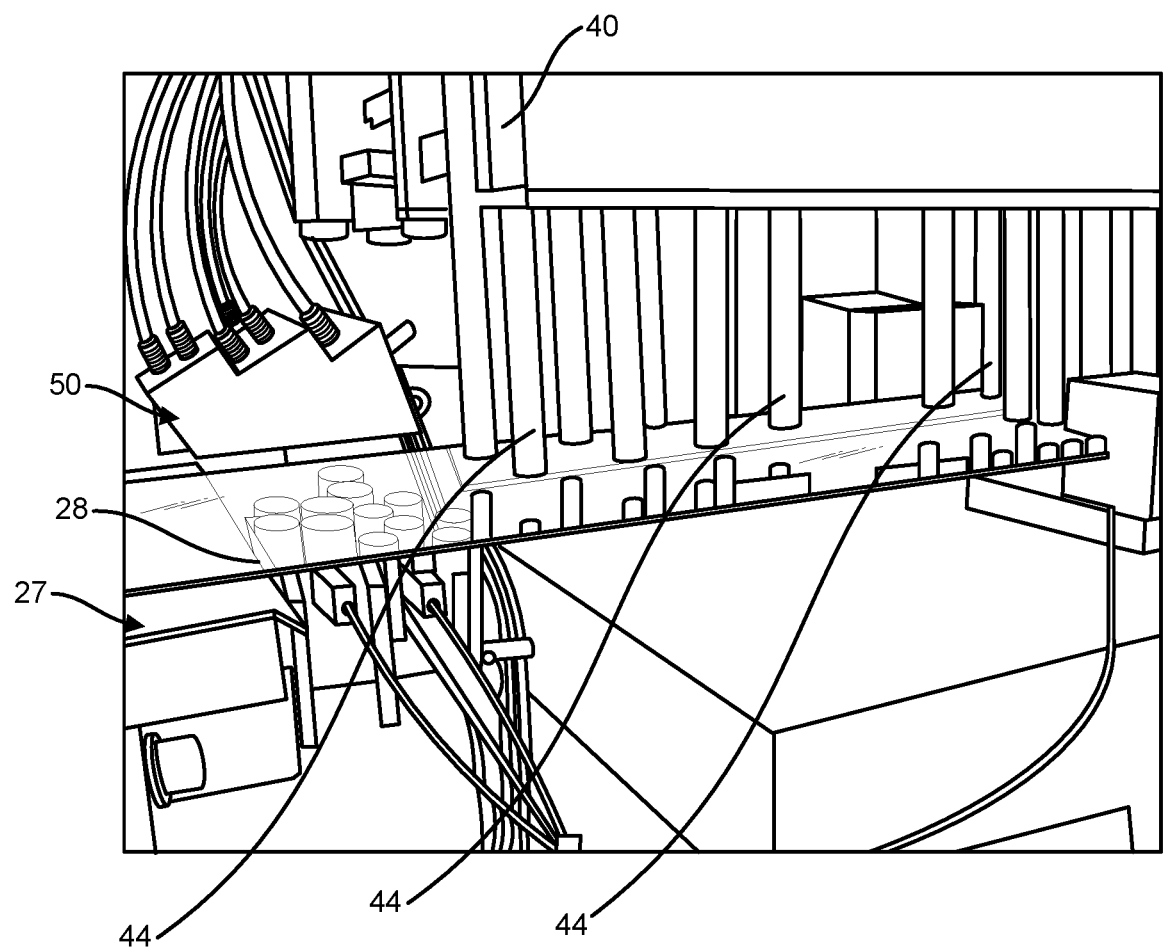
FIG. 19 is another fragmentary perspective of the sorting assembly.

Referring to FIGS. 17-19, the sorting assembly 16 comprises a pair of sorting modules 40 and a plurality of sorting bins 42 located at an end of the conveyor 27 for sorting the seeds into at least two different categories based on the measurements obtained by the imaging assembly 14 and controller 18. In the illustrated embodiment, three sorting bins 42 are shown. The sorting modules 40 each include multiple vacuum nozzles 44 in fluid communication with a vacuum source for sucking up the seeds as they are transported along the end of the conveyor 27. In this embodiment each sorting module includes 8 sorting nozzles. This number of sorting nozzles corresponds with the number of individual channels in the singulation feeder plate. In this embodiment, the sorter has 2 sorting modules in series. This enables the system to classify and sort seeds from a batch into 3 separate fractions. Seeds that are not sucked up by the sorting modules 40 are allowed to travel to the end of the conveyor 27 where they are dropped into a first sorting bin 42a. The vacuum suction of the sorting modules 40 is used to remove selected seeds from the conveyor belt 28 and send them to second and third sorting bins 42b, 42c. In one embodiment, the system can be equipped with one sorting module only. The number of vacuum nozzles correspond to the number of channels in the singulation feeder plate and may be increased in number by deployment of a wider conveyor belt system and in correspondence with a wider singulation feeder plate hosting more than 8 channels. In one embodiment, when sorting tomato or tomato rootstock seeds, the system may be equipped with an 8 channel singulation feeder plate and 8 nozzles per sorting module. In another embodiment, when sorting pepper seeds, the system may be equipped with 5-6 channel singulation feeder plates 26 and a corresponding number of nozzles.

As previously mentioned, the seeds can be tracked by synchronizing the camera trigger and motion control of the conveyor 27. This can be done by synchronizing the line scan width (in belt travel direction) with an actual spatial displacement from one line scan to the next line scan. In another embodiment, seeds may be tracked by a light gate 50. Referring back to FIGS. 18 and 19, a light gate 50 is configured to detect the presence and timing of seeds at a determined position. The number of channels in the singulation feeder plate 26 matches with the number of light sensors in the light gate. The system 10 can track the path of the seeds and predict when the seeds will be in registration of the corresponding light sensor in the light gate. Therefore, the system 10 can predict the location of each seed as it travels on the conveyor 27. Any deviation between the predicted position of a seed with the actual timing at the corresponding light sensor may be used to correct the calculated timepoint for the corresponding vacuum nozzle to eject downward. This information may be used by the controller 18 to instruct the operation of the vacuum nozzles 44 of the sorting modules 40. The seed position information from the light gate 50 can also be used to compare the detected position of a seed with the expected position of the seed, and the time delay associated with the difference in position can be used to adjust the firing of one or more vacuum nozzles 44 that correspond with the channel (seed line) for that particular seed. The system can also check if a detected seed in the x-ray image data is also physically detected by the light gate 50 within a certain spatial window. This can be cross-referenced to verify that corresponding image, position and classification data is saved to the system. The system can also check if a seed detected by the light gate 50 is also present in the data queue and if the virtual data position is sufficiently aligned with the actual time and point of physical detection by the light gate. Additionally, the position data can be used to check if the image data is fully aligned with each seed on the conveyor belt 28. In one embodiment, the belt 28 may be made of a material which has scratches all over the surface and the light gate 50 would be calibrated to ignore the belt scratches. This would help prevent errors from occurring where the light gate 50 misreads a scratch in a clear belt. Even without signal data from the light gates, the system will keep working as the virtual (predicted position and quality classification) data of each seed allows the sorting nozzles to operate at the right moment and place.

It is envisioned that alternatively to the use of described light gates (that rely on the principle that a seed passing the light gate interrupts the light transmission between a transmitter and receiver) a so-called laser profilometer may be used to detect the presence, position and timing of each seed. This allows single sided sensor detection and does not require the belt material to be optically transparent. Alternatively, a line scan camera may be used as another option.

In one embodiment, the sorting modules 40 each include eight (8) vacuum nozzles 44. However, a different number of vacuum nozzles is envisioned without departing from the scope of the disclosure. The array of vacuum nozzles 44 is provided in an adequate number and arrangement to locate the vacuum nozzles 44 in position to accommodate the placement of the seeds on the conveyor 27. The vacuum nozzles 44 are individually actuated (fired/ejected) by means of an electromechanical actuator (e.g., solenoid), to travel the vacuum nozzle 44 downward to a seed to vacuum suck the seed. This seed is then transported through hoses and other means into a sorting bin. The vacuum pressure of the vacuum nozzles 44 can be regulated as needed.

In the illustrated embodiment, there are two (2) sorting modules 40 selectively positioned for sorting the seeds into three (3) sorting bins 42. A first sorting bin 42*a* is located at an outlet of the conveyor 27. Thus, if a seed is not redirected by the sorting modules 40, the seed will land in the first sorting bin 42*a* as a result of the natural trajectory of the seed leaving the conveyor 27. In one embodiment, a seed guide 48 directs the seeds into the first sorting bin 42*a*. The second and third sorting bin 42*b*, 42*c* are located next to the first sorting bin 42*a*. Tubing 46 connects the vacuum nozzles to the second and third sorting bins 42*b*, 42*c*. It will be understood that additional sorting modules could be used for sorting the seeds into more than three bins. The sorting modules could also be used to sort the seeds into only two bins. It is also envisioned that a different type of sorting assembly can be used without departing from the scope of the disclosure.

Figure 20:
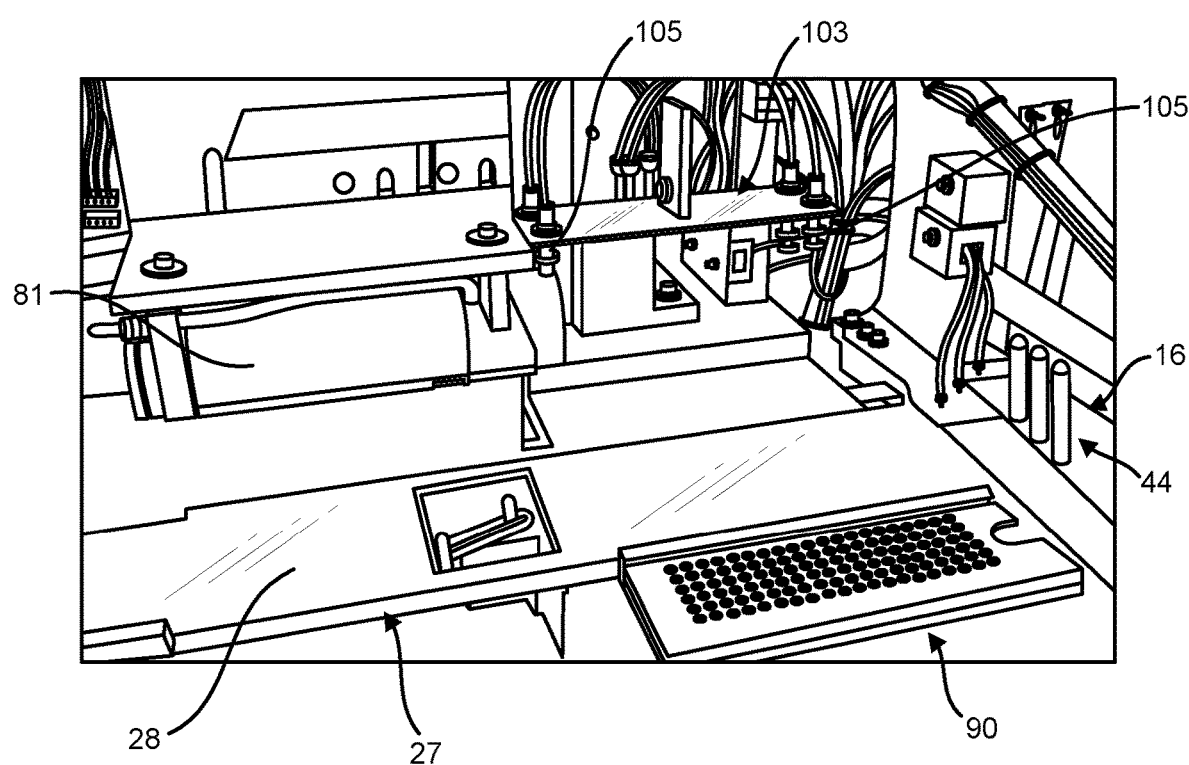
FIG. 20 is a perspective of the seed sorting system and a scantray handling assembly.
Figure 21:
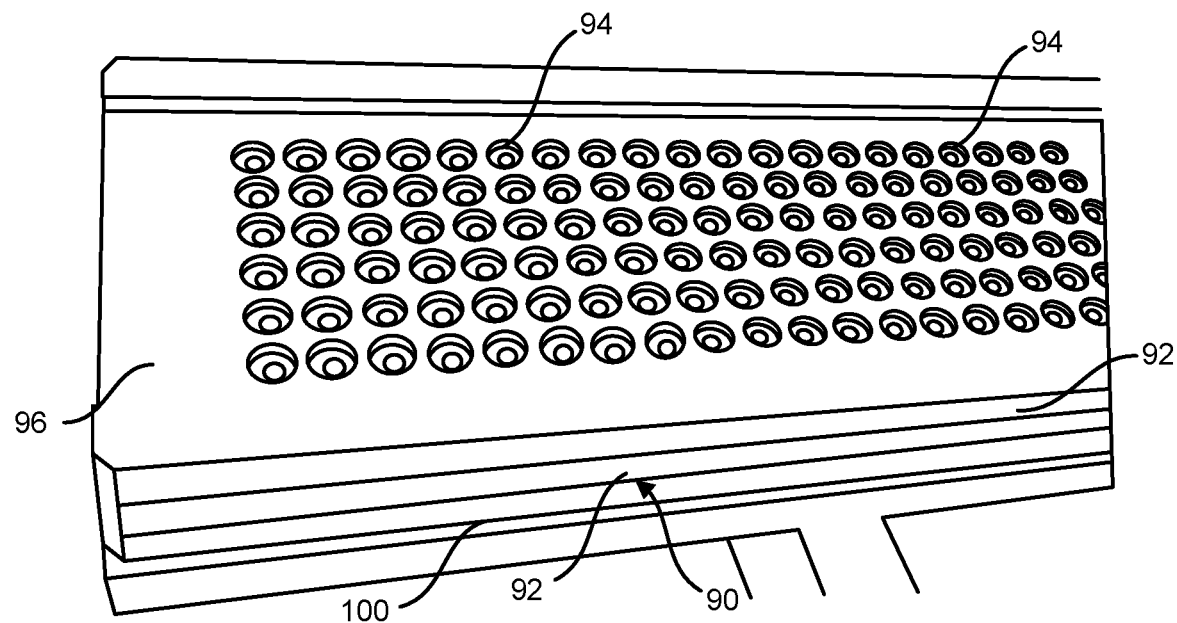
FIG. 21 is a fragmentary perspective of a stack of scantrays with seeds loaded in the top scan tray.
Figure 22:
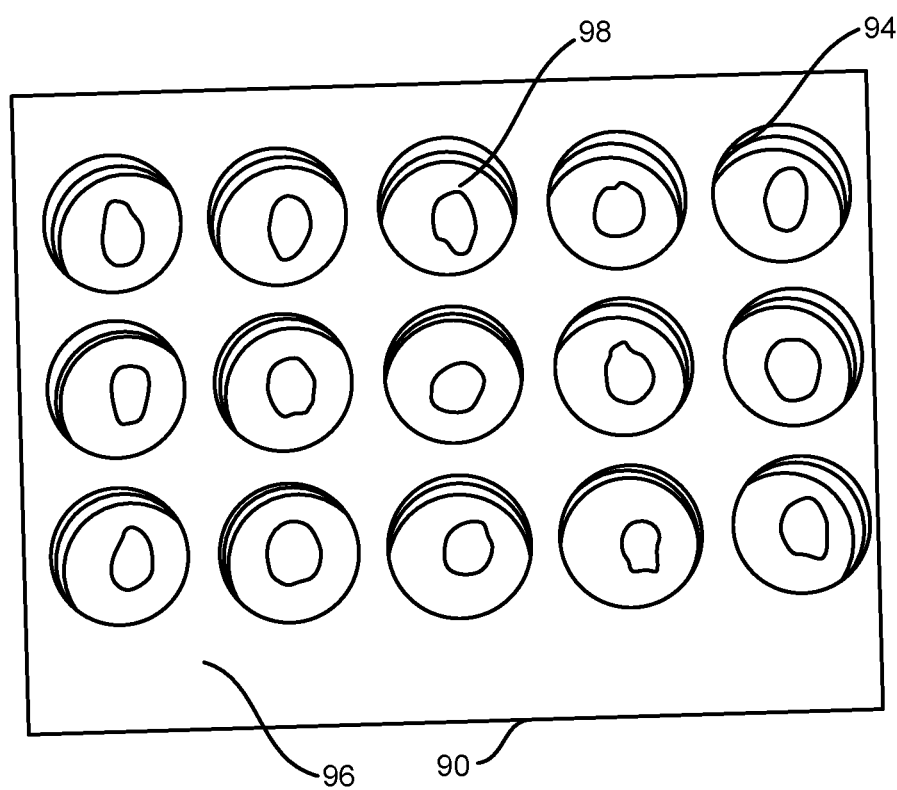
FIG. 22 is a fragmentary perspective of a scantray.

Referring to FIGS. 20-22, prior to actual x-ray sorting of a particular seed batch, sample images are taken to train a customized classification model. This starts with imaging a group of individual seeds from a sample and measuring a range of numeric image features. Seed or seedling quality data is added to this feature file to create a training set for the related seed batch. A machine learning algorithm is used to build an optimal classification model from this training set. For example, a Logit Boost machine learning algorithm could be used to build an optimal classification model from the training set. Analysis of the cross validated results is used to set the required operational point probability (p) threshold for the model. The p-threshold point also defines expected performance parameters as: output quality, recovery rate and reject percentage. At the time of actual sorting of the batch, the trained model and specified p-threshold are set into the system 10. As no quality parameters from the accept and reject fractions are available during sorting, the only remaining parameters which can be monitored are the p-value histogram and actual reject percentage. For best sorting performance, a custom training set should be created and used for building a classification model for each commercial seed batch. It is also envisioned that generic classification models (not requiring creation of a training set for each seed batch) can be deployed. Other classification algorithms are also envisioned.

Figure 21A:
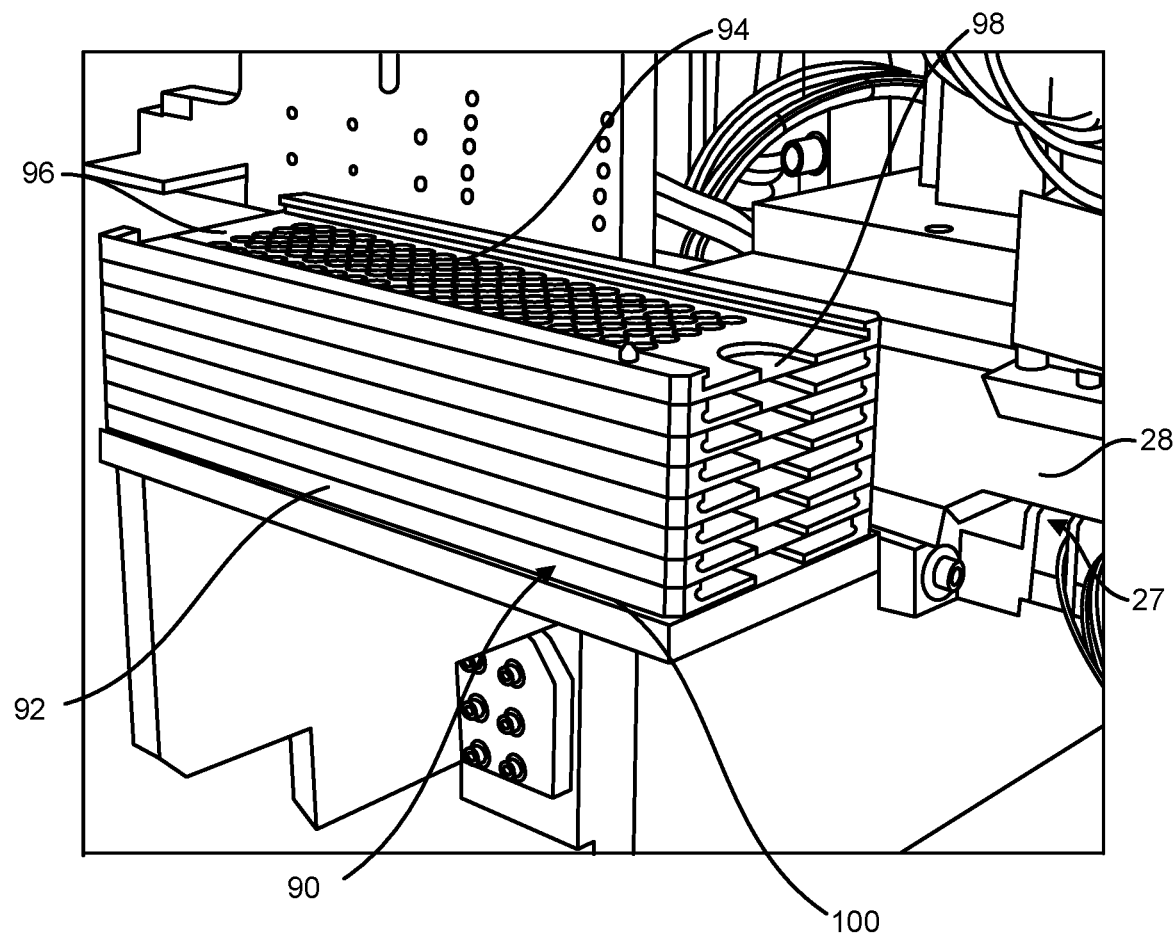
FIG. 21A is a perspective of a stack of scantrays.

One process for performing this training procedure is described below. First, seeds in a batch are loaded into individual scantrays (90) and individually loaded scantrays are stacked and placed in the system (10) through opening of the x-ray shielding doors. In one embodiment, multiple scantrays are loaded with seeds. A stack of three (3) scantrays is shown in FIG. 21 and a stack of eight (8) scantrays is shown in FIG. 21A. Each scantray is stacked with another scantray by using locating pins, which align the scantrays. A training set may have a stack of twelve (12) scantrays. Each scantray 90 comprises a body 92 having a plurality of circular holes 94 formed in a top surface 96 of the body. In one embodiment, the body 92 is metal. A transparent film 98 is disposed in a slot in the body 92 between the top surface 96 and a bottom surface 100 and covers a bottom of the holes 94 for holding a seed in each hole. Typical thickness of the transparent film 98 covering the bottom surface 100 is 0.1 mm (0.004 inches)-0.2 mm (0.008 inches). Typical thickness of top surface 96 is no less than thickness of the seeds in a preferred embodiment; however, the thickness should be such that a seeds cannot fall out or exchange positions. In one embodiment, the transparent film 98 comprises a Mylar® film. Typical Mylar® film thickness is 75-100 micrometer and this thickness is also used for filter 80. The scantray 90 is then placed on the system 10 so that the seeds can be imaged by the camera 60. In particular, a stack of scantrays 90 are manually inserted in a predetermined place by using an aligning mechanism (e.g. locating pins) in proximity of the conveyor belt 28 in a sorter system. Each stack of scantrays 90 is inserted at a determined place in the sorter system and located using location pins. In the illustrated embodiment, a pre-imaged stack of scantrays 90 is located next to one side of the conveyor belt 28 between the imaging assembly 14 and the sorting assembly 16. The height of the stack 90 is determined by a pick-and-place handler 103 using a proximity switch in a gripperhead 105 of the handler. This way the handler 103 knows the X, Y, and Z coordinates of the scantrays 90.

The filter 80 is removed automatically when beginning to image scantrays in preparation to train a customized classification to compensate for the additional x-ray attenuation for the transparent film 98 in each scantray 90. The filter 80 is replaced during the sorting process and functions to mimic the imaging properties of the scantray 90 so that the images obtained by the x-ray camera 60 during the sorting process are consistent with the images produced during the scantray imaging procedure. The positon of the seeds in each hole 94 can be adjusted and simultaneously synchronized for all seeds concerning the scantray by moving the transparent film 98 in the slot relative to the body 92.

Figure 23:
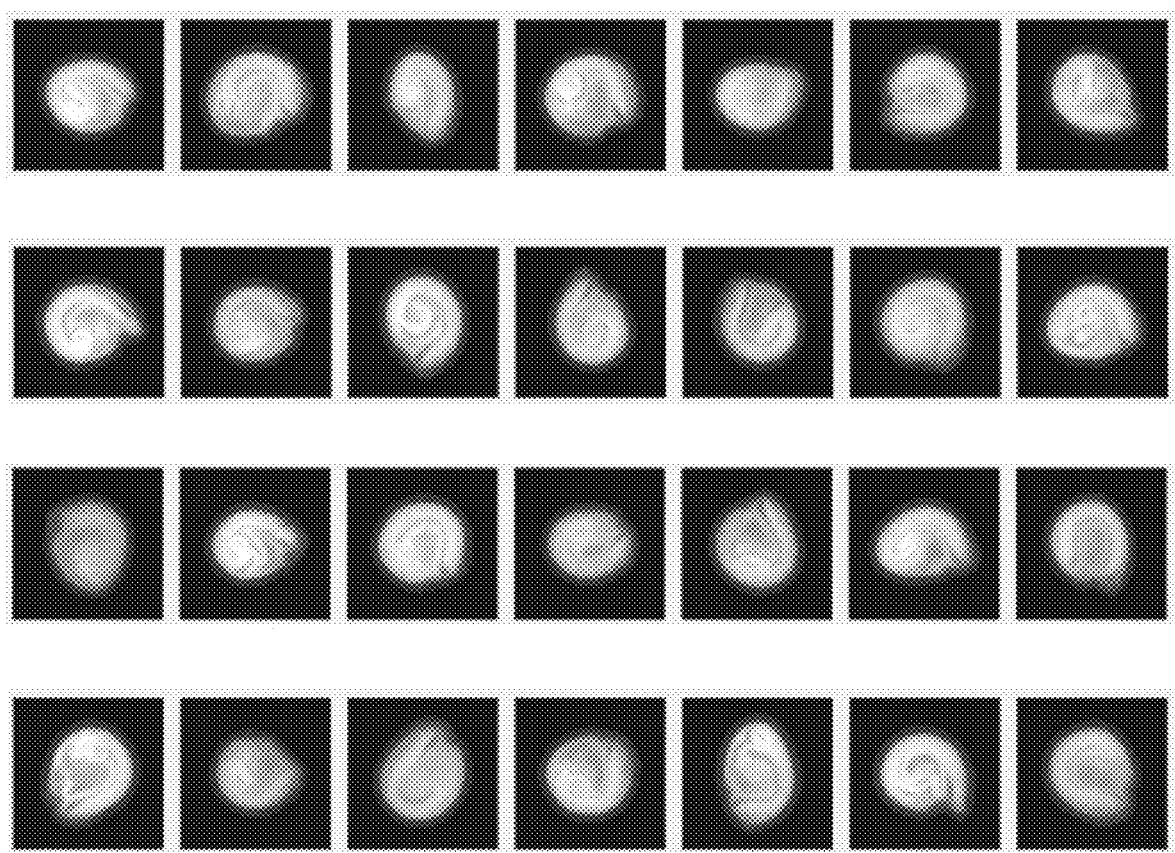
FIG. 23 is x-ray images of a training set obtained during processing of the imaged scantrays while training a customized classification.

Once the seeds in all scantrays 90 are centered and all scantrays are stacked and loaded into the sorter system, a shielding of the sorter system closes and a fully automated routine is initiated. Subsequently a 2-axis pick-and-place handler 103 moves to the uppermost scantray 90 from the stack and grasps the upper scantray by using the vacuum grippers 105. The scantray 90 is then removed from the supply stack and moved onto predefined positions on the conveyor 27. The vacuum grippers 105 are deactivated and the handler 103 moves upward. Next, the conveyor 27, moving in a reverse direction and now carrying the first scantray 90, moves the scantray to a start point (left side in FIG. 20). The conveyor 27 then moves the scantray 90 in the forward direction and the scantray passes the x-ray camera 60. The system 10 captures an image of the scantray 90 holding the seeds. The control software keeps track of each scantray ID and individual seed position. The software automatically processes the scantray image so that each individual seed is extracted and individually saved with associated data (e.g. scantray ID, seed position, seed type, batch number, etc.). FIG. 23 shows x-ray images of tomato seeds acquired during a training procedure. Following the imaging process, the scantray 90 is moved by the conveyor 27 to a predetermined position and the handler 103 is moved to grasp the scantray 90 and place the scantray in a ready stack position in the sorter. For example, the handler 103 may place the imaged scantrays 90 in a stack next to the conveyor belt 28 on the opposite side of the conveyor belt from the supply/pre-imaged stack. Subsequently, the handler 103 moves to the next scantray 90 from the supply/pre-imaged stack 90 and repeats the same routine until all scantrays from the supply/pre-imaged stack are imaged and stacked in the ready stack position. The handler 103 then moves each scantray 90 at the ready-stack back to the original supply stack. In other embodiments, the operator may also manually take the scantray stack from the ready stack position. The x-ray shielding can then be opened and the operator can take out the entire stack of scantrays 90.

An image of each seed is automatically processed and saved. Each digital seed x-ray image is measured individually to determine multiple morphological and geometrical structure features. The scantrays 90 holding the seeds from a training set are sent out for quality testing or determination of any other relevant metric. For each seed in the training set, relevant quality metrics are determined. For vegetable seeds, seeds are typically germinated and tested for germination and seedling quality metrics. For the corresponding seed batch, all assigned seedling quality classes are categorized into a binary class label: TRUE (usable seeds) or FALSE (unusable seeds). However, other labeling types are not excluded (e.g. multi-class labeling, continuous data type, etc.). For each seed, the label data is added to the file with feature data for all seeds. A learning algorithm is called up to build/train an optimal classification model for a given batch of seeds. Statistical performance properties are evaluated as a function of the probability-threshold (in case a regression model has been trained). Based on the performance metrics and requirements, an optimal p-threshold is determined. The system 10 is then calibrated for the seed batch based on the corresponding classification model and threshold.

To initiate the seed sorting procedure, seeds are first placed in the hopper 20 in preparation of being transported by the conveyor 27 through the system 10. As the seeds leave the outlet 24 of the hopper 20, the vibratory feed 25 with the feeding chute 31 and the singulation feeder plate 26 dose and move seeds forward until seeds drop off the singulation feeder plate 31 onto the conveyor belt 28. Singulation feeder plates 26 singulate the seeds by spacing the seeds apart into multiple rows and lengthwise in direction of travel toward the conveyor belt. Excess seeds, dropped in the slotted holes 37 in the singulation feeder plate 26 are collected by the seed collector 39 and routed back to the hopper 20 through the debris separator 43. A tracking sensor (not shown) may register each seed as it leaves the singulation feeder plate 26. In one embodiment, each individual seed is registered (for the first time) when it passes the x-ray camera 60. The seeds remain in a known location and fixed orientation on the conveyor 27 which allows each seed to be tracked with a high level of accuracy by knowing the motion control profile of the conveyor belt 28. Alternatively, a precision encoder may be used. The conveyor 27 carries the seeds into view of the x-ray camera 60 where x-ray line scans of the seeds are obtained. The individual line scans are collected in a frame grabber. Subsequently, image frames, holding a defined number of lines, are sent to a vision-processing PC inside controller 18.

Based on the data acquired from the x-ray images obtained by the x-ray camera 60, the controller 18 can measure feature values, feed these values into the classification model, and categorize each seed. The machine vision software of the system detects individual seeds from the x-ray images, determines the x and y coordinates of the seeds, and checks if the x-ray image meets the criteria indicating that the image is of a seed, and not dust or debris. The system further checks if the x-ray image is a single seed and not multiple seeds which are not well separated, and checks if the seed has enough spatial separation to adjacent seeds in that particular seed channel. The software measures all the relevant feature values according to the features which are used by the trained classification model. The data can be binary, or can be categorical. The classification categories may be based on the used label data types and label categories used during training of the classifier. The label categories can include; normal, weak, abnormal, non-germinating, pregerminated, damaged, semi-damaged, undamaged, etc. Based on these thresholds/ranges, at least two categories can be defined. For example, the measurement data can be used to determine which seed is either healthy or defective. Each sorting bin 42 is associated with one of the categories. In the illustrated embodiment, the first sorting bin 42a represents the seeds with the desired properties, and the second and third sorting bins 42b, 42c represent less or even none of the desired properties. As each seed is analyzed, the seed is associated with one of the categories. For example, a seed having morphological features that yields a class probability above a threshold value, are categorized into a first, accept category; and seeds having one or more morphological features that yields a class probability that are within a range of values, or below a certain threshold value, are categorized into a second, or third category. Multiple range/threshold values may be established to further categorize the seeds into more than two or three categories. In one embodiment, seeds with a p-value larger than a set p-threshold are classified as healthy, and seeds with a p-value smaller than the set p-threshold are classified as defective. For each seed the probability value and position data and other information is communicated from the imaging assembly 14 to the controller 18. Seeds then pass the light gate 50 and the controller 18 checks if the physical timing and position of the seed matches with data stored in the virtual data queue for that position and timing. Once a seed reaches the end of the conveyor 27, the sorting modules 40 are operated by the controller 18 to divert the defective seeds into one of the second and third bins 42b, 42c. The healthy seeds are allowed travel to the end of the conveyor 27 and fall into the first bin 42a.

Figure 24:
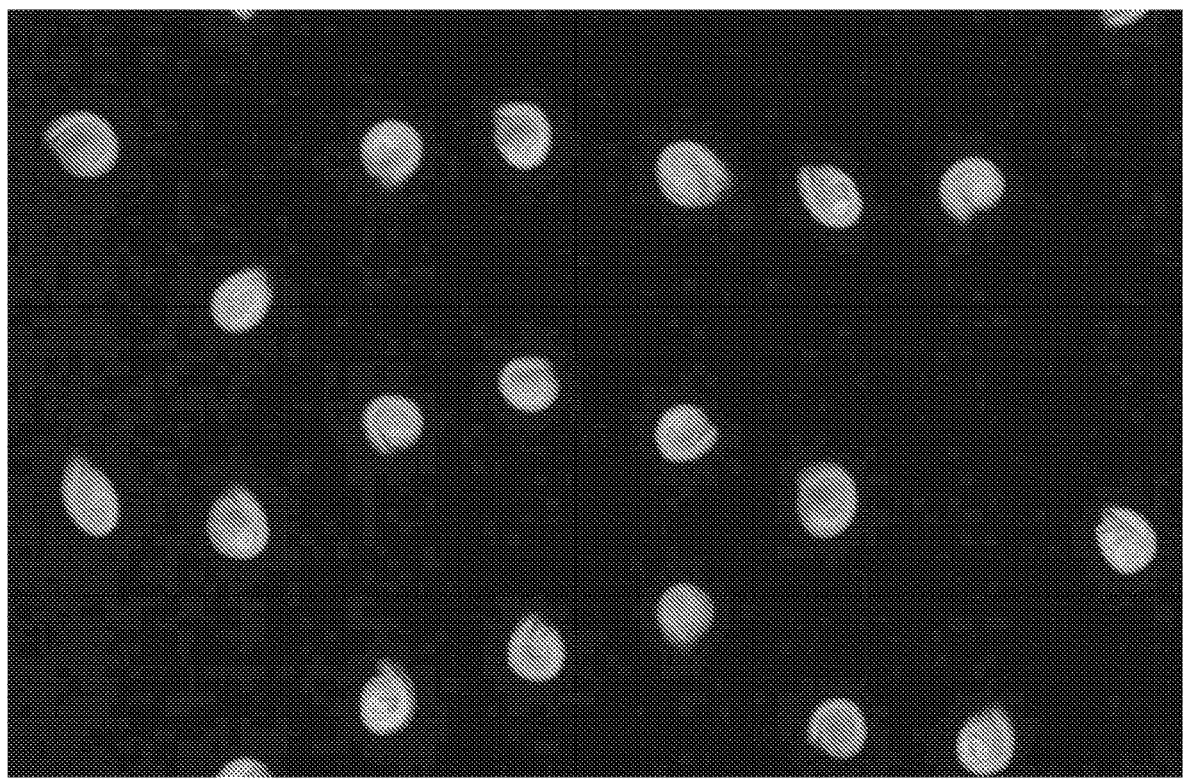
FIG. 24 is an x-ray image of tomato seeds acquired using the seed sorting system.
Figure 25:
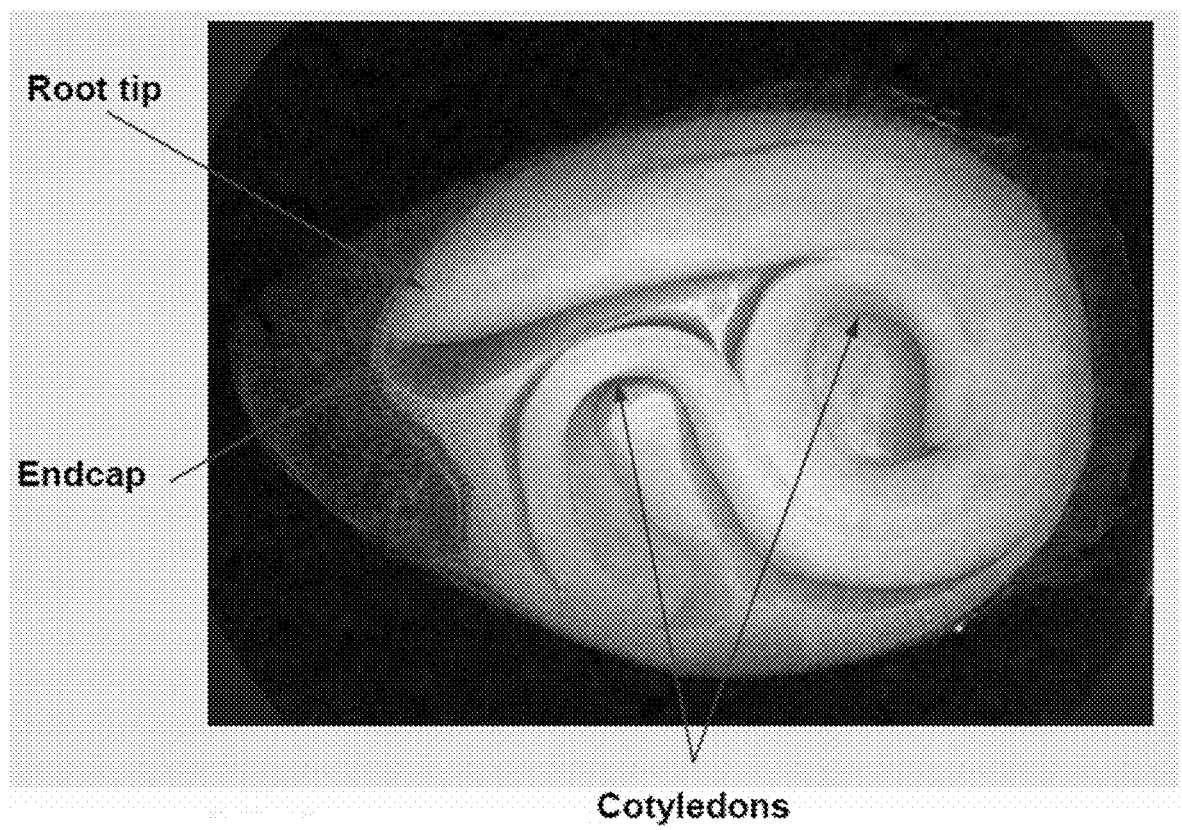
FIG. 25 is an x-ray image of a tomato seed showing seed morphology.
Figure 26:
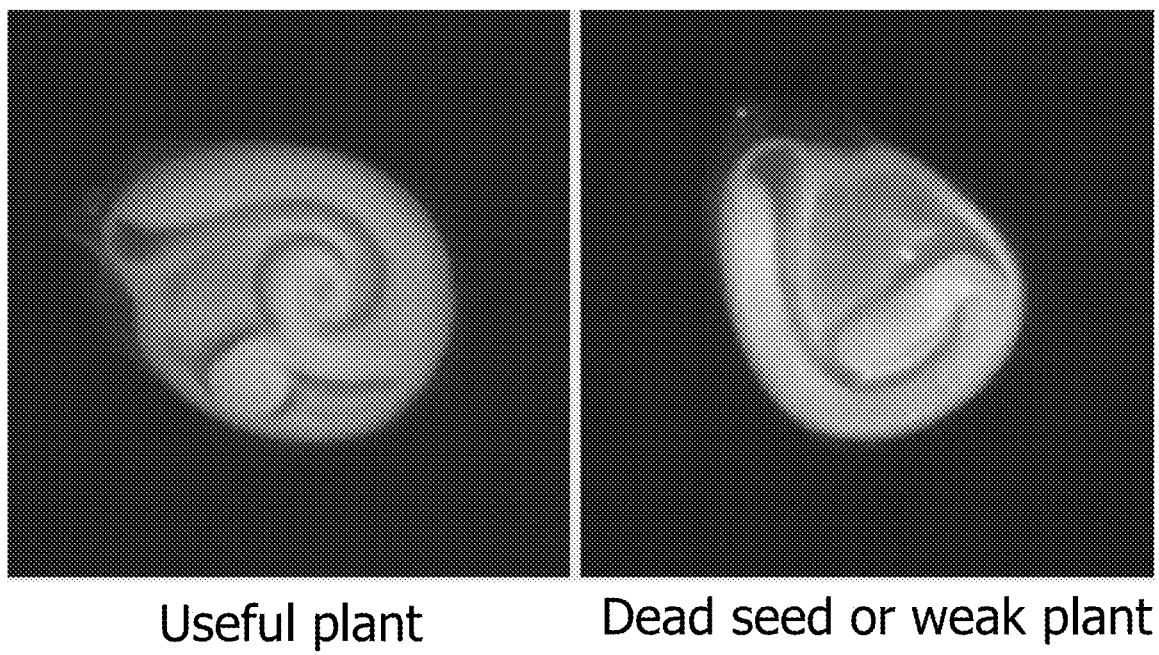
FIG. 26 is x-ray images of a useful and a dead tomato seed.
Figure 27:
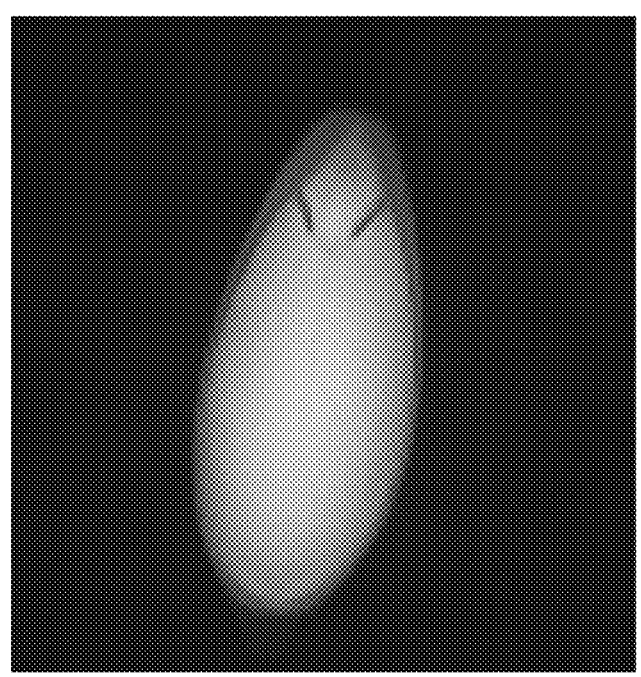
FIG. 27 is an x-ray image of a cucumber seed acquired using the seed sorting system.
Figure 28A:
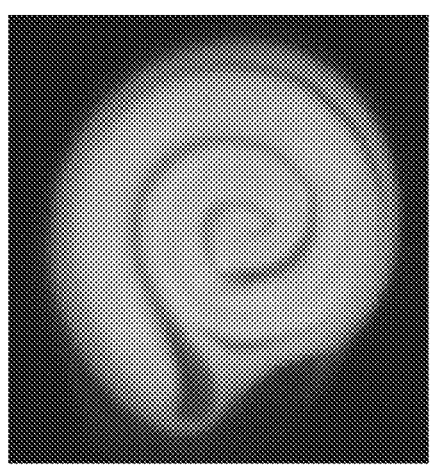
FIG. 28A is an x-ray image of a good tomato seed.
Figure 28B:
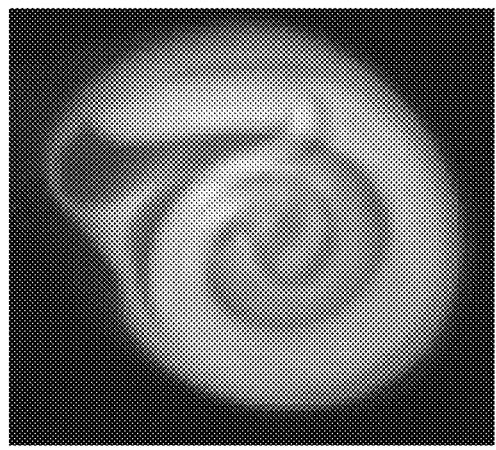
FIG. 28B is an x-ray image of an abnormal tomato seed.
Figure 28C:
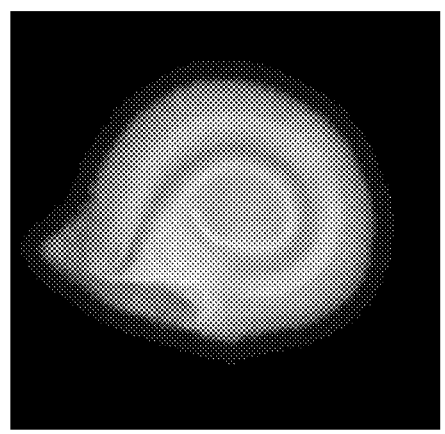
FIG. 28C is an x-ray image of a pepper seed.

FIG. 24 is an x-ray image of tomato seeds acquired with the camera 60 during a seed sorting/classification routine using the seed sorting system 10. FIG. 25 is a magnified x-ray image of a tomato seed showing the morphology of the seed including the root tip, endcap and cotyledons. Referring to FIG. 26, the x-ray image of a healthy, useful tomato seed is compared to the x-ray image of a defective, or dead tomato seed. The x-ray images allow for the abnormalities in the cotyledons to be clearly recognized. FIGS. 28A and 28B also show x-ray images of normal and abnormal tomato seeds, respectively. FIG. 28C is an x-ray of a pepper seed. FIG. 27 is an x-ray image of a healthy cucumber seed acquired with the camera 60 of the seed sorting system 10.

Referring to FIGS. 29-32, a seed sorting system of another embodiment is indicated generally at 10'. Like system 10, the system 10' is configured to receive, analyze, and sort a plurality of seeds into selected categories. In one embodiment, the system 10' is used for row crop seeds (e.g., corn, soybean, canola, cotton, etc.). The system 10' comprises a load and transfer assembly 12' configured to receive and deliver the seeds through the system, an imaging assembly 14' for collecting image data of the seeds as they are delivered through the system by the load and transfer assembly, and a sorting assembly 16' configured to sort the seeds into selected categories based on the image data collected for the seeds by the imaging assembly.

Figure 29:
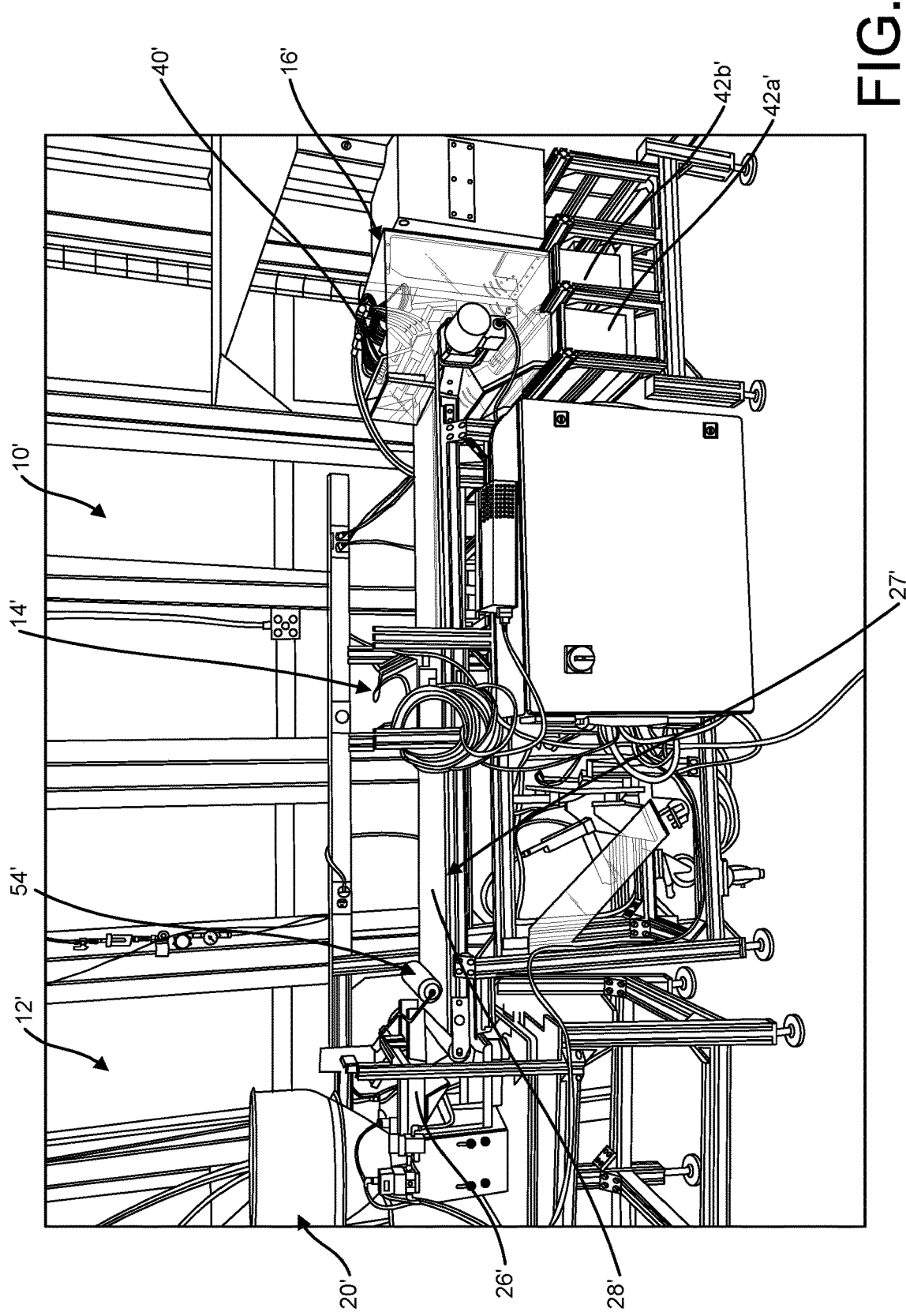
FIG. 29 is a perspective of a seed sorting system of another embodiment.
Figure 30:
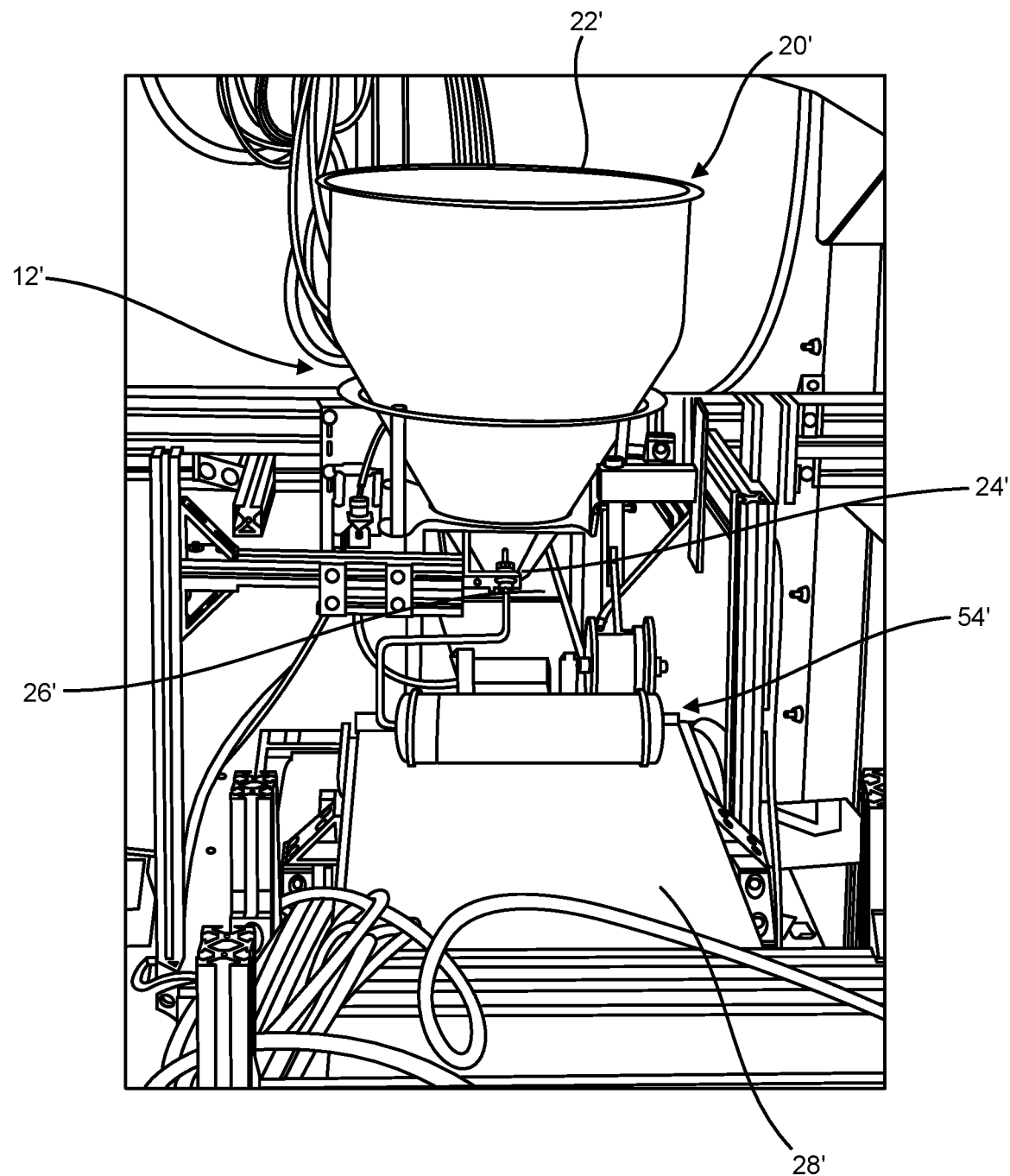
FIG. 30 is a fragmentary perspective of the seed sorting system in FIG. 29.

Referring to FIGS. 29 and 30, the load and transfer assembly 12' comprises a hopper (broadly, a seed loading station) 20' including an inlet 22' for receiving the seeds into the hopper and an outlet 24' for dispensing the seeds from the hopper. A feeder plate 26' is disposed at the outlet 24' for randomly feeding the seeds as they are dispensed from the outlet. A conveyor 27' (broadly, a seed transfer station) is located at an outlet of the feeder plate 26'. In the illustrated embodiment, the conveyor 27' comprises a belt 28' defining a flat horizontal conveyor transport surface. The conveyor 27' provides a flat surface for the seeds to rest as they are delivered through the system 10. In one embodiment, a high precision encoder 54' is incorporated into the system 10 to track the position of the conveyor 27'. The encoder 54' may also act as a master timing device to trigger the imaging assembly 14' to acquire their images. In one embodiment, typically for imaging row crop seeds, the conveyor 27' operates at about 0.6-1.2 msec and can achieve a throughput of up to about 200 seeds/sec for a four inch wide seed flow. A typical feed rate is about 50 seeds per second. However, feed rates exceeding 1000 seeds per second are envisioned by using a wider conveyor belt, a faster conveyor speed, or an allowance for closer seed spacing on the conveyor 27'.

In one embodiment, the conveyor belt 28' is optically transparent. The transparent nature of the conveyor belt 28' allows for imaging through the conveyor. However, the conveyor can be translucent or semi-transparent without departing from the scope of the disclosure. In one embodiment, the belt 28' is formed from Mylar. Other materials including optically and x-ray transmissive materials are envisioned without departing from the scope of the disclosure. The conveyor may also be non-transparent without departing from the scope of the disclosure.

Figure 31:
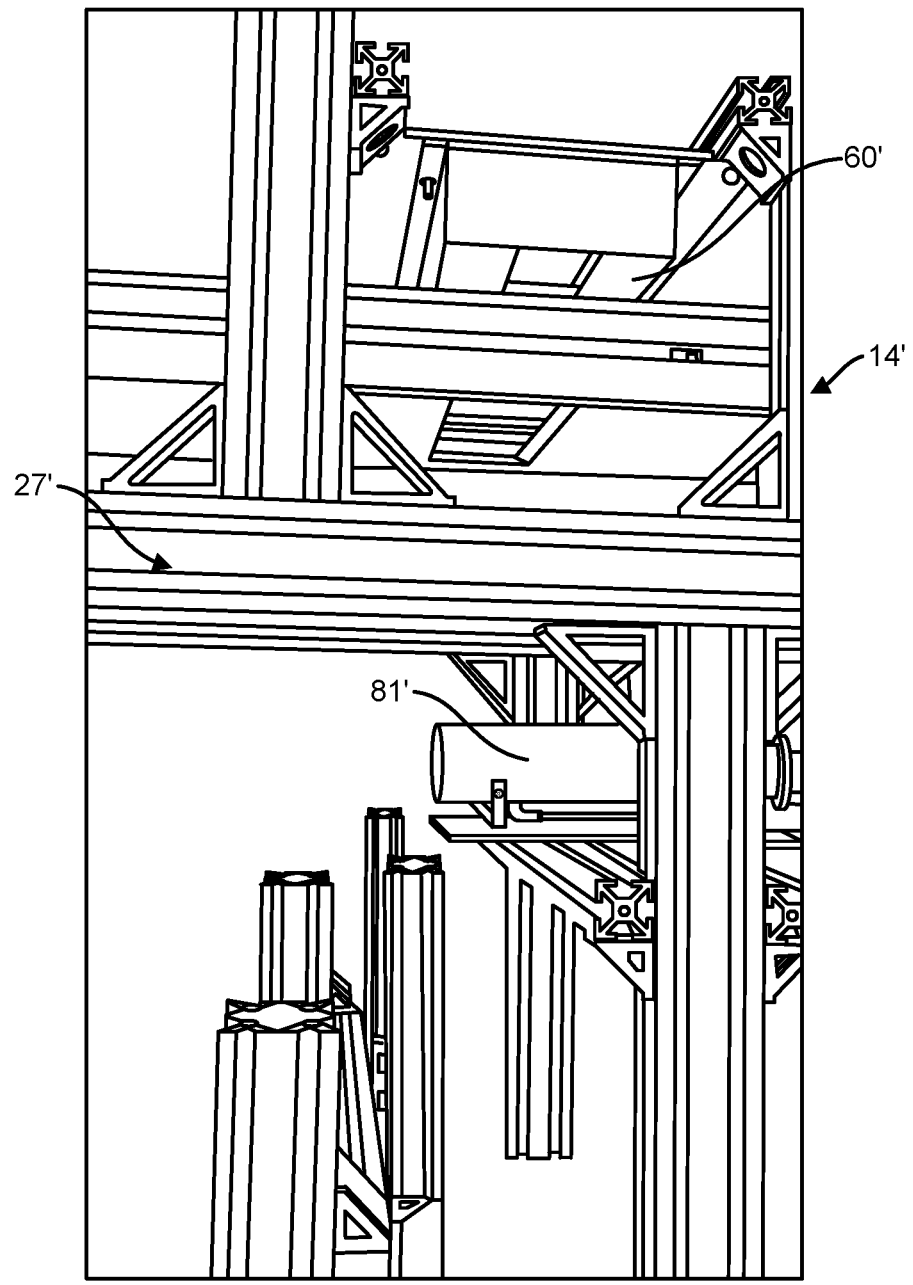
FIG. 31 is a perspective of an x-ray image acquisition assembly of the seed sorting system in FIG. 29.

Referring to FIGS. 29 and 31, the imaging assembly 14' comprises an x-ray tube 81' mounted below the conveyor 28' for directing x-ray photons upwards toward the conveyor, and an x-ray camera 60' mounted above the conveyor surface for acquiring x-ray images of the seeds. In one embodiment, the x-ray camera 60' comprises a low-energy x-ray TDI camera (e.g., 10-50 KeV). The construction of the x-ray camera 60' allows for the system to acquire high quality images while operating at high imaging speeds. The high efficiency design of the x-ray camera 60' eliminates the need to run an x-ray tube at maximum power settings which prolongs the lifespan of x-ray tubes in the camera and/or allows for acquisition of image data at high line scan rates which allows for high belt speeds and associated high seed throughput rates In one embodiment, the x-ray tube 81' is set at a 40 Kv and 2 mA setting. In one embodiment, the distance between the seeds on the belt 28' and the camera 60' produces a geometrical magnification of about 1.1× and an effective image resolution of about 0.09 mm/pixel at 2×2 binning in the camera 60'.

Figure 33:
FIG. 33 is an x-ray image of cotton seeds on a conveyor of the seed sorting system in FIG. 29.
Figure 34A:
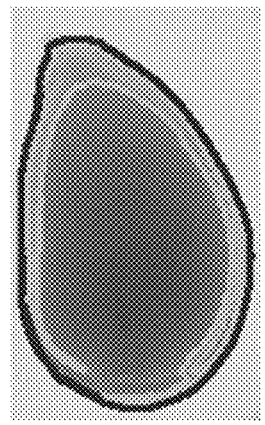
FIG. 34A is an x-ray image of a mature cotton seed.
Figure 34B:
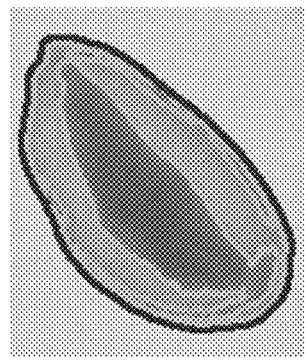
FIG. 34B is an x-ray image of an immature cotton seed.

As the conveyor 27' transports the seeds past the x-ray tube 81' and camera 60', x-ray images of the seeds are acquired by the camera and are passed to a control software for real time analysis. FIG. 33 shows an x-ray image taken by the camera 60' as the seeds are transported past the imaging assembly 14'. The real-time analysis program distinguishes the seed images from the background and classifies the seeds into categories (e.g., mature/immature) based on image processing algorithms and a pre-trained PLSDA model. FIGS. 34A and 34 B are illustrations of an analysis performed on two cotton seeds where one (FIG. 34A) is classified as mature and the other (FIG. 34B) is classified as immature. Accurate position of each seed is also determined by the controller software using the x-ray images and the wheel encoder readings.

Figure 32:
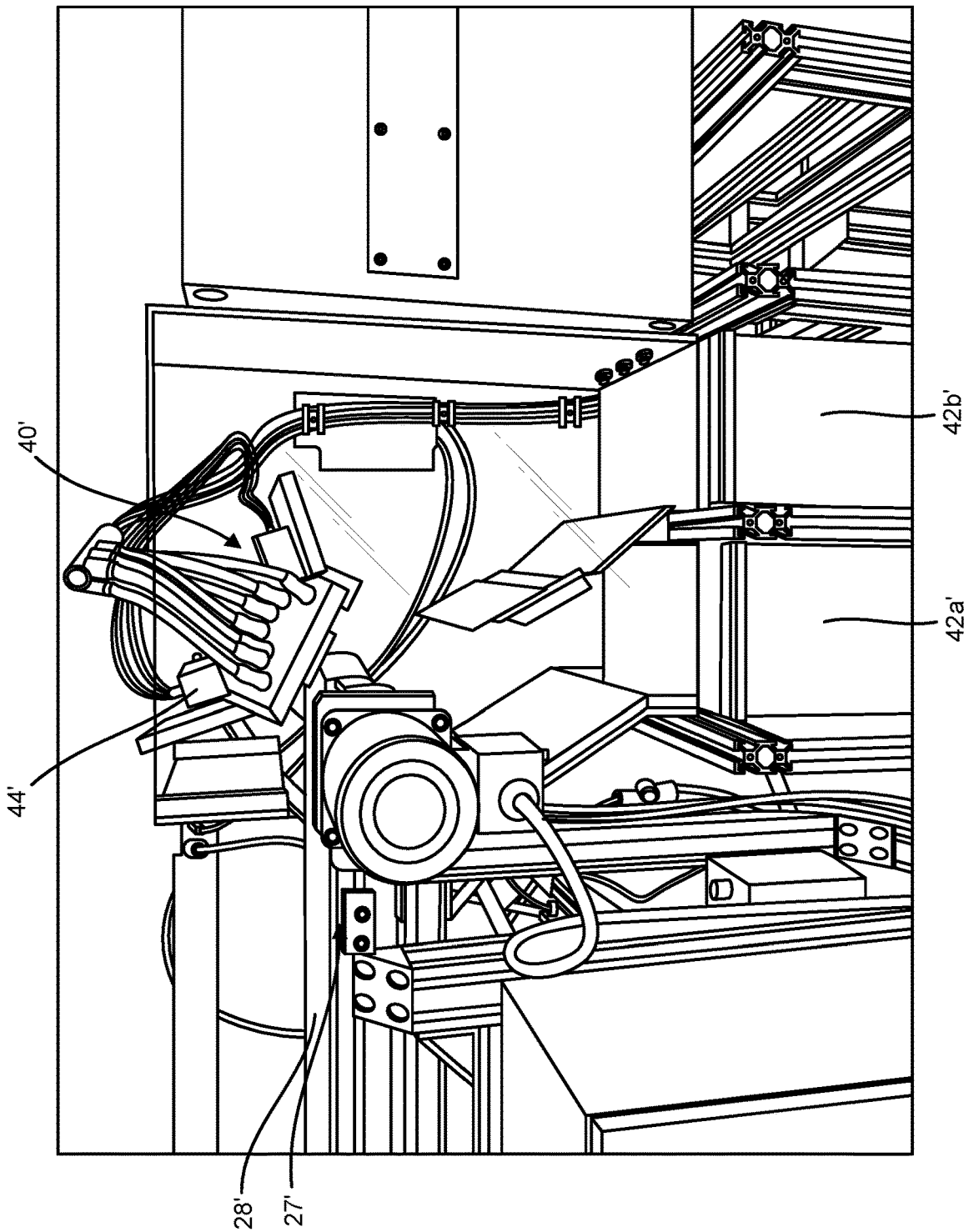
FIG. 32 is a perspective of a sorting assembly of the seed sorting system in FIG. 29.

Referring to FIG. 32, the sorting assembly 16' comprises a high speed air valve bank 40' and a plurality of sorting bins 42' located at an end of the conveyor 27' for sorting the seeds into two different categories based on the measurements obtained from the image acquired by the imaging assembly 14'. The valve bank 40' includes multiple air valves 44' in fluid communication with an air compressor for producing burst of air directed at the seeds as they are expelled from the conveyor 27'. The air is used to redirect the flight of the seeds so that the seeds land in a selected sorting bin 42' corresponding to the identified characteristics of the seeds. As previously mentioned, the seeds are tracked by a high precision encoder 54'. Thus, the system 10' can monitor the path of the seeds and predict when and where the seeds will be expelled from the conveyor 27'. Therefore, the system 10' can predict the location and flight of each seed as it leaves the conveyor 27'. This information is used by the controller to instruct the operation of the valves 44' in the valve bank 40'. In one embodiment, the valve bank 40' includes thirty two (32) air valves 44' each 3.5 mm (0.14 inches) wide and covering a 4.41 inch (112 mm) wide seed flow region across the belt 28'. Any number of air valves can be assembled together to cover a specific seed flow area without departing from the scope of the disclosure. Moreover, a different number or air valves is envisioned without departing from the scope of the disclosure. The array of valves 44' is provided in an adequate number and arrangement to locate the valves in position to accommodate the random placement of the seeds on the conveyor 27'.

Figure 48:
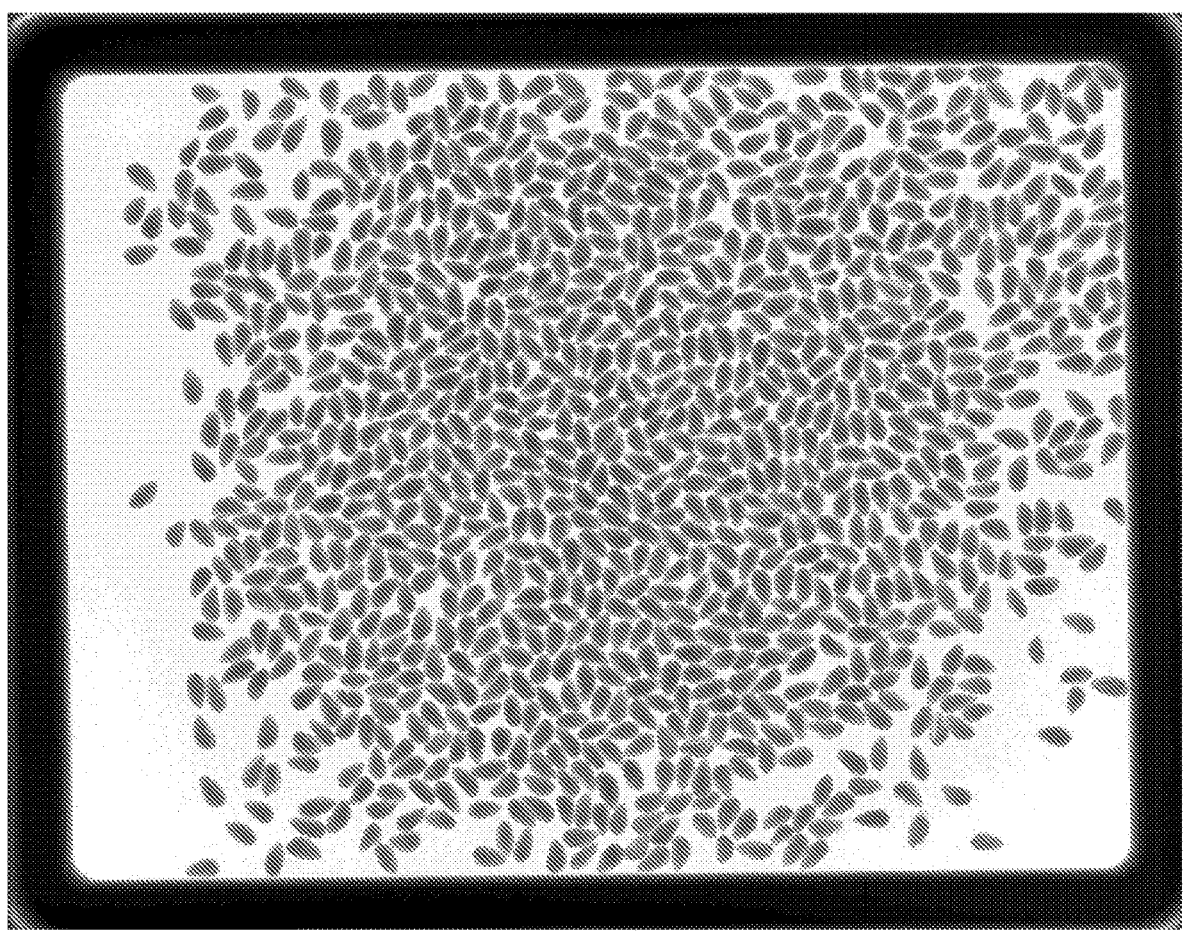
FIG. 48 is an x-ray image of healthy seeds sorted into a sorting bin.
Figure 49:
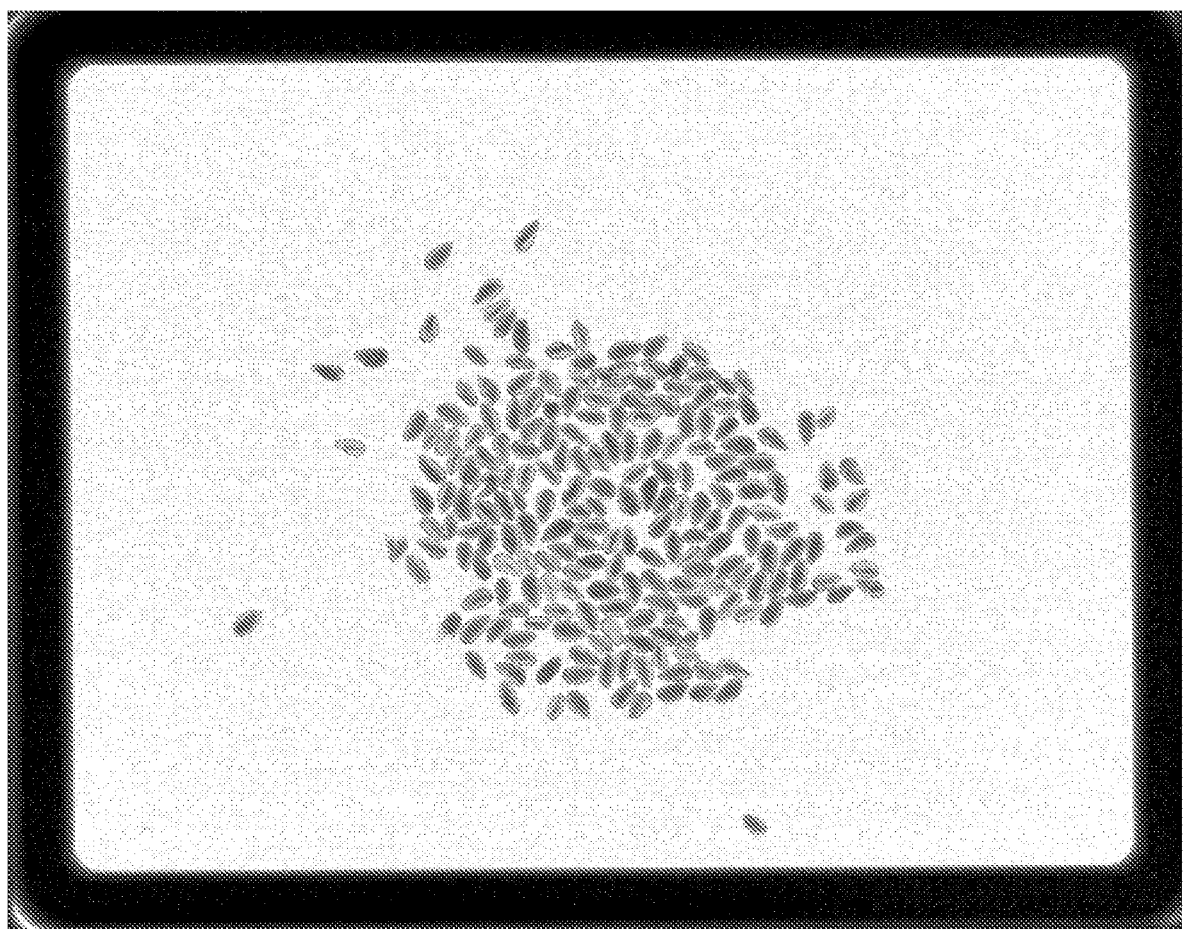
FIG. 49 is an x-ray image of defective seeds sorted into a sorting bin.

In the illustrated embodiment, there is one (1) valve bank 40' selectively positioned for sorting the seeds into two (2) sorting bins 42'. A first sorting bin 42a' is located closest to the conveyor 27', and a second sorting bin 42b' is located next to the first sorting bin and located farther from the conveyor than the first sorting bin. The valve bank 40' is disposed generally over the first sorting bin 42a' and directed downward such that the bursts of air from the valves 44' in the valve bank create a downward diverting force. This downward diverting force can redirect the path of a seed as it leaves the conveyor 27' so that the seed falls into the first sorting bin 42a'. Thus, if a seed is not redirected by the valve bank 40', the seed will land in the second valve bin 42b' as a result of the natural trajectory of the seed leaving the conveyor 27'. It will be understood that the conveyor 27' can be operated and/or the sorting bins 42' can be positioned so that the natural flight of the seeds will land the seeds in the first sorting bin 42a', and a valve bank can be positioned to redirect the seed from the first sorting bin 42a' to the second sorting bin 42b'. Moreover, additional valve banks could be used for sorting the seeds into more than two bins. FIG. 48 shows an x-ray image of seeds sorted into the second sorting bin 42b', and FIG. 49 shows an x-ray image of seeds sorted into the first sorting bin 42a'. It can be seen that the system is very accurate in sorting the mature seeds into the second sorting bin 42b' and the immature seeds into the first sorting bin 42a'.

In addition to sorting seeds into mature and immature groups, the system 10' can sort seeds (e.g., row crop seeds) into groups based on other quality features of the seed. For example, x-ray images can measure the degree of seed damage in both cotton and corn seeds via direct visualization of the damage depicted in the image. X-ray imaging can also be used to predict the internal color of a cotton seed, which in turn provides a measure of seed quality.

Figure 35A:
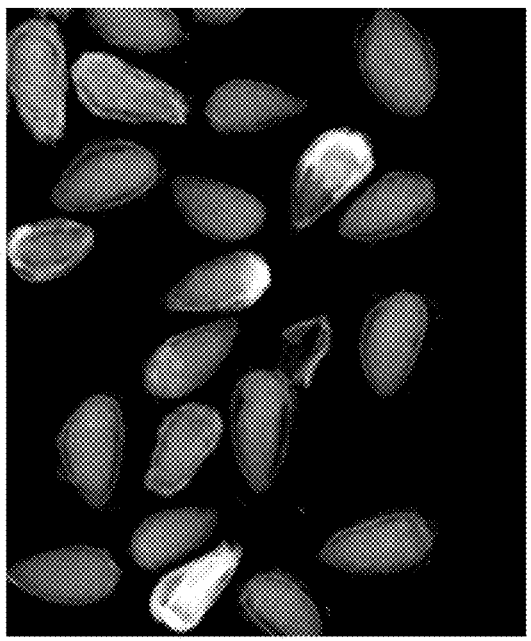
FIG. 35A is an x-ray image of cotton seeds showing damage detected using a contrast agent.
Figure 35B:
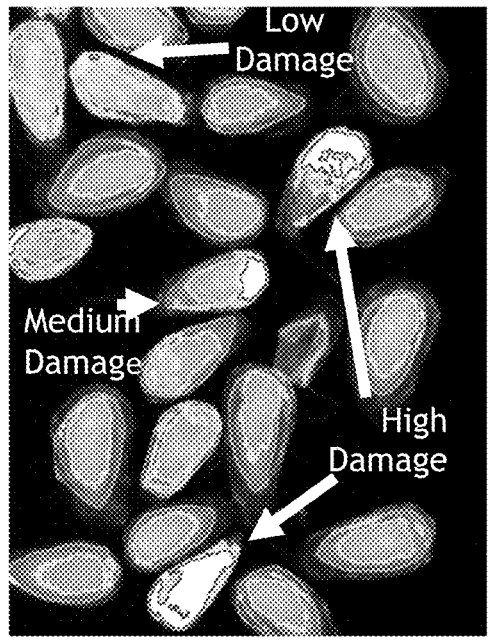
FIG. 35B is the x-ray image of FIG. 35A showing an analysis of the seed damage.
Figure 36:
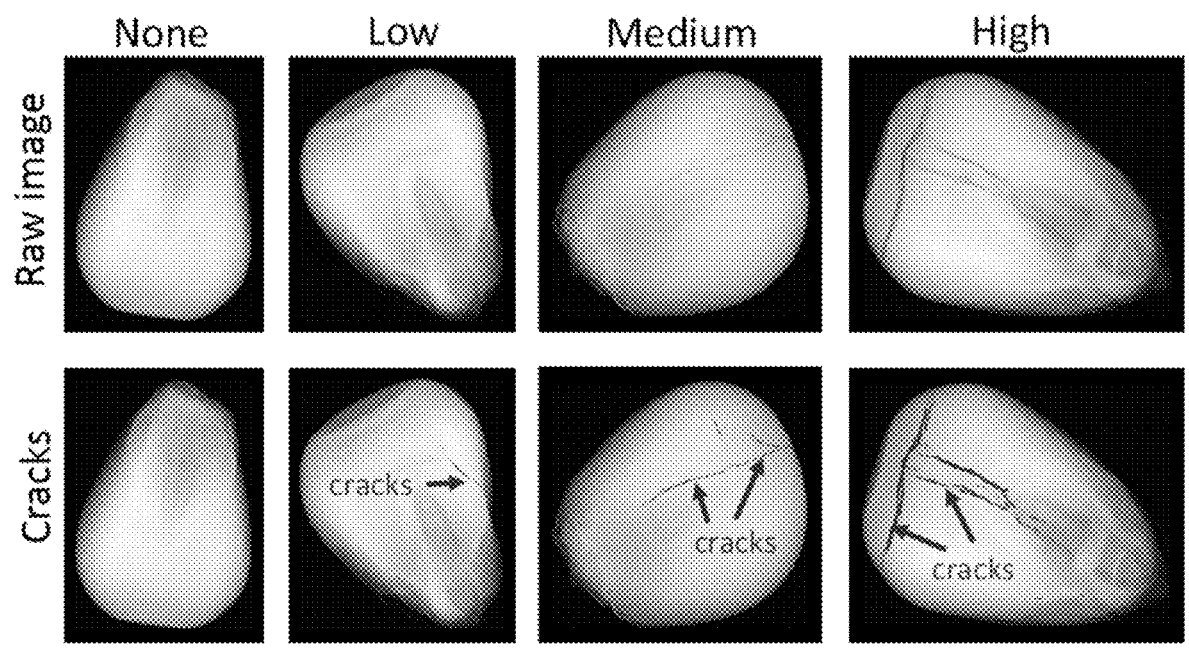
FIG. 36 is x-ray images of corn seeds showing various degrees of damage.
Figure 37A:
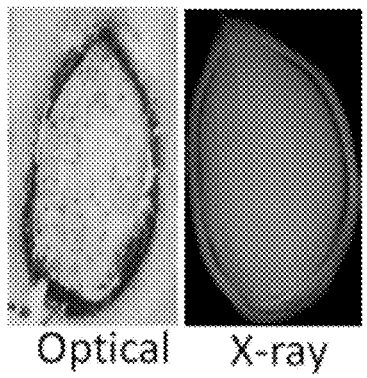
FIG. 37A is a comparison of an optical image and an x-ray image for a normal cotton seed.
Figure 37B:
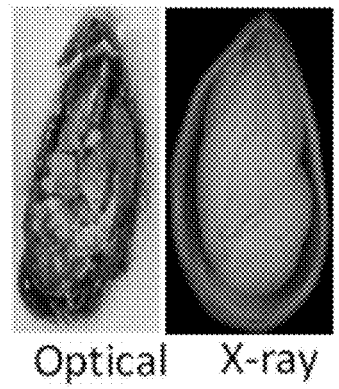
FIG. 37B is a comparison of an optical image and an x-ray image for a discolored cotton seed.
Figure 42:
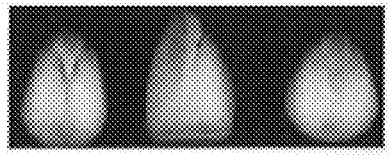
FIG. 42 is x-ray images of corn seeds having internal cracks shown with and without treatment by a contrast agent.
Figure 42:
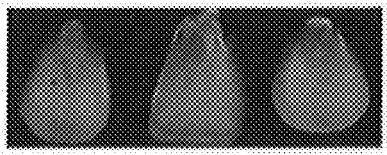
Figure 43:
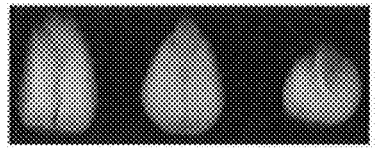
FIG. 43 is x-ray images of corn seeds having external cracks shown with and without treatment by a contrast agent.
Figure 43:
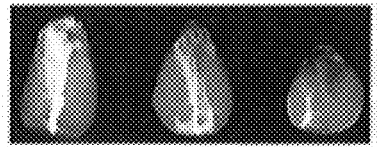

Seed damage can be observed in cotton seeds after treatment of the seeds with an x-ray contrast agent. The x-ray image of cotton seeds in FIG. 35A reveals regions of increased intensity (white areas) due to uptake of contrast agent via seed structure damage. The presence of high intensity signals in the data can be used to identify damaged seeds (FIG. 35B). The amount of uptake for a given seed is related to the severity of damage, and can be scored as low, medium or high damage. Similar damage also can be observed in corn seeds after treating with contrast agent as shown in FIGS. 42 and 43. This damage can also be detected without the use of a contrast agent using automatic software-based crack detection algorithms. FIG. 36 shows x-ray images of corn seeds that have been analyzed using such an algorithm to identify cracks in the seeds.

Figure 38:
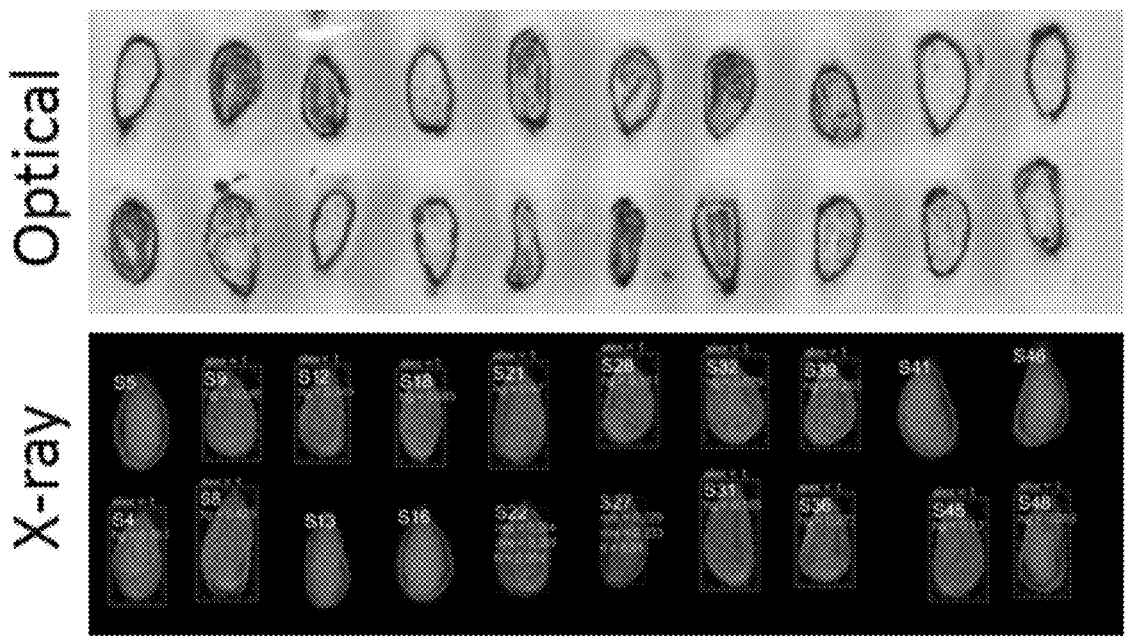
FIG. 38 is a comparison of optical images and x-ray images for cotton seeds.

Subtle features extracted from the x-ray image (e.g., image texture) can also be used to sort cotton seeds into high quality and low quality categories. High quality cotton seeds may be evidenced by an internal white color, while low quality cotton seeds may be evidenced by internal yellow, red, and brown colors. This approach may use automatic discoloration detection algorithms based on x-ray image analysis that combines conventional machine learning and modern deep learning approaches to measure x-ray image texture variations in the seed, which in turn, correlate to the internal color of the seed. A qualitative illustration of this is demonstrated in FIG. 38 where optical images are compared to the x-ray image results. Relative to traditional subjective screening approaches, which may take 20 minutes on 100 seeds, this new method greatly improves the process by being objective and fast, capable of running 400 seeds in a few minutes making the predictive performance of these methods very high.

Figure 39:
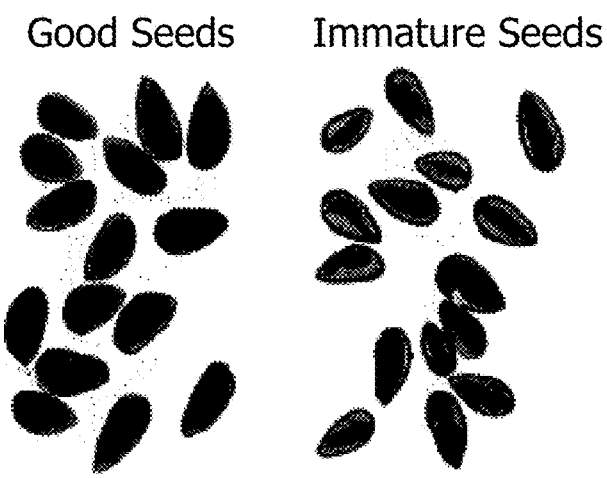
FIG. 39 is x-ray images of healthy and defective cotton seeds.
Figure 40:
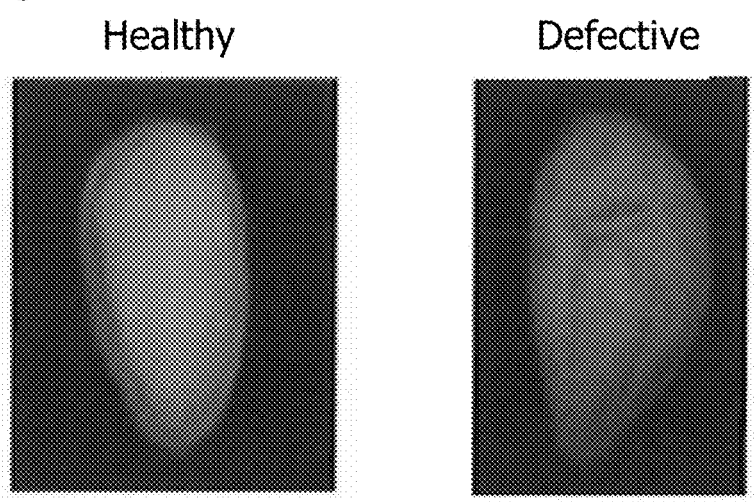
FIG. 40 is x-ray images of a healthy and a defective cotton seed.

The seed quality indicators assessed by x-ray imaging have proved to be a consistent and reliable detection method for distinguishing between healthy versus defective and low versus high quality seeds. Referring to FIGS. 39 and 40, the x-ray images of good, healthy cotton seeds display a greater overall mean x-ray attenuation and a higher "filling factor" metric compared to immature, defective seeds. And the results from x-ray imaging are consistent with the results obtained from gravity table sorting in the production facility (which is used to differentiate mature from immature cotton seeds). Similarly, the damage in cotton seeds measured with x-ray is consistent with the damage assessed using a standard visual mechanical damage protocol. Additionally, for cotton seeds, the heterogeneity measured from the x-ray images appears to correlate to the maturity/age and the internal color of the seed.

Figure 41:
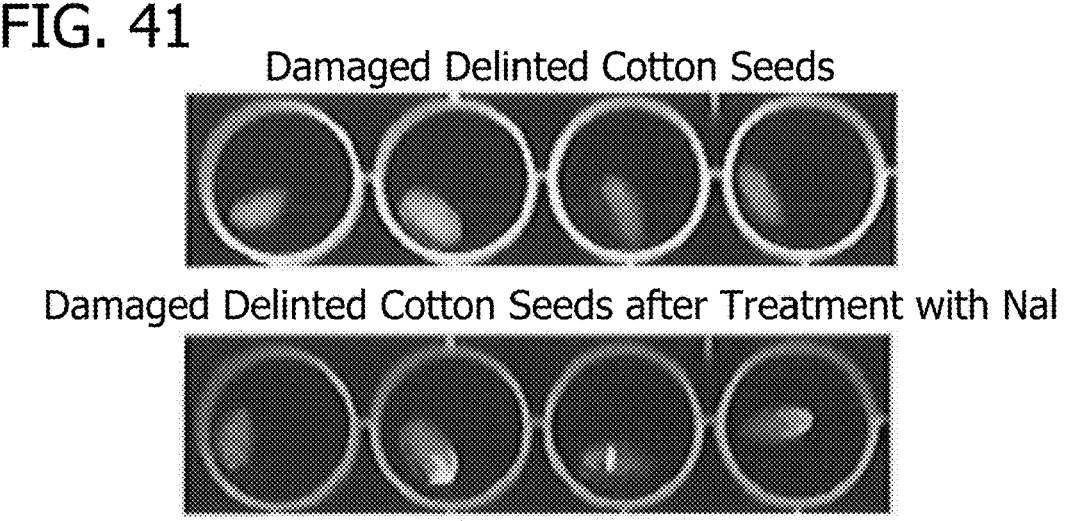
FIG. 41 is x-ray images of cotton seeds shown with and without treatment by a contrast agent.
Figure 44A:
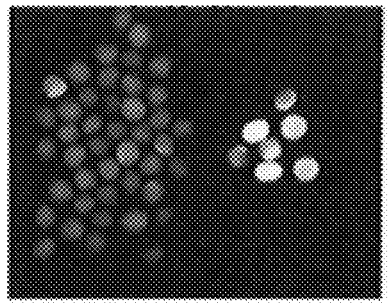
FIG. 44A is x-ray images of high quality soybean seeds treated with a contrast agent.
Figure 44A:
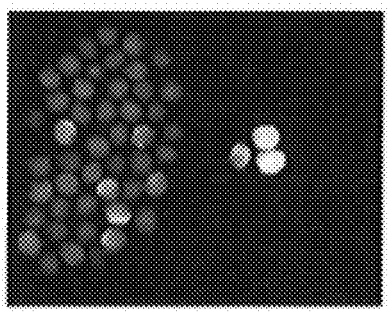
Figure 44B:
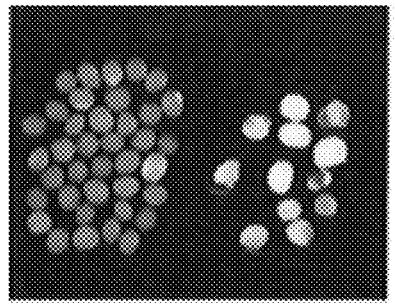
FIG. 44B is x-ray images of low quality soybean seeds treated with a contrast agent.
Figure 44B:
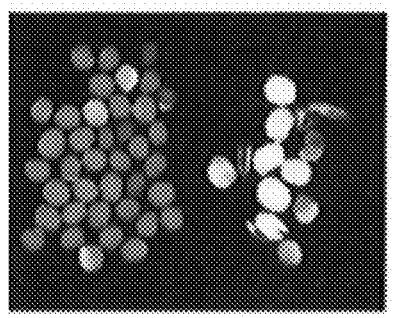
Figure 45:
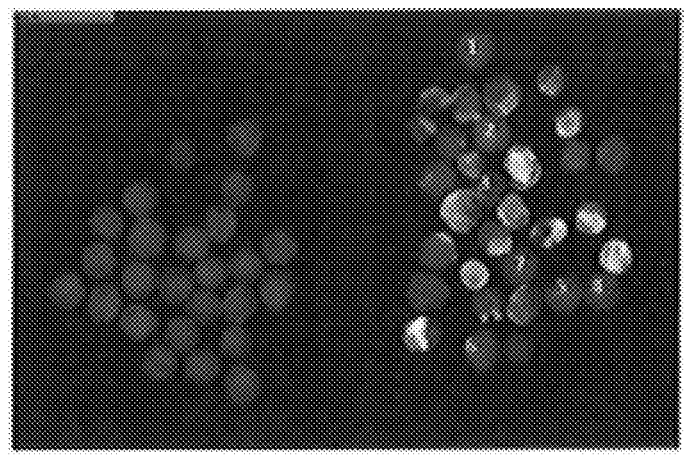
FIG. 45 is an x-ray image of healthy and defective canola seeds treated with a contrast agent.
Figure 46:
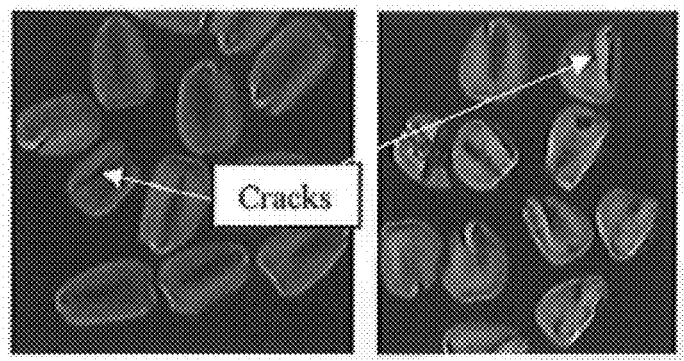
FIG. 46 is x-ray images of flat and round corn seeds.
Figure 47:
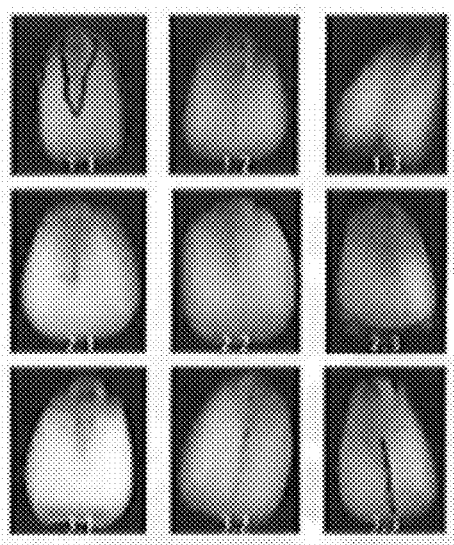
FIG. 47 is a summary of a crack classification scheme.

As mentioned above, in conjunction with x-ray imaging, seeds can be treated with a contrast agent to enhance the system's ability to detect subtle damage. In one embodiment, the seeds can be treated with sodium iodide (NaI). FIG. 41 shows x-ray images of cotton seeds treated with and without NaI treatment. The treated seeds with NaI demonstrate better contrast for damage in the seeds as illustrated by the hyperintense signal that highlights the damage. Therefore, healthy seeds are more easily distinguished from damaged seeds because the healthy seeds are void of significant damage that allows the contrast agent to enter the seed. Thus, the presence and the degree of contrast agent uptake correlates to the amount of seed damage. FIGS. 42 and 43 show x-ray images of corn seeds having internal and external cracks, respectively, with and without a contrast agent treatment. As shown in these figures, the contrast agent is taken up by seeds with the external cracks, but it is not taken up by the seeds with internal cracks, thus distinguishing between these two types of damage. FIGS. 44A and 44B show x-ray images of high quality soybean seeds (FIG. 44A) and low quality soybean seeds (FIG. 44B) treated with a contrast agent. The low quality soybean sample shows a greater percentage of seeds uptake the agent (i.e., the brighter, higher intensity seeds grouped towards the left in each panel) when compared to the high quality soybean sample. FIG. 45 shows similar x-ray images of healthy (no damage) canola seeds and defective (damaged) canola seeds treated with a contrast agent. FIG. 46 shows x-ray images depicting representative cracks in a group of corn seeds, and FIG. 47 illustrates a summary of a crack classification scheme for corn seeds. X-ray imaging can also be used to measure seed density when the weight of the seed is known. By providing a measure of a height (or thickness) of the seed, a total seed volume calculation can be made which is used to calculate seed density.

The information obtained using the imaging assemblies 14, 14' can be useful in the subsequent processing, assessment, or analysis of the seeds. For example, in seed production plants, the data generated by the systems 10, 10' can be used to predict an overall distribution of defective seeds in a seed inventory, determine when in the production process defects in the seeds occur, and to determine the distribution of defective seeds of a sub sample of seeds which can then be extrapolated to predict the overall seed inventory status. This distribution information may also be used to estimate seed quantities by commercial size categories and adjust sizing thresholds slightly in cases where seed quantities are limited. The sorted seeds can also be used in seed quality labs for assessing seed quality for each size and shape category. Information from the imaging assemblies 14, 14' can be used in subsequent germination testing. Correlations between the degree and amount of cracks and the germination of the seed can be drawn. For instance, as the severity of the damage in the seed increase a germination score of the seed decreases. The ability to determine seed damage, in turn, can be used to probe each step during manufacturing to determine the precise step in the process where the damage was incurred. This information can then be acted upon to optimize the process by implementing ways to reduce such damage. The system also allows for the inclusion of additional detection techniques such as hyper spectral and fluorescence imaging which can be beneficial in assessing seed quality.

Having described the invention in detail, it will be apparent that modifications and variations are possible without departing from the scope of the invention defined in the appended claims.

When introducing elements of the present invention or the preferred embodiments(s) thereof, the articles "a", "an", "the" and "said" are intended to mean that there are one or more of the elements. The terms "comprising", "including" and "having" are intended to be inclusive and mean that there may be additional elements other than the listed elements.

In view of the above, it will be seen that the several objects of the invention are achieved and other advantageous results attained. As various changes could be made in the above constructions and methods without departing from the scope of the invention, it is intended that all matter contained in the above description and shown in the accompanying drawings shall be interpreted as illustrative and not in a limiting sense.

OTHER STATEMENTS OF THE INVENTION

The following are statements of the invention described in the present application. Although some of the following statements are not currently presented as claims, the statements are believed to be patentable and may subsequently be presented as claims. Associated methods, such as methods corresponding to statements of apparatus or systems below, are also believed to be patentable and may subsequently be presented as claims. It is understood that the following statement may refer to one, more than one or all of the embodiments described above and be supported by one, more than one or all of the embodiments described above.

A1. A seed sorting system for sorting seeds, the system comprising: a seed transfer station configured to move seeds through the system; an imaging assembly comprising an x-ray camera configured to acquire x-ray images of the seeds as the seeds move through the system, the x-ray camera being configured to produce high quality images at high line scan rates to accommodate a speed and width at which the seeds are moved by the seed transfer station through the system; and a sorting assembly configured to sort the seeds into separate bins based on the acquired x-ray images of the seeds.

A2. The seed sorting system of A1, further comprising a controller configured to measure and analyze the x-ray images to classify the seeds.

A3. The seed sorting system of A2, wherein the controller is configured to run, in real-time, a classification model that determines from the acquired x-ray images a probability value of each seed identifying each seed as belonging to a certain class.

A4. The seed sorting system of A3, wherein the controller is configured to control the sorting assembly to sort the seeds based on the determined probability value of the seeds from the acquired x-ray images.

A5. The seed sorting system of A2, wherein the controller is configured to run, in real-time, a classification model that provides a classification decision based on the acquired x-ray images for identifying each seed as belonging to a certain class.

A6. The seed sorting system of A1, wherein the x-ray camera uses low energy x-ray photons in a range of about 5 to about 50 keV to produce the high quality images at high imaging speeds.

A7. The seed sorting system of A1, wherein the seed transfer station comprises a conveyor.

A8. The seed sorting system of A7, wherein the conveyor comprises a belt configured to transport the seeds in a substantially horizontal direction.

A9. The seed sorting system of A7, wherein the conveyor is one or transparent or semi-transparent.

A10. The seed sorting system of A7, wherein the conveyor is non-transparent.

A11. The seed sorting system of A7, wherein the conveyor is formed from a polyester film.

A12. The seed sorting system of A7, wherein the x-ray camera comprises a scintillator mounted between about 20 mm (about 0.79 inches) and about. 0.8 mm (0.04 inches) away from the conveyor.

A13. The seed sorting system of A6, further comprising a filter disposed between the camera and the conveyor.

A14. The seed sorting system of A1, further comprising a controller, wherein the sorting assembly comprises at least one sorting module and a plurality of sorting bins, the sorting module being operable by the controller to divert at least some of the seeds into at least one of the sorting bins before the seeds leave the seed transfer station.

A15. The seed sorting system of A14, wherein the sorting module comprises a plurality of moveable vacuum nozzles.

A16. The seed sorting system of A14, wherein the sorting module comprises a plurality of high speed air valves.

A17. The seed sorting system of A15, wherein the seed transfer station is configured to direct seeds into a first sorting bin, the sorting module being operable to direct seeds into one of a second sorting bin and a third sorting bin.

B1. A method of sorting seeds, the method comprising: moving seeds through the system using a seed transfer station; acquiring, using an x-ray camera, x-ray images of the seeds as the seeds move through the system via the seed transfer station, the x-ray camera being configured to produce high quality images at high line scan rates to accommodate a speed at which the seeds are moved by the seed transfer station through the system; analyzing the x-ray images to determine a parameter of each of the seeds; and sorting, using a sorting assembly, the seeds based on the determined parameter of the seeds.

B2. The method of B1, wherein analyzing the images comprises determining, using a controller operating a classifier model, a probability value of the seeds from the acquired x-ray images, the probability value identifying the seeds as belonging to a certain class.

B3. The method of B2, further comprising classifying, using the controller, each of the seeds based on the probability value of the seeds.

B4. The method of B3, wherein categorizing the seeds comprises categorizing the seeds as either acceptable or unacceptable.

B5. A method of B1, wherein analyzing the images comprises providing, using a controller operating a classifier model, a classification decision based on the acquired x-ray images for identifying each seed as belonging to a certain class.

B6. The method of B1, wherein said moving the seeds through the system comprises moving the seeds via a conveyor in a substantially horizontal direction.

B7. The method of B6, wherein said moving the seeds through the system comprises operating the conveyor at a speed of about 10 to about 1000 mm/sec.

B8. The method of B6, wherein said moving the seeds through the system comprises operating the conveyor at a speed of about 0.6 to 1.2 m/s.

B9. The method of B6, wherein said moving the seeds through the system comprises moving the seeds at a rate of between about 20 seeds/sec to about 200 seeds/sec.

B10. The method of B1, wherein said sorting the seeds comprises sorting the seeds into at least two separate sorting bins, a first sorting bin representing healthy seeds and a second sorting bin representing defective seeds.

B11. The method of B8, wherein said sorting the seeds comprises operating at least one sorting module to sort the seeds into the first and second sorting bins.

B12. The method of B1, further comprising collecting excess seeds in a seed collector and routing the excess seeds back to the seed transfer station.

B13. The method of B12, wherein the step of routing the excess seeds back to the seed transfer station comprises separating particles and air from the seeds.

C1. An x-ray camera for acquiring x-ray images comprising: a camera housing; optical sensor components housed within the camera housing; a fiber optic mounted on the optical sensor components and extending from the optical sensor components, the fiber optic being housed within the camera housing; and a fiber-optic-scintillator mounted on the fiber optic.

C2. The x-ray camera of C1, further comprising an entrance window mounted on the scintillator, a distance between the entrance window and the scintillator being less than 1 mm (0.04 inches).

C3. The x-ray camera of C1, wherein the optical sensor components comprise x-ray tubes with a focal spot size of at least about 1.0 mm×1.0 mm.

C4. The x-ray camera of C1, further comprising a scintillator material disposed on top of the fiber-optic scintillator, wherein the scintillator material comprises one of cesium iodide and gadolinium oxysulfide.

D1. A training method for building a classification model for a batch of seeds, the method comprising: loading seeds into a scantray comprising a plurality of holes, the seeds being held in the holes in the scantray; taking x-ray images of the seeds in the scantray using an x-ray camera associated with a seed sorting assembly; and building a seed classification model using the x-ray images of the seeds in the scantray for identifying the seeds as belonging to a certain class.

D2. The training method of D1 wherein the scantray comprises a body having a plurality of holes formed in a top surface of the body.

D3. The training method of D2 wherein the scantray further comprises a transparent film disposed between the top surface and a bottom surface of the body, the transparent film covering a bottom of the holes for holding a seed in each hole.

D4. The training method of D1 further comprising: loading seeds into multiple scantrays each comprising a plurality of holes, the seeds being held in the holes in the scantrays; and stacking the scantrays in a stack for being retrieved by a retrieval device to image the seeds in the scantrays.

D5. The training method of D4 further comprising automatically retrieving one of the scantrays from the stack with the retrieval device and placing the retrieved scantray on a conveyor for imaging the seeds in the retrieved scantray.

E1. A debris separator assembly for use in a seed sorting system, the assembly comprising: a debris separator comprising a body having an inlet, an upper outlet, and a lower outlet, and a pipe disposed in an interior space of the body, the debris separator using mechanical and aerodynamic forces to divert seeds delivered through the inlet to the lower outlet; and an air transvector in fluid communication with the interior space of the body for separating debris from the seeds delivered through the inlet and diverting the debris to the upper outlet such that no air or debris is directed to the lower outlet.

E2. The debris separator assembly of E2, further comprising tubing attached to the inlet of the body and a second air transvector in fluid communication with the tubing for delivering the seeds through the tubing to the inlet.

What is claimed is:

1. A seed sorting system for sorting seeds, the system comprising:
   a seed transfer station configured to move seeds through the system, the seed transfer station including a conveyor;
   a seed feeder configured to deliver the seeds to the conveyor of the seed transfer station from a seed loading station, the seed feeder defining multiple channels configured to align the seeds in a plurality of spaced apart rows for delivery to the conveyor, whereby the seeds are positioned on the conveyor by the seed feeder in the spaced apart rows, at least one of the multiple channels including a slot configured to direct excess seeds received in the slot back to the seed loading station;
   an imaging assembly comprising an x-ray camera configured to acquire x-ray images of the seeds on the conveyor as the seeds move through the system, the x-ray camera being configured to produce images at line scan rates to accommodate a speed and width at which the seeds are moved by the conveyor of the seed transfer station through the system; and
   a sorting assembly configured to sort the seeds into separate bins based on the acquired x-ray images of the seeds.

2. The seed sorting system of claim 1, wherein the sorting assembly includes multiple vacuum nozzles each configured to draw a select one of the seeds from the conveyor, based on the acquired x-ray images of the seeds, and deliver the select one of the seeds into one of the bins; and
   wherein each of the multiple vacuum nozzles is aligned with one of the multiple channels of the seed feeder such that each of the rows of seeds positioned on the conveyor by the seed feeder passes below at least one of the multiple vacuum nozzles.

3. The seed sorting system of claim 1, further comprising an encoder positioned adjacent the seed feeder, the encoder configured to track a position of each of the seeds as the seeds are received on the conveyor and as the conveyor moves the seeds through the system;
   wherein the sorting assembly includes multiple air valves positioned toward an end portion of the conveyor, the air valves configured to discharge air at select ones of the seeds on the conveyor, based on the acquired x-ray images of the select ones of the seeds and the tracked position of the select ones of the seeds, to thereby direct the select ones of the seeds into one or more of the bins.

4. The seed sorting system of claim 1, wherein the x-ray camera uses low energy x-ray photons in a range of 5 keV to 50 keV to produce the images.

5. The seed sorting system of claim 4, further comprising:
an x-ray tube configured to emit the low energy x-ray photons; and
a filter disposed between the x-ray camera and the x-ray tube.

6. The seed sorting system of claim 5, wherein the x-ray tube includes a focal spot size of at least 1.0 mm×1.0 mm.

7. The seed sorting system of claim 1, further comprising a controller configured to measure and analyze the x-ray images to classify the seeds, wherein the controller is configured to run, in real-time, a classification model that determines from the acquired x-ray images a probability value of each seed identifying each seed as belonging to a certain class, and wherein the controller is configured to control the sorting assembly to sort the seeds based on the determined probability value of the seeds from the acquired x-ray images.

8. The seed sorting system of claim 1, further comprising a controller configured to measure and analyze the x-ray images to classify the seeds, wherein the controller is configured to run, in real-time, a classification model that provides a classification decision based on the acquired x-ray images for identifying each seed as belonging to a certain class.

9. The seed sorting system of claim 1, wherein the conveyor comprises a belt, and wherein the x-ray camera comprises a scintillator; and
wherein a spacing between the scintillator and the belt is between 0.4 mm (0.01 inches) and 10 mm (0.4 inches).

10. The seed sorting system of claim 1, further comprising a controller, wherein the sorting assembly comprises at least one sorting module and a plurality of sorting bins, the sorting module being operable by the controller to divert at least some of the seeds into at least one of the sorting bins before the seeds leave the seed transfer station, wherein the sorting module comprises one of a plurality of moveable vacuum nozzles and a plurality of air valves, and wherein the seed transfer station is configured to direct seeds into a first sorting bin, the sorting module being operable to direct seeds into one of a second sorting bin and a third sorting bin.

11. The seed sorting system of claim 1, further comprising:
a debris separator comprising a body having an inlet configured to receive excess seeds from the seed feeder, an upper outlet, and a lower outlet, and a pipe disposed in an interior space of the body, the debris separator using mechanical and aerodynamic forces to divert seeds delivered through the inlet to the lower outlet; and
an air transvector in fluid communication with the interior space of the body for separating debris from the seeds delivered through the inlet and diverting the debris to the upper outlet such that no air or debris is directed to the lower outlet.

12. The seed sorting system of claim 1, further comprising an x-ray source configured to emit x-ray photons to produce the images;
wherein the conveyor is disposed between the x-ray source and the x-ray camera; and
wherein the x-ray camera includes:
a camera housing;
optical sensor components housed within the camera housing;
a fiber optic mounted on the optical sensor components and extending from the optical sensor components, the fiber optic being housed within the camera housing; and
a fiber-optic-scintillator mounted on the fiber optic.

13. The seed sorting system of claim 12, further comprising an entrance window coupled to the camera housing and positioned between the scintillator and the conveyor, a distance between the entrance window and the scintillator being less than 1 mm (0.04 inches).

14. The seed sorting system of claim 12, further comprising a scintillator material disposed on top of the fiber-optic scintillator, wherein the scintillator material comprises cesium iodide or gadolinium oxysulfide.

15. A method of sorting seeds using a seed sorting system, the method comprising:
aligning individual seeds in a plurality of spaced apart rows at a seed feeder of the seed sorting system;
delivering the aligned seeds, from the seed feeder, to a seed transfer station of the seed sorting system;
capturing excess seeds received at the seed feeder and directing the captured excess seeds away from the seed transfer station;
moving the aligned seeds received from the seed feeder at the seed transfer station through the seed sorting system using the seed transfer station;
acquiring, using an x-ray camera of the seed sorting system, x-ray images of the seeds as the seeds move through the seed sorting system; and
sorting, using a sorting assembly of the seed sorting system, the seeds into one or more classes based on a seed classification model and the x-ray images of the seeds.

16. The method of claim 15, wherein sorting the seeds includes determining, using a controller of the seed sorting system operating the seed classification model, a probability value of the seeds from the acquired x-ray images, wherein the probability value identifies each of the seeds as belonging to at least one of the one or more classes.

17. The method of claim 15, wherein moving the seeds through the seed sorting system includes moving the seeds on a conveyor past a scintillator of the x-ray camera at a distance of between 0.4 mm (0.01 inches) to 10 mm (0.4 inches) away from the scintillator.

18. The method of claim 15, wherein sorting the seeds into one or more classes includes sorting the seeds into multiple bins by drawing select ones of the seeds into a tube, via vacuum pressure, and transporting the select ones of the seeds through the tube to one of the multiple bins.

19. The method of claim 15, further comprising tracking a position of the seeds as the seeds are received at the seed transfer station and as the seed transfer station moves the seeds through the seed sorting system; and
wherein sorting the seeds into one or more classes includes sorting the seeds into multiple bins by discharging air at select ones of the seeds, based on the tracked position of the select ones of the seeds, to thereby direct the select ones of the seeds, via the discharged air, to one or more of the multiple bins.

20. The method of claim 15, further comprising:
loading a training set of seeds into a scantray comprising a plurality of holes, the training set of seeds being held in the holes in the scantray;
taking x-ray images of the training set of seeds in the scantray using the x-ray camera of the seed sorting system; and
building the seed classification model using the x-ray images of the training set of seeds in the scantray.

21. The method of claim 20, wherein the scantray comprises a body having a plurality of holes formed in a top surface of the body, and a transparent film disposed between the top surface and a bottom surface of the body, the transparent film covering a bottom of the holes for holding a seed in each hole.

22. The method of claim 20, further comprising:
    loading seeds into multiple additional scantrays each comprising a plurality of holes, the seeds being held in the holes in the scantrays;
    stacking the multiple additional scantrays in a stack for being retrieved by a retrieval device of the seed sorting system; and
    automatically retrieving one of the multiple additional scantrays from the stack with the retrieval device and placing the retrieved scantray on a conveyor of the seed sorting system for imaging the seeds in the retrieved scantray using the x-ray camera of the seed sorting system;
    wherein building the seed classification model further includes building the seed classification model using the x-ray images of the seeds in the retrieved scantray.

23. A method of sorting seeds using a seed sorting system, the method comprising:
    loading a training set of seeds into a scantray comprising a plurality of holes, the training set of seeds being held in the holes in the scantray;
    acquiring x-ray images of the training set of seeds in the scantray using an x-ray camera of the seed sorting system;
    building a seed classification model using the x-ray images of the training set of seeds in the scantray;
    moving seeds through the seed sorting system using a seed transfer station of the seed sorting system;
    acquiring, using the x-ray camera of the seed sorting system, x-ray images of the seeds as the seeds move through the seed sorting system; and
    sorting, using a sorting assembly of the seed sorting system, the seeds into one or more classes based on the seed classification model and the x-ray images of the seeds.

24. A seed sorting system for sorting seeds, the system comprising:
    a seed transfer station configured to move seeds through the system, the seed transfer station including a conveyor;
    an imaging assembly comprising an x-ray camera configured to acquire x-ray images of the seeds on the conveyor as the seeds move through the system, the x-ray camera including:
      a housing;
      a scintillator positioned within the housing;
      an entrance window coupled to the housing between the scintillator and the conveyor; and
      a scintillator material disposed on the scintillator, between the scintillator and the entrance window;
      wherein a distance between the scintillator and the conveyor is between 0.4 mm (0.01 inches) and 10 mm (0.4 inches); and
      wherein a distance between the entrance window and the scintillator is less than 1 mm (0.04 inches);
    an x-ray source configured to emit x-ray photons to produce the x-ray images, wherein the conveyor of the seed transfer station is disposed between the x-ray source and the x-ray camera of the imaging assembly; and
    a sorting assembly configured to sort the seeds into separate bins based on the acquired x-ray images of the seeds.

25. The seed sorting system of claim 24, wherein the x-ray camera further includes:
    an optical sensor disposed within the housing; and
    a fiber optic mounted on the optical sensor within the housing, wherein the scintillator is coupled on the fiber optic, and wherein the fiber optic is disposed between the optical sensor and the scintillator.

* * * * *